US010479859B2

(12) United States Patent
Queen et al.

(10) Patent No.: US 10,479,859 B2
(45) Date of Patent: Nov. 19, 2019

(54) AROMATIC POLYESTER POLYETHER POLYOLS, POLYURETHANES MADE THEREFROM AND BUILDING MATERIALS COMPRISING SAME

(71) Applicant: Talaco Holdings, LLC, Lawrenceville, GA (US)

(72) Inventors: Frank A. Queen, Dacula, GA (US); Robert Keith Salsman, Hoschton, GA (US); Bennett McDonald Pearson, Lancaster, TX (US)

(73) Assignee: Talaco Holdings, LLC, Lawrenceville, GA (US)

( * ) Notice: Subject to any disclaimer, the term of this patent is extended or adjusted under 35 U.S.C. 154(b) by 0 days.

(21) Appl. No.: 16/164,049

(22) Filed: Oct. 18, 2018

(65) Prior Publication Data

US 2019/0119439 A1    Apr. 25, 2019

Related U.S. Application Data

(60) Provisional application No. 62/573,842, filed on Oct. 18, 2017, provisional application No. 62/722,874, filed on Aug. 25, 2018.

(51) Int. Cl.
| | |
|---|---|
| *C08G 18/24* | (2006.01) |
| *C08G 18/42* | (2006.01) |
| *C08G 18/48* | (2006.01) |
| *C08G 18/72* | (2006.01) |
| *C08G 18/76* | (2006.01) |
| *C08G 63/183* | (2006.01) |
| *C08J 9/12* | (2006.01) |
| *C08L 75/08* | (2006.01) |
| *C09D 175/06* | (2006.01) |
| *C08G 63/46* | (2006.01) |
| *C08G 63/66* | (2006.01) |
| *C08G 63/668* | (2006.01) |
| *C08G 101/00* | (2006.01) |

(52) U.S. Cl.
CPC .......... *C08G 63/46* (2013.01); *C08G 18/246* (2013.01); *C08G 18/4225* (2013.01); *C08G 18/4252* (2013.01); *C08G 18/4887* (2013.01); *C08G 18/7671* (2013.01); *C08G 63/66* (2013.01); *C08G 63/668* (2013.01); *C08J 9/12* (2013.01); *C08L 75/08* (2013.01); *C09D 175/06* (2013.01); *C08G 18/4261* (2013.01); *C08G 18/72* (2013.01); *C08G 63/183* (2013.01); *C08G 2101/005* (2013.01); *C08G 2101/0025* (2013.01); *C08G 2150/60* (2013.01); *C08G 2170/60* (2013.01); *C08G 2190/00* (2013.01); *C08L 2201/02* (2013.01)

(58) Field of Classification Search
CPC .... C08G 18/4261; C08G 63/46; C08G 63/66; C08G 63/183
See application file for complete search history.

(56) References Cited

U.S. PATENT DOCUMENTS

| | | |
|---|---|---|
| 3,009,764 A | 11/1961 | Venkataramaraj |
| 3,304,286 A | 2/1967 | Altscher |
| 3,615,972 A | 10/1971 | Morehouse, Jr. et al. |
| 3,979,867 A | 9/1976 | Sowinski |
| 4,048,104 A | 9/1977 | Svoboda et al. |
| 4,223,068 A | 9/1980 | Carlstrom et al. |
| 4,248,432 A | 2/1981 | Hewitt et al. |
| 4,439,550 A | 3/1984 | Brennan |
| 4,469,824 A | 9/1984 | Grigsby, Jr. et al. |
| 4,485,196 A | 11/1984 | Speranza et al. |
| 4,539,341 A | 9/1985 | Hallmark et al. |
| 4,604,410 A | 8/1986 | Altenberg |
| 4,609,513 A | 9/1986 | Israel |
| 4,642,319 A | 2/1987 | McDaniel |
| 4,652,591 A | 3/1987 | Londrigan |
| 4,662,972 A | 5/1987 | Thompson |
| 4,758,607 A | 7/1988 | Hallmark et al. |

(Continued)

FOREIGN PATENT DOCUMENTS

| | | |
|---|---|---|
| EP | 0558906 | 9/1993 |
| GB | 1266225 | 3/1972 |

(Continued)

OTHER PUBLICATIONS

Technical Data Sheet—Resinate® C3851-100, Jun. 2018; Resinate Materials Group, Inc., 46701 Commerce Center Drive, Plymouth, Michigan, 48170.

Technical Data Sheet—Resinate® Polyols for Ambient and UV Cure Polyurethane Dispersions, 2017; Resinate Materials Group, 801 W. Ann Arbor Trail, Plymouth, MI 48170.

Technical Data Sheet—Resinate® Polyols for Floor Coatings, 2017; Resinate Materials Group, 801 W. Ann Arbor Trail, Plymouth, MI 48170.

Todorov, Nikola, Boryana Dzhundzhurova, and Donka Todorova. "ALKYD resin obtained from crude glycerol and waste polyethylene terephthalate." IJAR 2.10 (2016): 101-103.

(Continued)

*Primary Examiner* — Melissa A Rioja

(74) *Attorney, Agent, or Firm* — Thomas|Horstemeyer, LLP

(57) ABSTRACT

This abstract is intended as a scanning tool for purposes of searching in the particular art and is not intended to be limiting of the present disclosure. The disclosure provides aromatic polyester polyether polyols and compositions comprising such polyols. The disclosed aromatic polyester polyether polyols and compositions including same are the products of the transesterification reaction of polyethylene terephthalate ("PET") and an ethoxylated triol, namely glycerin or trimethylolpropane, wherein the degree of ethoxylation is from 1 to 9 moles. At least some of the PET used to generate the aromatic polyester polyether polyols is derived from recycled PET. The disclosed aromatic polyester polyether polyols have utility in preparing polyurethane materials, for example.

15 Claims, 11 Drawing Sheets

(56) References Cited

U.S. PATENT DOCUMENTS

| | | | |
|---|---|---|---|
| 4,791,148 | A | 12/1988 | Riley et al. |
| 4,833,182 | A | 5/1989 | Israel et al. |
| 4,897,429 | A | 1/1990 | Trowell et al. |
| 5,252,615 | A | 10/1993 | Rao et al. |
| 5,302,634 | A | 4/1994 | Mushovic |
| 5,877,255 | A | 3/1999 | Gerber et al. |
| 6,008,182 | A | 12/1999 | Salsman et al. |
| 6,022,939 | A | 2/2000 | Pudliener et al. |
| 6,592,218 | B1 * | 7/2003 | Salsman .............. B41M 5/5272 347/106 |
| 6,710,095 | B2 | 3/2004 | Araullo-McAdams et al. |
| 7,157,139 | B2 | 1/2007 | Salsman et al. |
| 7,677,022 | B2 | 3/2010 | Chenevert et al. |
| 8,476,364 | B2 | 7/2013 | Salsman |
| 8,696,966 | B2 | 4/2014 | Smith |
| 9,062,158 | B2 | 6/2015 | Gehringer et al. |
| 9,309,439 | B2 | 4/2016 | Varkey et al. |
| 9,410,014 | B2 | 8/2016 | Salsman |
| 9,739,066 | B2 | 8/2017 | Bolin |
| 9,745,408 | B2 | 8/2017 | Jones et al. |
| 9,809,674 | B2 | 11/2017 | Shieh |
| 2003/0225240 | A1 | 12/2003 | Quint |
| 2004/0059011 | A1 | 3/2004 | Barber et al. |
| 2004/0162359 | A1 | 8/2004 | Barber et al. |
| 2007/0093634 | A1 | 4/2007 | Salsman et al. |
| 2010/0071292 | A1 | 3/2010 | Futterman |
| 2010/0240785 | A1 | 9/2010 | Hickey et al. |
| 2010/0311637 | A1 | 12/2010 | Alonso et al. |
| 2011/0086217 | A1 | 4/2011 | Crain et al. |
| 2012/0142799 | A1 | 6/2012 | Gehringer et al. |
| 2012/0259061 | A1 | 10/2012 | Felice et al. |
| 2015/0025164 | A1 | 1/2015 | Galini et al. |
| 2015/0052838 | A1 | 2/2015 | Richie et al. |
| 2016/0053050 | A1 | 2/2016 | Tabor et al. |
| 2016/0053058 | A1 | 2/2016 | Tabor et al. |
| 2017/0029561 | A1 | 6/2017 | Tabor et al. |
| 2018/0282469 | A1 | 10/2018 | Golini et al. |

FOREIGN PATENT DOCUMENTS

| | | |
|---|---|---|
| GR | 20100100129 | 10/2011 |
| WO | 99/51430 A1 | 10/1999 |
| WO | WO1999061504 | 12/1999 |
| WO | 2012/019258 A1 | 2/2012 |
| WO | 2012/113737 A1 | 8/2012 |
| WO | 2016/168043 A1 | 10/2016 |

OTHER PUBLICATIONS

Ghaderian, Abolfazl, et al. "Characterization of rigid polyurethane foam prepared from recycling of PET waste." Periodica Polytechnica Chemical Engineering 59.4 (2015): 296-305.

Luo, Xiaolan, and Yebo Li. "Synthesis and characterization of polyols and polyurethane foams from PET waste and crude glycerol." Journal of Polymers and the Environment 22.3 (2014): 318-328.

Vitkauskiene, I., et al. "Synthesis and physical-mechanical properties of polyurethane-polyisocyanurate foams based on PET-waste-derived modified polyols." Journal of Cellular Plastics 47.5 (2011): 467-482.

Raheem, A. B., and L. Uyigue. "The conversion of post-consumer polyethylene terephthalate (PET) into a thermosetting polyester resin." Arch. Appl. Sci. Res 2 (2010): 240-254.

Barboza, E. S., et al. "Determination of a recyclability index for the PET glycolysis." Resources, Conservation and Recycling 53.3 (2009): 122-128.

Vitkauskienė, Irena, and Ričardas Makuška. "Glycolysis of industrial poly (ethylene terephthalate) waste directed to bis (hydroxyethylene) terephthalate and aromatic polyester polyols." Chemija 19.2 (2008).

Boyadzhiev, Marin, et al. "Development of branched aromatic polyester polyols from PET." (2007), in Wissenschaftliche Beiträge, Technische Fachhochschule Wildau, University of Applied Sciences (ISSN 0949-8214), pp. 11-16.

Singh, Sachchida N., et al. "Effect of Formulation Parameters on Performance of Polyisocyanurate Laminate Boardstock Insulation." Proceedings of the polyurethanes 2006 Technical conference. 2006.

Nikles, David E., and Medhat S. Farahat. "New motivation for the depolymerization products derived from poly (ethylene terephthalate)(PET) waste: A review." Macromolecular Materials and Engineering 290.1 (2005): 13-30.

Azim, Abdel Azim A. Abdel, Ayman M. Atta, and R. A. El-Ghazawy. "Synthesis of rigid polyurethane foams from recycled poly (ethylene terephthalate) waste." Cellular polymers 25.1 (2006): 35-48.

Mcadams, Carina A., and Steven Farmer. "Stabilization of rigid systems containing aromatic polyester polyol and water." Journal of cellular plastics 39.5 (2003): 369-386.

Evtimova, Roseta, et al. "Polyester Polyols from Waste PET Bottles for Polyurethane Rigid Foams." (2003).

Billiau-Loreau, Myriam, Gérard Durand, and Gilles Tersac. "Structural effects of diacidic and glycolic moieties on physicochemical properties of aromatic polyesterdiols from glycolysis/esterification of poly (ethylene terephthalate) wastes." Polymer 43.1 (2002): 21-28.

Paszun, Daniel, and Tadeusz Spychaj. "Chemical recycling of poly (ethylene terephthalate)." Industrial & engineering chemistry research 36.4 (1997): 1373-1383.

Inohara, Hideki, et al. "Newly Developed Superior Flame Retardant All Water-Blown Polyisocyanurate Foams." in Polyurethanes Technical Conference Proceedings, Sep. 24-26, 2007 (ISBN: 978-1-60560-101-4), p. 211-220.

Chapter 5: Polyester Polyols for Rigid Polyurethane Foams in Chemistry and Technology of Polyols for Polyurethanes, 2nd Edition, vol. 2, pp. 107-122 (Smithers Rapra, Shropshire, United Kingdom; 2016; ISBN 978-1-91024-298-8).

International Search Report for Application PCT/US18/56512, dated Dec. 11, 2018.

Bomberg, Mark, and M. K. Kumaran. Use of field-applied polyurethane foams in buildings. Construction Technology Update No. 32, Institute for Research in Construction, National Research Council of Canada, Dec. 1999 (ISSN 1206-1220).

Engels, Hans-Wilhelm, et al. "Polyurethanes: versatile materials and sustainable problem solvers for today's challenges." Angewandte Chemie International Edition 52 (2013): 9422-9441. DOI: 10.1002/anie.201302766.

Carlisle's Roofing Systems (Product Brochure), Carlisle Syntec Systems, P.O. Box 7000, Carlisle, PA 17013. Copyright date: 2015. Reprint Code: 600200—Systems Brochure—Jul. 28, 2015.

Budhe, S., et al. "An updated review of adhesively bonded joints in composite materials." International Journal of Adhesion and Adhesives 72 (2017): 30-42.

2017/2018 Product Reference Guide, Carlisle Syntec Systems, P.O. Box 7000, Carlisle, PA 17013. Copyright date: 2017. Reprint Code: 606370—"Carlisle SynTec Systems Product Reference Guide"—Sep. 27, 2017.

Structural Thermal Isolation Blocks for Construction (Construction Brochure), General Plastics Manufacturing Company, 4910 Burlington Way, Tacoma, WA 98409 (date unknown).

Polyurethane and Polyisocyanurate Foams: Insulation That Works, American Chemistry Council, Center for Polyurethanes Industry, 700 2nd Street NE, Washington, District of Columbia 20002-4308 (Nov. 21, 2011).

* cited by examiner

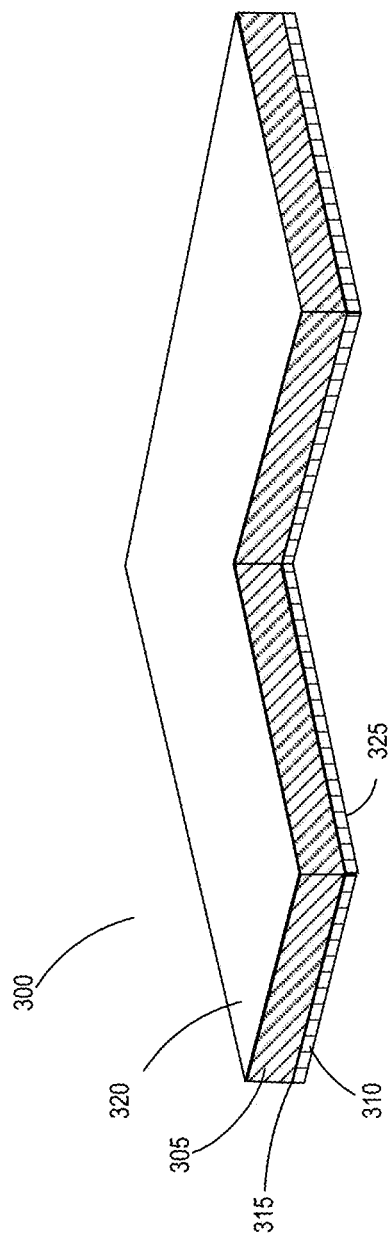
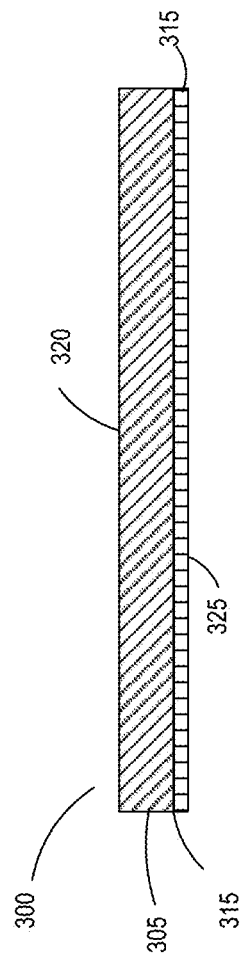
FIG. 3a
FIG. 3b

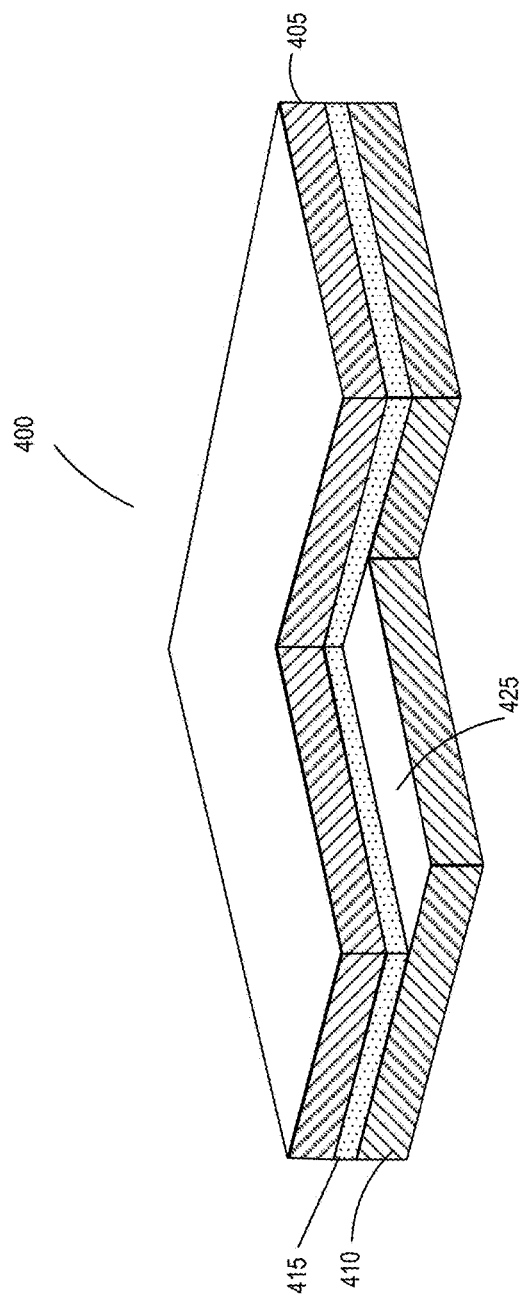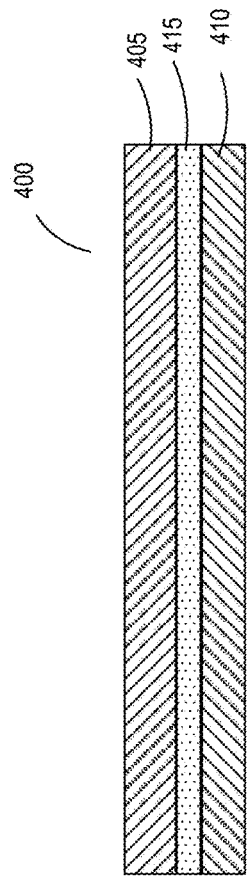
FIG. 4a
FIG. 4b

US 10,479,859 B2

AROMATIC POLYESTER POLYETHER POLYOLS, POLYURETHANES MADE THEREFROM AND BUILDING MATERIALS COMPRISING SAME

CROSS REFERENCE TO RELATED APPLICATIONS

This application claims priority to U.S. Provisional Application No. 62/573,842, filed Oct. 18, 2017, and U.S. Provisional Application No. 62/722,874, filed Aug. 25, 2018. The disclosures of each of these applications are incorporated herein in their entireties.

FIELD OF THE DISCLOSURE

The disclosure relates to aromatic polyester polyether polyol materials derived from the transesterification of polyethylene terephthalate with either glycerin or trimethylolpropane, wherein each of these triols, independently, has a degree of ethoxylation of from 1 to 9. The generated aromatic polyester polyether polyols exhibit beneficially low viscosities. Such aromatic polyester polyol materials also impart improvements to polyurethane materials generated therefrom, including fire/heat resistance, adhesion, and impact resistance, among other things. The disclosure also relates to useful materials coated with such improved polyurethane materials, and substrates made from such polyurethanes. The polyurethane compositions can be foamed or unfoamed, and filled or unfilled. Yet further, the disclosure relates to processes of making the aromatic polyester polyether polyols, the polyurethanes, and useful materials incorporating such polyurethanes.

BACKGROUND OF THE DISCLOSURE

Polyethylene terephthalate, commonly abbreviated "PET," consists of polymerized units of the monomer ethylene terephthalate, with repeating $(C_{10}H_8O_4)$ units. PET is the most common thermoplastic polymer resin of the polyester family and is used in fibers for clothing and carpets, containers for liquids and foods, and as componentry, among other things. The majority of the world's PET production is for synthetic fibers (in excess of 60%), with bottle production accounting for about 30% of global demand. Polyester makes up about 18% of global polymer production.

While PET is recyclable in many locations, typically PET waste has been landfilled due to the cost of recycling this material into useful materials. It has not been cost effective to recycle PET into useable new materials because it has been cheaper to generate materials from petrochemical materials than from the depolymerization of waste PET which, when coupled with the general availability of landfill space, has disincentivized PET recycling. However, given the increasing cost and environmental impact of petroleum-derived polymers like PET, as well as the decreasing availability of landfill space in many parts of the world, recycling of PET is becoming more desirable. Thus, there is an increasing focus on development of cost effective and value-added methods to recycle PET to generate new products.

Terminology for plastics recycling includes four categories:
Primary (mechanical reprocessing into a product with equivalent properties) is often referred to as "closed-loop" recycling;
Secondary (mechanical reprocessing into products having reduced property requirements than the previous polymer), referred to as "downgrading;"
Tertiary is described as "chemical" or "feedstock" recycling and applies when the polymer is de-polymerized to its chemical constituents to be used to generate new polymers or other useful chemicals; and
Quaternary is energy recovery, energy from waste, such as by burning for fuel to utilize the petrochemical components therein.

In general terms, tertiary recycling has the advantage of recovering the petrochemical constituents of the polymer, which can then be used to re-manufacture the polymer or to make other chemicals. However, while technically feasible, it has generally been found to be uneconomic without significant government or other subsidies because of the low price of petrochemical feedstock as compared to the plant and process costs incurred to produce monomers from waste polymers. This is not surprising because depolymerization effectively involves reversing the energy-intensive polymerization previously carried out during first order PET manufacturing processes.

One of the useful materials that has been a goal of tertiary PET recycling is the generation of aromatic polyester polyols as raw materials for polyurethane polymers, that is, to substitute for the petrochemical feedstock that would otherwise be needed to obtain these materials. When the aromatic polyester polyether polyol is generated natively—that is, not from the recycling of PET—the aromatic polyester polyol can be made by condensing aromatic diacids, diesters, or anhydrides (e.g., terephthalic acid, dimethyl terephthalate) with glycols such as ethylene glycol, propylene glycol, diethylene glycol, or the like. When PET waste is depolymerized for generation of aromatic polyester polyol via glycolysis, ethylene glycol, diethylene glycol, propylene glycol, or dipropylene glycol are typically used. Ethylene glycol has been reported as the most reactive glycol for PET glycolysis. As would be appreciated, transesterification via glycolysis converts the polymer to a mixture of glycols and low-molecular-weight PET oligomers, and the transesterification products can be modified for use with a variety of chemicals after completion of glycolysis to provide an aromatic polyester polyol that is workable in a polyurethane reaction.

Such aromatic polyester polyol products of the glycolysis of PET can be used in the preparation rigid polyurethane foams ("RPUF"). RPUFs can be used as insulating materials due to their generally low thermal conductivity. Such foams can be used, for example, as outer wall insulation of residential and commercial buildings, shipping containers (e.g., tractor trailers, rail cars, shipping containers etc.) and pipelining, among other things. Unfoamed polyurethane materials can also be used for coatings, adhesives, and sealants.

The aromatic content of aromatic polyester polyols derived from PET are known to contribute to the strength, stiffness, and thermal stability of the polyurethane product. RPUFs generated from aromatic polyester polyols have been shown to exhibit excellent overall performance in insulation applications. Thermal stability of RPUFs depends on the polyol structure, and aromatic polyols can be superior over aliphatic polyols from this point of view. Previously introduced aromatic polyester polyether polyols based on terephthalic acid or phthalic anhydride have a high content of aromatic fragments, for example, about around 20%. The presence of aromatic fragments in the structure of polyols has been shown to enhance many properties of RPUF enabling good mechanical characteristics, high thermal stability, resistance to major chemical solvents, and low flammability. Nonetheless, the prevailing price charged for existing RPUFs generated from prior art aromatic polyester polyols makes this material much less desirable than that of foamed polystyrene or mineral wool products for commercial applications.

To this end, starting materials for both polyols for use in aromatic polyester polyols are typically derived exclusively from petrochemical sources. At least because the recycling of PET into useful articles reduces some use of non-renewable materials, it would seem desirable to use such material as an upstream feedstock for polyurethane manufacture. However, the economics of such manufacture does not support this use case. One might also infer that a price differential might be possible for aromatic polyester polyether polyol derived from recycled PET in that people would be willing to pay more from polyurethane materials derived from such a source, but this is not the case given current methods proposed for generation of these materials. Users are demanding "greener" products that perform equally well to existing, petroleum-derived products, but they are not typically willing to pay a premium for these products. Reduction in the price of RPUFs made from aromatic polyester polyols could become possible by the use of PET-waste derived as raw materials.

In view of the foregoing, it would be desirable to develop methods and materials that could enhance the ability to use waste PET to generate chemical feedstock that can be used to generate high value materials, while still addressing the cost requirements demanded by consumers for such high value materials. Yet further, it would be desirable to develop polyurethane materials that exhibit improved chemical and physical properties. The present invention provides these and other benefits.

SUMMARY OF THE DISCLOSURE

In various aspects, the present disclosure relates to aromatic polyester polyether polyols having a structure that is either: (a) based on a glycerol backbone, the structure represented by a formula:

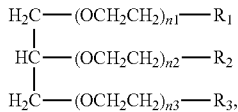

wherein each of $R_1$, $R_2$, and $R_3$ is independently selected from hydroxyl and a structure represented by a formula:

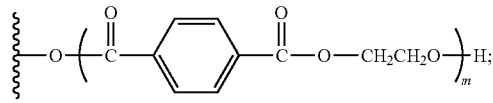

wherein m has a value such that the aromatic polyester polyether polyol has a suitable Brookfield Cone and Plate Viscosity; and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9; or (b) based on a trimethylolpropane backbone, the structure represented by a formula:

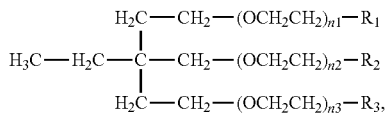

wherein each of $R_1$, $R_2$, and $R_3$ is independently selected from hydroxyl and a structure represented by a formula:

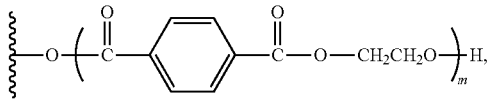

wherein m has a value such that the aromatic polyester polyether polyol has a suitable Brookfield Cone and Plate Viscosity; and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9.

In a further aspect, the present disclosure relates to an aromatic polyester polyether polyol compositions derived from transesterification of PET in the presence of an ethoxylated triol and, optionally, a catalyst, wherein the ethoxylated triol comprises one of: (a) glycerin having from 1 to 9 moles of ethoxylation; or (b) trimethylolpropane having from 1 to 9 moles of ethoxylation.

The aromatic polyester polyol compositions can have a Brookfield Cone and Plate Viscosity of about 5 Poise (spindle #4, 100 rpm, 60° C.) or less when the transesterification reaction is terminated.

In further aspects, the present invention relates to polyurethane material that are generated from a) an aromatic polyester polyether polyol generated according to the above-referenced transesterification reaction of PET and an ethoxylated trio comprising either glycerin or trimethylolpropane, wherein the triols have been modified to have from 1 to 9 moles of ethoxylation; and b) an isocyanate. At least some of the PET can be derived from a recycled source. The beneficial low viscosities of the aromatic polyester polyether polyols allow the polyols to be workable as generated from the transesterification reaction. Moreover, the use of recycled PET and, in some implementations, glycerin provides a polyurethane with "green" characteristics.

The generated polyurethane can be foamed or unfoamed, and can be used as a coating on one or more sides of a substrate to provide a coated substrate. The generated polyurethane can also be formed into a substrate. The generated polyurethanes can be filled or unfilled.

The polyurethanes derived from the aromatic polyester polyether polyols exhibit excellent physical properties, such as fire resistance, hardness, resiliency, impact resistance, and the like. The cured-in-placed polyurethanes also provide excellent adhesion to a number of different surface types. When formed into a substrate, the polyurethanes can be used for structural (e.g., load bearing) applications. The polyurethanes also show good wettability to filler materials, and can be generated into sheets, molded shapes, and the like.

Additional advantages of the invention will be set forth in part in the description that follows, and in part will be apparent from the description, or may be learned by practice of the invention. The advantages of the invention will be realized and attained by means of the elements and combination particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

Further aspects of the present disclosure will be readily appreciated upon review of the detailed description of its various aspects, described below, when taken in conjunction with the accompanying drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3a and 3b are side views of one implementation of a composite substrate with the unfoamed inventive polyurethane adhesive coated on one surface.

FIGS. 4a and 4b are cross-sectional views of one implementation of a sandwich composite panel comprising two substrates coated with the foamed inventive polyurethane composition and adhered together.

Figure 1:
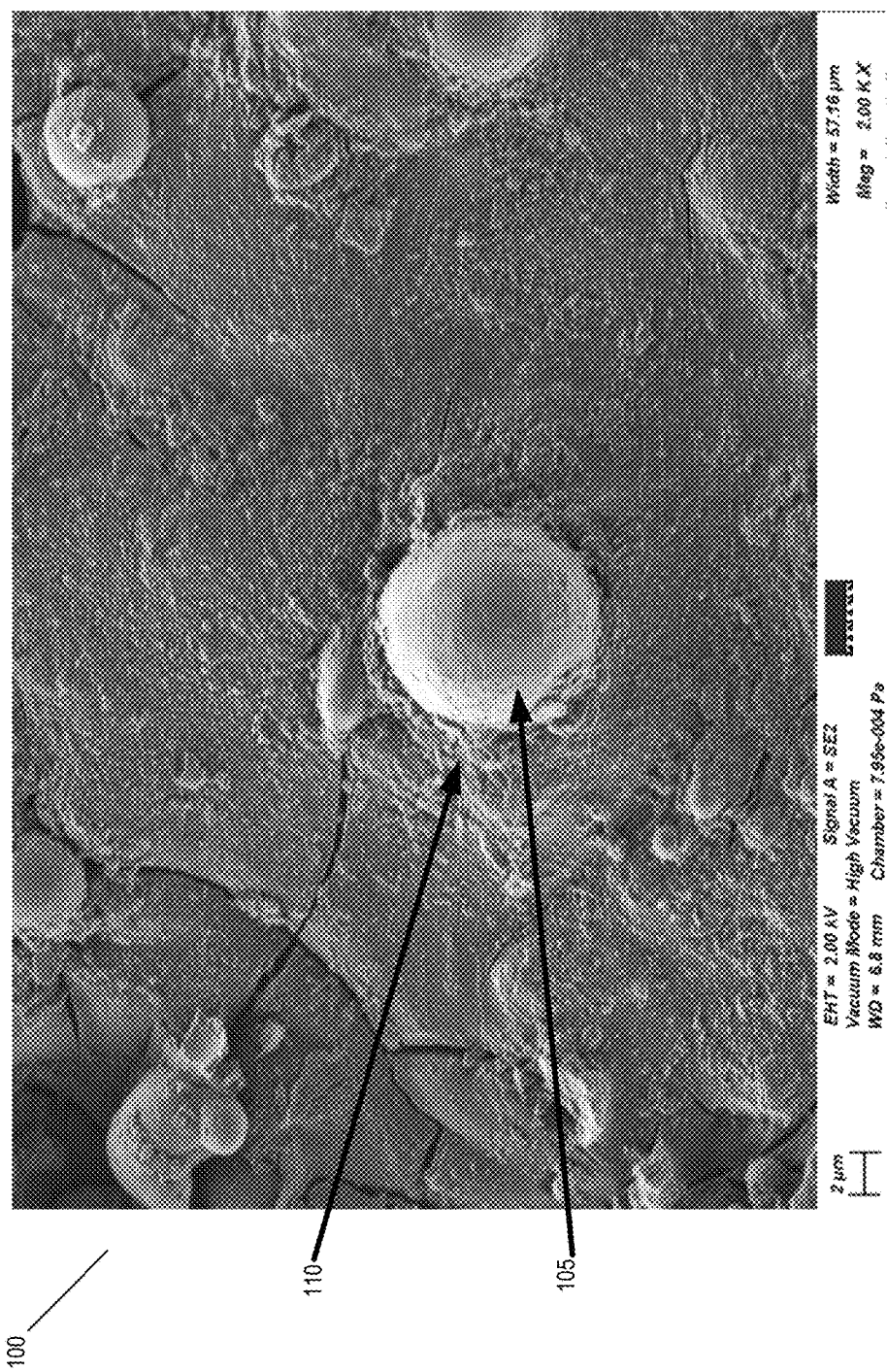
FIG. 1 is a photomicrograph showing a cross-section of a foamed inventive polyurethane composition.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

Many aspects of the disclosure can be better understood with reference to the Figures presented herewith. The Figures are intended to illustrate the various features of the present disclosure. Moreover, like references in the drawings designate corresponding parts among the several views. While several implementations may be described in connection with the included drawings, there is no intent to limit the disclosure to the implementations disclosed herein. To the contrary, the intent is to cover all alternatives, modifications, and equivalents.

Before the present disclosure is described in greater detail, it is to be understood that this disclosure is not limited to particular aspects described, and as such may, of course, vary. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

All publications and patents cited in this specification are herein incorporated by reference as if each individual publications or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publications by virtue of prior disclosure. Further, the dates of publications provided could be different from the actual publications dates that may need to be independently confirmed.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Although any methods and materials similar or equivalent to those described herein can also be used in the practice or testing of the present disclosure, the various methods and materials suitable for use with the various inventions disclosed herein are now described. Functions or constructions well-known in the art may not be described in detail for brevity and/or clarity.

Prior to describing the various aspects of the present disclosure, the following definitions are provided and should be used unless otherwise indicated. Additional terms may be defined elsewhere in the present disclosure.

General Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "an aromatic polyester polyether polyol," "a polyethylene terephthalate," or "a rigid polyurethane foam," includes, but is not limited to, two or more such aromatic polyester polyether polyols, polyethylene terephthalates, or rigid polyurethane foams, and the like.

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±20%, ±15%, ±10%, ±9%, ±8%, ±7%, ±6%, or ±5% of the specified value, e.g., about 1" refers to the range of 0.8" to 1.2", 0.8" to 1.15", 0.9" to 1.1", 0.91" to 1.09", 0.92" to 1.08", 0.93" to 1.07", 0.94" to 1.06", or 0.95" to 1.05", unless otherwise indicated or inferred. It is understood that where "about," "approximate," or "at or about" is used before a quantitative value, the parameter also includes the specific quantitative value itself, unless specifically stated otherwise.

Any ratios, concentrations, amounts, and other numerical data can be expressed herein in a range format. Such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g., the phrase "x to y" includes the range from 'x' to 'y' as well as the range greater than 'x' and less than 'y'. The range can also be expressed as an upper limit, e.g., 'about x, y, z, or less' and should be interpreted to include the specific ranges of 'about x', 'about y', and 'about z' as well as the ranges of 'less than x', 'less than y', and 'less than z'. Likewise, the phrase 'x, y, z, or greater' should be interpreted to include the specific ranges of 'about x', 'about y', and 'about z' as well as the ranges of 'greater than x', 'greater than y', and 'greater than z'. In some aspects, the term "about" can include traditional rounding according to significant figures of the numerical value. In addition, the phrase "about 'x' to 'y'" includes "about 'x' to about 'y.'"

The term "substantially" is meant to permit deviations from the descriptive term that do not negatively impact the intended purpose. All descriptive terms used herein are implicitly understood to be modified by the word "substantially," even if the descriptive term is not explicitly modified by the word "substantially."

The term "hydroxyl number" as used herein is defined as the number of milligrams of potassium hydroxide required for the complete neutralization of the hydrolysis product of a fully acetylated derivative prepared from one gram of a polyol or a mixture of polyols. The term "hydroxyl number" is also defined by the equation:

$$OHV = \frac{56.1 \times 1000 \times F}{M.W.},$$

where OHV is the hydroxyl number (of the polyol or polyol blend), F is the average functionality (i.e., the average number of active hydroxyl groups per molecule of the polyol or polyol blend), and M.W. is the average molecular weight of the polyol or polyol blend. In some implementations, ASTM 4247-16, Test A can be used.

The term "closed-cell foam," as used herein, refers to a foam that is essentially fluid impermeable because the cells are not substantially interconnected, e.g., a blown foam having a closed-cell content of about 50 volume %, 60 volume %, 70 volume %, 75 volume %, 80 volume %, 85 volume %, 90 volume %, or more, e.g., essentially 100 volume % of the cells can be closed.

As used herein, the term "effective amount" refers to an amount that is sufficient to achieve the desired modification of a physical property of the composition or material. For example, an "effective amount" of a coating on a substrate is that amount suitable to provide the desired end result, such as impact resistance, hardness, R-value, and the like.

As used herein, the terms "optional" or "optionally" means that the subsequently described event or circumstance can or cannot occur, and that the description includes instances where said event or circumstance occurs and instances where it does not.

It is understood that when non-metric or SI units are used herein, that they are in U.S.

Customary Measures, e.g., as set forth by the National Institute of Standards and Technology, Department of Commerce, United States of America in publications such as NIST HB 44, NIST HB 133, NIST SP 811, NIST SP 1038, NBS Miscellaneous Publication 214, and the like. The units in U.S. Customary Measures are understood to include equivalent dimensions in metric and other units (e.g., a dimension disclosed as "1 inch" is intended to mean an equivalent dimension of "2.5 cm"; a unit disclosed as "1 pcf" is intended to mean an equivalent dimension of 0.157 kN/m$^3$; or a unit disclosed 100° F. is intended to mean an equivalent dimension of 37.8° C.; and the like) as understood by a person of ordinary skill in the art.

Aromatic Polyester Polyether Polyols

In a first aspect, the invention comprises an aromatic polyester polyether polyol generated, in one aspect, from transesterification of polyethylene terephthalate ("PET") in a transesterification reaction conducted in the presence of a low molecular weight triol material, wherein the low molecular weight triol comprises either glycerin or trimethylolpropane, and wherein each of the glycerin or trimethylolpropane, independently, has been modified with from 1 to 9 moles of ethylene oxide according to known methodology. Yet further, each of the glycerin or trimethylolpropane, independently, has been modified with 1 or about 2 or about 3 or about 4 or about 5 or about 6 or about 7 or about 8 moles or 9 moles of ethylene oxide, wherein any value can form an upper or lower ethylene oxide modification endpoint, as appropriate. Still further, the inventive aromatic polyester polyether polyol is derived from transesterification of PET with trimethylolpropane or glycerin consisting essentially of 1 to 9 moles of ethoxylation, or, in more specific implementations, 1 or 2 or 3 or 4 or 5 or 6 or 7 or 8 or 9 moles of ethoxylation.

The inventors herein have surprisingly discovered that the use of glycerin or trimethylolpropane having the specified degree of ethoxylation, and no more or no less, provides a collection of beneficial properties in both the inventive aromatic polyester polyether polyol, as well as the generated polyurethane. The generated polyurethane can be foamed or unfoamed, and used as a coating for a substrate or as a substrate itself. Transesterification of the PET with the low molecular weight hydroxyl-containing materials of glycerin or trimethylolpropane having the specified degree of ethoxylation has been found to provide a polyol having beneficially low viscosities so as to allow both efficient workability and polyurethane reaction characteristics between and among the hydroxyls in the generated polyol materials and the reactive moieties of the isocyanate materials, as well as application efficacy onto a substrate when used as a coating.

Without being bound by theory, the inventors herein hypothesize that addition of from 1 to 9 moles of ethoxylation to either glycerin or trimethylolpropane has an effect of moving reactive hydroxyl groups out from a branching center allowing for a PET transesterification reaction to suitably occur. At about 5 to 6 moles of ethoxylation, the number of sterically hindered hydroxyl groups could be minimized to reduce interference with the transesterification reaction. At the lower amounts of ethoxylation, for example, 1, 2, 3 or 4 moles, transesterification still occurs, but to a lesser extent. However, when the generated 1, 2, 3, or 4 moles of ethoxylated glycerin or trimethylolpropane-reacted aromatic polyester polyether polyol material is reacted with isocyanate, the secondary/sterically hindered hydroxyl groups can be reacted, and thus the hindered branching center can be preserved, although some of the attachment groups may now comprise esters. As least some of the differences in the resulting polyurethane may be seen in impact resistance, with PET transesterification with triols having the lower ethoxylation amounts appearing to exhibit at least modestly lower impact resistance than polyurethanes generated from transesterification with the triols having 5 or 6 or 7 moles of ethoxylation. The inventors have observed that when triols having 5, 6, and 7 moles of ethoxylation are used, polyurethanes exhibiting increased impact resistance good surface hardness can be generated. At ethoxylation amounts of greater than 7 moles and up to 9 moles, the generated polyurethanes appear to lose some surface hardness and become more flexible, however, other desirable properties may be exhibited. The properties of polyurethanes made with the inventive aromatic polyester polyether polyols are discussed further hereinafter.

A significant aspect of the present invention comprises the ability to use at least some amount of PET that is derived from a recycled source, generally in the form of flakes or pellets, to generate at least some of the hydroxyl functionality for reaction with the isocyanate. As noted previously, there is an abundance of PET in waste streams throughout the globe. The present invention provides a heretofore unavailable use for a not insignificant amount of such waste material as a chemical feedstock to generate valuable materials, such as polyurethanes. Such recycled material can be derived from pre-consumer or post-consumer use. A common source for recycled PET is pre- or post-consumer waste streams derived from plastic bottles or other containers. Such PET can be colorless or contain dyes (e.g., green, blue, or other colors) or can be mixtures of these. A minor proportion of organic or inorganic foreign matter (e.g., paper, other plastics, glass, and metal) can be present, which can be separated out prior to the transesterification reaction. At a minimum, however, recycled PET will include at least some artifacts of the prior use. For example, for PET oligomers derived from post-consumer waste will exhibit at least some of the characteristics imparted by the processing of the PET into the product in which it was previously used, such as blow molding for bottles, stretching for fibers, etc. Thus, PET oligomers generated in the transesterification reaction will include at least some artifacts of a previous mechanical treatment, such as reduced I.V, as discussed hereinafter. Moreover, it typically would not be cost effective to remove all additives from the PET prior to use thereof, especially since colorants, UV scavengers, etc, that are typically included in a first use process for PET may position themselves between polymeric chains during the first processing step and, thus, will differ at least in this regard from an aromatic polyester polyether polyol generated from virgin raw chemical feedstock.

A desirable type of recycled PET is "flake" PET, from which many, but not all, of the common impurities present in scrap PET bottles have been removed in advance. Another desirable source of recycled PET is pelletized PET. In the present invention, at least about 5, 10, 20, 30, 40, 50, 60 or 70% or more of recycled PET can be used to generate the aromatic polyester polyether polyols. Yet further, at least some virgin PET can be used. A mixture of virgin and recycled PET can be used.

In a significant implementation of the present invention, the ethoxylated glycerin can be at least partially derived from a sustainable, or non-petroleum source, such as vegetable or animal sources. Glycerin, a simple triol, has been utilized as a functionality-enhancing additive both in neat form and in an ethoxylated form in either the PET depolymerization process or post-depolymerization process to synthesize aromatic polyester polyols for polyurethane foam applications, but there is no indication that this material having the specified ethoxylation amount of 1 to 9 moles has been used in as the sole or primary transesterification material for PET. In this regard, when ethoxylated glycerin is utilized in the transesterfication reaction, the reaction vessel comprises substantially no other material that can participate in the transesterification reaction at the start thereof.

Yet further, upcycled glycerol from biodiesel manufacture can be used to further improve the environmental profile of the polyurethanes herein. As would be recognized, glycerol is a major byproduct in the biodiesel manufacturing process. In general, for every 100 pounds of biodiesel produced, approximately 10 pounds of crude glycerol are created. As the biodiesel industry is rapidly expanding, a glut of crude glycerol is being created, and use of such waste to make the inventive aromatic polyester polyether polyols can be beneficial.

In further implementations, at least some of the inventive polyol can be generated by reaction of terephthalic acid in the presence of the specifically modified glycerin or trimethylolpropane as discussed herein above to provide an aromatic polyester polyether polyol directly from raw materials, as opposed to being generated from glycolysis of PET in a transesterification process.

In some aspects, the aromatic polyester polyether polyols of the present invention comprise substantially no imide groups. Yet further, the aromatic polyester polyether polyols of the present invention have essentially no acid groups that can react with an isocyanate containing material. In this regard, the aromatic polyester polyether polyols of the present invention have an acid value of less than about 1.0 or 0.5, or 0.1 mg KOH/g. Still further, substantially all isocyanate reactive groups on the aromatic polyester polyether polyols are comprised of hydroxyl groups. In further aspects, the aromatic polyester polyether polyols comprise essentially no aldehyde groups. The aromatic polyester polyether polyols suitable for use in the present invention exhibit substantial moisture stability. In this regard, the prevalence of aromatic ester groups in the inventive polyol can reduce the reactivity with water in the generated polyurethane, at least because aromatic ester groups are substantially more resistant to hydrolysis.

In some aspects, it can be beneficial to ensure that the PET being used to generate the inventive polyols is substantially free of metal additives. In this regard, the metallic content of the PETs can be less than about 1% or less than about 0.1% or less than about 0.01%. Still further, the PETs used herein can be derived from a source of PET that contains no metallic additives, exclusive of the catalyst used to generate the PET.

The amount of PET used in the transesterification reaction, on a weight percentage of the total amount of material in the reaction, can be from about 5% to about 50%, from about 10 to about 35%, or from about 15 to about 30%. Still further, the amount of PET used in the transesterification reaction is about 5, 10, 15, 20, 30, 35, 40, 45, 50, 55, 60 or 65% by weight, where any value can form an upper or lower endpoint, as appropriate. Yet further, the amount of PET used in the transesterification reaction is no more than 65% by weight. Accordingly, the amount of ethoxylated triol present in the transesterification reaction can be in the amount needed to add up to 100% by weight. (Note that the catalyst, if any, may not be incorporated in the weight percent calculations.) Still further, the ratio of PET to ethoxylated triol having from 1 to 9 moles of ethoxylation can be about 10:90, 20:80, 30:70; 40:60, 50:50, or 60:40. As noted, at least some of the PET used can be from a recycled source.

In one example methodology for the transesterification reaction, the PET and glycerin or trimethylolpropane having the specified degree of ethoxylation are heated, optionally in the presence of a catalyst, to give one or more intermediates comprising a polyol and a terephthalate-containing hydroxyl functional component. The reaction vessel can be charged at the start of the transesterification reaction with substantially only the following ingredients: PET, glycerin or trimethylolpropane having the specified degree of ethoxylation and, optionally, catalyst. Once the transesterification reaction is underway, glycols present in the reaction vessel may include the ethoxylated glycerin or trimethylolpropane and ethylene glycol generated from glycolysis of the PET. Heating is advantageously performed at temperatures of from about 160° C. to about 260° C., or from about 180° C. to about 240° C. Yet further, heating can be at from about 160, 180, 200, 220, 240, 260, 280, or 300° C., where any value can form an upper or lower endpoint, as appropriate.

Transesterification catalysts, if used, suitable for use herein include titanium, zinc, antimony, germanium, zirconium, manganese, or other metals. Specific examples include titanium alkoxides (e.g., tetrapropyl titanate), titanium(IV) phosphate, zirconium alkoxides, zinc acetate, lead acetate, cobalt acetate, manganese(II) acetate, antimony trioxide, germanium oxide, or the like, and mixtures thereof. Catalysts that do not significantly promote isocyanate reaction chemistries can be advantageously used. The amount of catalyst used is typically from about 0.005 to about 5 wt. %, or from about 0.01 to about 1 wt. % or from about 0.02 to about 0.7 wt. %, based on the total amount of polyol being prepared. In some implementations, the catalyst may be omitted, such as when recycled PET is used. In this situation, residual catalyst in the PET can operate as the catalyst for the transesterification reaction.

The aromatic polyester polyether polyol preparation procedure is a notable feature of the present invention, at least in respect to the relatively low viscosities generated from the transesterification process, namely a Brookfield Cone and Plate Viscosity of 5 Poise or less (spindle #4, 60° C., 100 rpm). In this regard, and as set forth in the Examples hereinafter, the ethoxylated glycerin or trimethylolpropane having the specified degree of ethoxylation of 1 to 9 moles is heated in a 250 ml flask with PET to allow the mixture in the reaction vessel to reach at least about 220° C. or about 230° C. after about 45, or 60, or 90, or 120 minutes. When this temperature is reached, the reaction mixture can be examined to determine the whether the transesterification reaction is suitably underway to generate the inventive aromatic polyester polyether polyol. To this end, several drops of the PET/ethoxylated triol material in the reaction vessel can be placed on a clean dry surface. If the mixture shows a cloudy appearance on the surface after 10 minutes, an indication that the PET has not been suitably transesterified will be generated, and the reaction can be allowed to continue, and additional testing can be conducted at 10 minute increments. This is termed the "Clear Pill Test." Heating of the reaction vessel can be continued while the one or more Clear Pill Tests is being conducted. When the removed PET/ethoxylated material remains clear on the plate for about 10 minutes, a first Brookfield Cone and Plate Viscosity of the PET/ethoxylated trio material in the reaction vessel can be generated. For PET transesterified with ethoxylated glycerin, the first viscosity can be from about 2.7 to about 3.2 Poise (spindle #4, 60° C., 100 rpm). For PET transesterified with ethoxylated trimethylolpropane, the first tested Brookfield Cone and Plate Viscosity can be from about 3.7 to about 4.2 Poise (spindle #4, 60° C., 100 rpm). This first tested Brookfield Cone and Plate Viscosity is an indication that the transesterification reaction is suitably ongoing, and the reaction can be stopped at that point. Alternatively, the reaction vessel can be allowed to remain under heat for about 10, or about 15, or about 30 more minutes to obtain a second Brookfield Cone and Plate Viscosity. A suitable aromatic polyester polyether polyol for use will exhibit a second Brookfield Cone and Plate Viscosity can be generated of about 3.2 to about 3.8 Poise (spindle #4, 60° C., 100 rpm) for an inventive polyol generated from ethoxylated glycerin, and from about 4.0 to about 5.0 Poise (spindle #4, 60° C., 100 rpm) for an inventive polyol generated from ethoxylated trimethylolpropane.

In this regard, the heating of ethoxylated glycerin or ethoxylated trimethylolpropane, wherein each have the specified degree of ethoxylation, in the presence of PET in accordance with the inventive procedure generates a specific aromatic polyester polyether polyol end product. Notably, the ability to characterize the product of the transesterification reaction in relation to a beneficial viscosity range that indicates the suitable generation of the inventive polyols (and the end of the transesterification reaction) provides a relatively simple process for use in varied downstream processes.

While the above description is relevant to a small, bench scale operation, with small volumes of reactants. It would be appreciated that larger volumes of reactants would be appropriate for commercial uses. In this regard, variations in the reaction conditions may be appropriate. Nonetheless, the use of the relatively simple tests of whether a "Clear Pill" and whether the first and second viscosity tests that indicate the generation of the inventive aromatic polyester polyether polyol can remove uncertainties that often result from scaling up for commercial use.

Moreover, differences in the Intrinsic Viscosity ("I.V.") of the PET may result in variations in the aromatic polyester polyether polyol generated from the transesterification reaction. As would be appreciated, I.V. is a measure of the polymers molecular weight and therefore reflects the material's melting point, crystallinity and tensile strength. It would be appreciated that heating of PET, as occurs when a PET is processed into products, may result in a lower I.V. for a recycled PET as compared to the I.V. for that same PET that is generated from a virgin source. As such, an aromatic polyester polyether polyol generated at all or in part from a recycled PET source may trend toward the lower ends of the respective viscosity ranges. Such variations can readily be determined by one of ordinary skill in the art.

In accordance with the transesterification process of the present invention, the aromatic polyester polyether polyols can be characterized in a number of manners.

In a first characterization, the aromatic polyester polyether polyols comprise branched polyols suitable for reaction with isocyanate, wherein the polyols are prepared via transesterification of a glycerin or trimethylolpropane having 1 to 9 moles of ethoxylation with PET with the first reaction product resulting in terephthalate moieties reacted to a flexible branching center. Ethoxylated glycerin or trimethylolpropane are hypothesized to "activate" the terminal hydroxyl groups on these triols for chain insertion in the PET during the transesterification reaction.

In a further characterization, the invention comprises aromatic polyester polyether polyols that are the reaction product of an ethylene oxide modified glycerin or trimethylolpropane having a degree of ethoxylation of 1 to 9 moles with polyethylene terephthalate through transesterfication, wherein the reaction is judged to be substantially completed when the material in the reaction vessel has a viscosity characteristic(s) as set out hereinabove. In this regard, the product of the transesterfication process would appear to be a mixture of different molecular weight PET-related materials therein. The inventors hypothesize that the clarity of the materials at this stage may conform to a mixture of materials having about 6-7 PET chain length, but they could also be shorter or longer, where such chain lengths can be confirmed by Differential Scanning Calorimetry, Gel Permeation Chromatography, or any other suitable analytical technique.

The aromatic polyester polyether polyols derived from the referenced transesterification reaction can further be characterized as an oligomeric mixture of branched, hydroxyl terminated moieties prepared by the transesterification of PET with an ethylene oxide modified glycerin and trimethylolpropane having 1 to 9 moles of ethoxylation, having one or more viscosity characteristics as described hereinabove.

Yet further, the aromatic polyester polyether polyols can be characterized as a mixture of terephthalate esters prepared by the transesterfication of PET with an ethylene oxide modified glycerin or trimethylolpropane having 1 to 9 moles of ethoxylation, having one or more viscosity characteristics as described hereinabove.

In various aspects, a disclosed aromatic polyester polyether polyol has a structure based on a glycerol backbone, the structure represented by a formula:

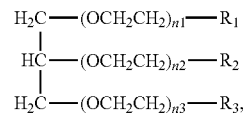

wherein each of $R_1$, $R_2$, and $R_3$ is independently selected from hydroxyl and a structure represented by a formula:

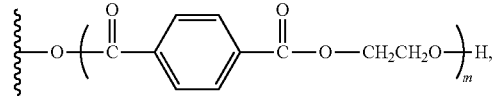

wherein m has a value such that the aromatic polyester polyether polyol has a first Brookfield Cone and Plate Viscosity of about 2.7 to about 3.2 Poise (Spindle #4, 60° C., 100 rpm); wherein the first Brookfield Cone and Plate Viscosity is as defined herein above; and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9.

In various aspects, the disclosed aromatic polyester polyether polyols have a structure based on a glycerol backbone, the structure represented by a formula:

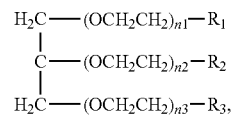

wherein each of $R_1$, $R_2$, and $R_3$ is independently selected from hydroxyl and a structure represented by a formula:

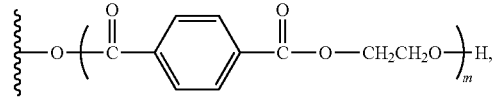

wherein m has a value such that the aromatic polyester polyether polyol has a second Brookfield Cone and Plate Viscosity of about 3.2 to about 3.8 Poise (Spindle #4, 60° C., 100 rpm); wherein the second Brookfield Cone and Plate Viscosity is as defined herein above; and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9.

In a further aspect, a disclosed aromatic polyester polyether polyols can have a structure based on a glycerol backbone, the structure represented by a formula:

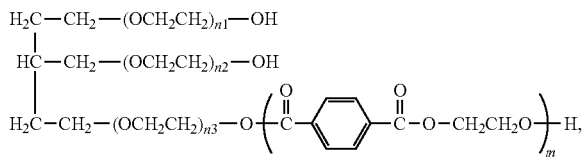

wherein m, $n_1$, $n_2$, and $n_3$ having the meaning as specified herein.

In a further aspect, a disclosed aromatic polyester polyether polyols can have a structure based on a glycerol backbone, the structure represented by a formula:

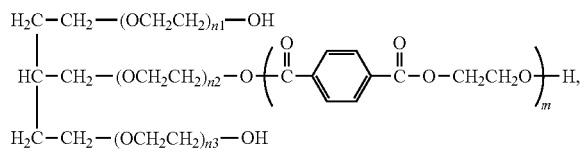

wherein m, $n_1$, $n_2$, and $n_3$ having the meaning as specified herein.

In a further aspect, a disclosed aromatic polyester polyether polyols can have a structure based on a glycerol backbone, the structure represented by a formula:

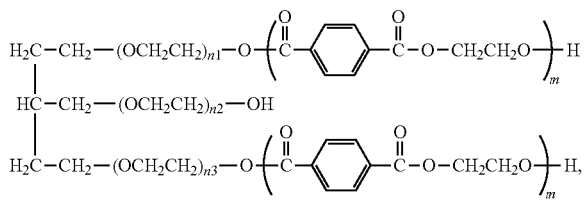

wherein m, $n_1$, $n_2$, and $n_3$ having the meaning as specified herein; and wherein the value of each occurrence of m can vary independently from another occurrence of m.

In a further aspect, a disclosed aromatic polyester polyether polyols can have a structure based on a glycerol backbone, the structure represented by a formula:

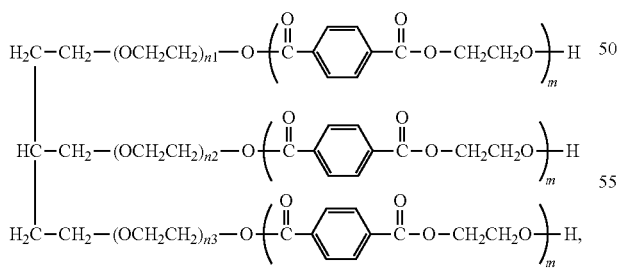

wherein m, $n_1$, $n_2$, and $n_3$ having the meaning as specified herein; and wherein the value of each occurrence of m can vary independently from another occurrence of m.

In various aspects, the disclosed aromatic polyester polyether polyols have a structure based on a trimethylolpropane (or alternatively referred to herein as "TMP") backbone, the structure represented by a formula:

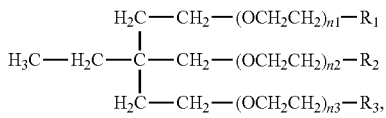

wherein each of $R_1$, $R_2$, and $R_3$ is independently selected from hydroxyl and a structure represented by a formula:

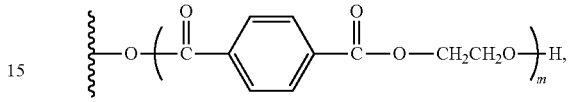

wherein m has a value such that the aromatic polyester polyether polyol has a first Brookfield Cone and Plate Viscosity of about 3.7 to about 4.2 Poise (Spindle #4, 60° C., 100 rpm); wherein the first Brookfield Cone and Plate Viscosity is as defined herein above; and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9.

In various aspects, the disclosed aromatic polyester polyether polyols have a structure based on a TMP backbone, the structure represented by a formula:

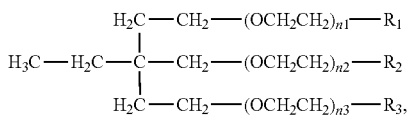

wherein each of $R_1$, $R_2$, and $R_3$ is independently selected from hydroxyl and a structure represented by a formula:

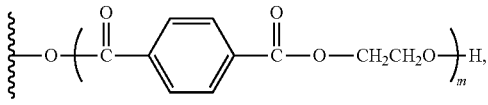

wherein m has a value such that the aromatic polyester polyether polyol has a second Brookfield Cone and Plate Viscosity of about 4.0 to about 5.0 Poise (Spindle #4, 60° C., 100 rpm); wherein the second Brookfield Cone and Plate Viscosity is as defined herein above; and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9.

In a further aspect, a disclosed aromatic polyester polyether polyols can have a structure based on a TMP backbone, the structure represented by a formula:

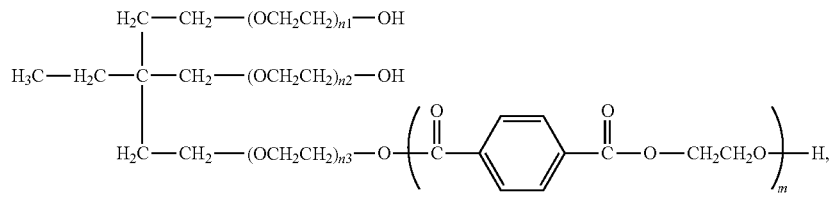

wherein m, $n_1$, $n_2$, and $n_3$ having the meaning as specified herein.

In a further aspect, a disclosed aromatic polyester polyether polyols can have a structure based on a TMP backbone, the structure represented by a formula:

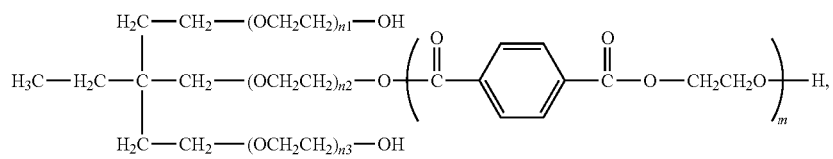

wherein m, $n_1$, $n_2$, and $n_3$ having the meaning as specified herein.

In a further aspect, a disclosed aromatic polyester polyether polyols can have a structure based on a TMP backbone, the structure represented by a formula:

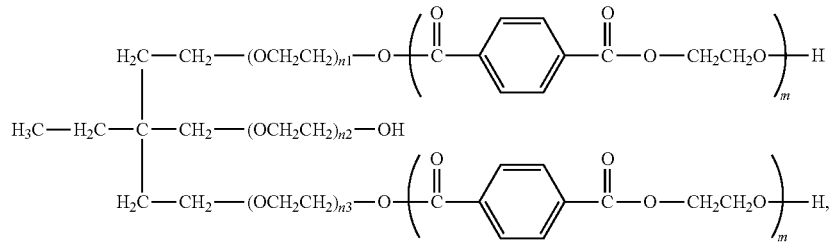

wherein m, $n_1$, $n_2$, and $n_3$ having the meaning as specified herein; and wherein the value of each occurrence of m can vary independently from another occurrence of m.

In a further aspect, a disclosed aromatic polyester polyether polyols can have a structure based on a TMP backbone, the structure represented by a formula:

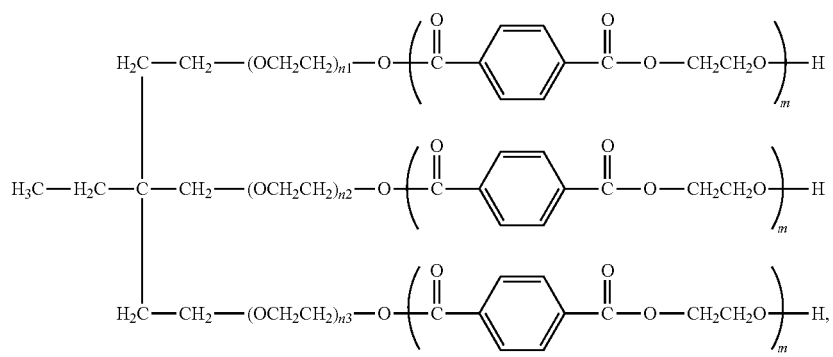

wherein m, $n_1$, $n_2$, and $n_3$ having the meaning as specified herein; and wherein the value of each occurrence of m can vary independently from another occurrence of m.

Still further, a measured hydroxyl number for the generated polyol can be a function of not only the aromatic polyester polyether polyol (which can be a mixture of hydroxyl-functional PET oligomers), but also of other measurable hydroxyl functionality of ethylene glycol that may be present in the reaction vessel. If ethylene glycol is substantially removed from the reaction vessel or a hydroxyl functional material is added to the reaction vessel, a measured hydroxyl number will substantially be a function of the total amount of measurable hydroxyl functionality present in the composition from the PET oligomers.

In yet a further characterization, the present invention comprises a composition that comprises a material conforming to the above referenced formulas, wherein the composition can comprise at least some ethylene glycol that is generated in the transesterification reaction.

Still further, the vessel is substantially not pressurized during the transesterification process, and no condensation apparatus need be used. As would be recognized, such a process can greatly simplify the aromatic polyester polyether polyols manufacturing process: the minimum steps that are required include placing the appropriate amounts of PET and ethoxylated material in a reaction vessel or "pot" and heating the mixture with stirring for the appropriate time. The cooking process of the present invention is therefore very simple. In this regard, in some implementations, the aromatic polyester polyether polyols of the present invention can comprise at least some free ethylene glycol therein at the end of the process. Such ethylene glycol can then be available to react with the isocyanate. Without being bound by theory, it is hypothesized that, even though the transesterification reaction is conducted at a temperature above which ethylene glycol boils (e.g., 197° C.), this material may not effectively boil off under the conditions of the reaction, and therefore at least some may remain in the reaction vessel during the transesterification, as well as afterwards. To this end, it is believed that, in some implementations, there is at least some ethylene glycol present in the aromatic polyester polyether polyols at the completion of the transesterification reaction.

In some implementations, such as during or subsequent to the transesterification of the PET, ethylene glycol can be removed from the reaction vessel prior to use of the aromatic polyester polyether polyols to generate the polyurethane materials discussed hereinafter. The transesterification reaction is generally conducted at a higher temperature than at which ethylene glycol boils (e.g., 197° C.), accordingly some ethylene glycol will be boiled off during the transesterification reaction. Removal at least some of the ethylene glycol from the transesterification reaction environment, either during or after completion, has been observed to allow harder coatings to be generated for the polyurethane, perhaps due to the lower hydroxyl content present in the generated polyols. In some aspects, the amount of ethylene glycol present in the aromatic polyester polyether polyol provided for use can be below about 2% or below about 1%. If removed, ethylene glycol can be removed from the polyol component using known methods. For example, an overhead condenser can be used to remove ethylene glycol and water that can be present in the PET. A nitrogen purge or sparge may be applied to remove ethylene glycol. If a higher molecular weight aromatic polyester polyether polyol is desired, more ethylene glycol can be removed, for example.

It has been observed that use of an increase in the amount of PET in the transesterification reaction can result in a lower hydroxyl number for the inventive aromatic polyester polyether polyols, whereas a lower amount of PET can result in a higher hydroxyl number. It has further been observed that an increase in PET amount can result in a higher viscosity for the aromatic polyester polyether polyols, however, such higher viscosities can be managed with slight heating prior to use, as discussed elsewhere herein.

The inventive aromatic polyester polyether polyols can further be differentiated because they are flowable liquids at temperatures below about 40° C., or about 50° C., or about 60° C., or about 70° C., or about 80° C. In other implementations, the inventive aromatic polyester polyether polyols are advantageously flowable liquids under ambient or slightly elevated conditions, which is a distinct advantage for formulating polyurethanes.

As would be recognized, the viscosity of the polyols can vary as function of the molecular weight, with the greater the degree of transesterification/depolymerization typically being associated with lower viscosities. In this regard, the transesterification process can be terminated when the viscosity of the aromatic polyester polyether polyol is observed to be from about 3.0 to about 6.0, or from about 4.0 to about 5.5, or from about 4.5 to about 5.0 Poise, as measured by a Cone and Plate Brookfield viscometer at 100 rpm using at 60° C. using spindle #4, or at about 70° C. if the aromatic polyester polyether polyols is too viscous at 60° C., such as was seen with 50% PET/50% glycerin having 2 moles of ethoxylation, for example. Yet further, the viscosity of the aromatic polyester polyether polyol when the transesterification reaction is terminated can be about 2.0, 2.5, 3.0, 3.5, 4.0, 4.5, 5.0, 5.5, 6.0, 6.5, 7.0, 7.5 or 8.0 Poise, as measured by the stated Brookfield parameters, where any value can be used as an upper or lower endpoint as appropriate.

At the very least, this viscosity property is a surprising improvement in relation to aromatic polyester polyether polyols in the prior art in that certain properties present with this type of polyol (e.g., enhanced flame retardance) can be leveraged to generate polyurethane materials having useful properties substantially without the need to heat the polyols above about 70° C. and/or add viscosity modifiers to make them workable under the conditions of use. Moreover, when recycled PET and ethoxylated glycerin is used, the present invention generates polyurethanes that have heretofore unrealized "green" characteristics.

When prepared from recycled PET, the aromatic polyester polyether polyol may comprise fillers, colorants, etc. that were not removed previously. Accordingly, in some aspects, the aromatic polyester polyether polyol can be treated with a decolorizing agent and/or be subjected to a filtering step. Such methodologies are well-known to those of skill in the art. Alternatively, the native color of the aromatic polyester polyether polyol can be left in therein, which will result in the finished polyurethane having a "muddy" color, for example. Such color is typically irrelevant when the polyurethane is used on an interior surface. However, when the polyurethane is used on an exterior/visible surface, the polyurethane is tintable or it can be painted, as further discussed herein.

The inventive aromatic polyester polyether polyols can be used substantially immediately after generation, or they can be stored, transported etc. In this regard, the aromatic polyester polyether polyols are storage stable when kept in substantially air tight and light proof containers.

Such storage stability is exhibited, for example, at least in the form of the viscosities set out hereinabove.

Additives can be added to the aromatic polyester polyether polyols substantially after completion of the PET transesterification—that is, when the target viscosity characteristics are obtained—and prior to reaction with the isocyanate material, as would be appreciated by those of ordinary skill in the art. In this regard, the polyol component may also comprise a silicone-containing material, such as a silicone surfactant. Typically, silicone surfactants can be included to moderate cell size and shape of a foam comprising the reaction product of the inventive aromatic polyester polyether polyol and the isocyanate component. If utilized, the silicone surfactant may be utilized in an amount of from about 0.1 to about 10, about 0.5 to about 9, about 1 to about 8, or about 2 to about 7, parts by weight, each based on 100 parts by weight of the inventive aromatic polyester polyether polyol.

The inventive aromatic polyester polyether polyol may also comprise a plasticizer added after the generation of the polyol from the transesterification process. It is believed that the plasticizer can reduce cracking of the rigid foam by softening the rigid foam thereby permitting $CO_2$ to escape from the rigid foam. In various aspects, the plasticizer can comprise longer chain polyethylene glycols, such as PEG 400, for example. If utilized, the plasticizer may be utilized in an amount of from about 1 to about 50, about 1 to about 25, about 1 to about 15, about 1 to about 10, or about 3 to about 7, parts by weight, each based on 100 parts by weight of the inventive aromatic polyester polyether polyol.

The inventive aromatic polyester polyether polyol can incorporate a chain extender, wherein the chain extender is added after the substantial completion of the PET transesterification step. It is believed that the chain extender may reduce creeping of the rigid foam. Chain extenders contemplated for use in the present invention include, but not limited to, hydrazine, primary and secondary diamines, alcohols, amino acids, hydroxy acids, glycols, and combinations thereof. Specific chain extenders that are contemplated for use include, but are not limited to, mono and di-ethylene glycols, mono and di-propylene glycols, 1,4-butane diol, 1,3-butane diol, propylene glycol, dipropylene glycol, diethylene glycol, methyl propylene diol, mono, di and tri-ethanolamines, N—N'-bis-(2 hydroxy-propylaniline), trimethylolpropane, glycerine, hydroquinone bis(2-hydroxyethyl) ether, 4,4'-methylene-bis(2-chloroaniline), diethyltoluenediamine, 3,5-dimethylthio-toluenediamine, hydrazine, isophorone diamine, adipic acid, silanes, and combinations thereof. In various aspects, the chain extender comprises (or is) dipropylene glycol. If utilized, the chain extender may be utilized in an amount of from about 0.1 to about 20, about 1 to about 15, about 1 to about 13, or about 2 to about 12, parts by weight, each based on 100 parts by weight of the inventive aromatic polyester polyether polyol. Glycerin or trimethylolpropane, including ethoxylated versions thereof, can also be used as modifiers of the inventive aromatic polyester polyether polyols after the completion of the transesterification reaction.

Isocyanates

The isocyanate with which the inventive aromatic polyester polyether polyol is reacted to generate the inventive polyurethane can comprise one or more of a variety of diisocyanates. An exemplary diisocyanate monomer can include toluene diisocyanate, m-phenylene diisocyanate, p-phenylene diisocyanate, xylene diisocyanate, 4,4'-diphenylmethane diisocyanate, hexamethylene diisocyanate, isophorone diisocyanate, polymethylene polyphenyl diisocyanate, 3,3'-dimethyl-4,4'-biphenylene diisocyanate, 3,3'-dimethyl-4,4'-diphenylmethane diisocyanate, 3,3'-dichloro-4,4'-biphenylene diisocyanate, or 1,5-naphthalene diisocyanate; their modified products, for instance, carbodiimide-modified products; or the like, or any combination thereof. Such diisocyanate monomers can be used alone or in admixture of at least two kinds. In a particular example, the isocyanate component can include methylene diphenyl diisocyanate (MDI), toluene diisocyanate (TDI), hexamethylene diisocyanate (HDI), isophorone diisocyanate (IPDI), or any combination thereof. In an example, the isocyanate can include methylene diphenyl diisocyanate (MDI) or toluene diisocyanate (TDI). In particular, the isocyanate includes methylene diphenyl diisocyanate (MDI) or derivatives thereof.

The diisocyanate can have an average functionality in a range of about 2.0 to 2.9, such as a functionality of from about 2.0 to about 2.7. Further, the diisocyanate can have an NCO content in the range of from about 15% to about 35%, such from about 20% to about 30%.

In one aspect, the isocyanate component can be methylene diphenyl diisocyanate (MDI). Yet further, the isocyanate component consists essentially of MDI. In a further example, a diisocyanate can include a mixture of diisocyanates, such as a mixture of modified methylene diphenyl diisocyanates. A suitable MDI for use in the invention herein is PAPI™ 27 (Dow Chemical, Midland, Mich.), a polymeric MDI (methylene biphenyl diisocyanate) with 31.4% NCO.

Polyurethane Compositions

As would be recognized, polyurethanes are made by the exothermic reactions between materials with two or more reactive hydroxyl (—OH) groups per molecule (diols, triols, polyols), such as the disclosed aromatic polyester polyether polyols, and isocyanates that have more than one reactive isocyanate group (—NCO) per molecule (diisocyanates, polyisocyanates). For example, a diisocyanate reacts with a diol:

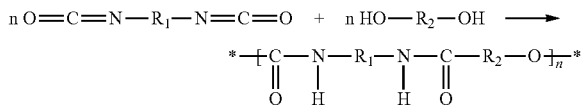

To generate a polyurethane, it is necessary to mix the right amounts of the two major components (polyisocyanate and polyol), which are liquids under reaction conditions. Heating may thus be required in use. The reaction starts almost immediately and generates the solid polymer upon completion of curing. As the reaction progresses, the polyol-isocyanate mixture begins to gel in a manner that, if comprised of reactants with the appropriate characteristics, can allow strong adhesive bonds to be formed in a cure in place operation. Completion of curing may require the material to be allowed to set for minutes, hours, or a few days, depending on the conditions under which the curing occurs.

The cured polyurethane composition coating can be foamed or unfoamed. When producing a foamed polyurethane, there are multiple ways to generate a gas inside the reacting liquid mixture. The so called "chemical blowing agent" uses water that may have been added to the polyol that reacts with some of the polyisocyanate to create carbon dioxide:

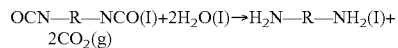

Alternatively, in use of a "physical blowing agent," a liquid with a low boiling point, for example pentane, is mixed into the polyol. The urethane reaction is exothermic and so, as it proceeds, the mixture warms up and the pentane vaporizes. A small amount of air is dispersed through the mixture of polyisocyanate and polyol. This provides nucleation seeds for the multitude of gas bubbles that are produced throughout the polymer. Heat makes the bubbles expand until the polyurethane chemical reaction changes the liquid to solid polymer, and the available gas pressure cannot create any further expansion. Microspheres that incorporate gas can also be used. Such blowing agents are discussed further hereinafter.

Generation of inventive polyurethane composition can be via mechanical impingement spray of each of the inventive aromatic polyester polyether polyol component and the isocyanate components, as well as any additives, where such components are discussed further hereinafter. Still further, polyurethane generation can be by dynamic mixing methodologies, pouring into or onto a mold, pultrusion, or other suitable methodologies, as appropriate for a specific implementation.

In one aspect, the present invention comprises a polyurethane derived from an aromatic polyester polyether polyol where the polyurethane exhibits strong adhesion in an in situ polymerization process—that is, is cured-in-place—to a number of surface configurations, as discussed in more detail hereinafter When fully cured-in-place on a substrate surface, the adhesive strength of the polyurethane composition is such that, for a number of substrates, the adhesive bond between the substrate and the cured-in-place polyurethane coating is greater than the internal strength of the substrate itself. In this regard, the internal bonds in the substrate itself will break or fracture before the adhesive bond fails between the substrate and the polyurethane. For example, when cured-in-place on a wooden board and a pulling force is applied to attempt to separate the polyurethane from the substrate, the wood itself will break apart, and therefore fail, before the polyurethane adhesive coating pulls away from the surface of the board.

In this regard, the inventive aromatic polyester polyether polyols are believed by the inventors herein to provide surprisingly efficient wetting to a wide variety of surfaces relevant to a number of industries and applications. Without being bound by theory, it is believed that at least some of this wettability is conferred by at least the terephthalic moieties in the PET. This can, in turn, increase the overall contact of the polyol on a surface prior to substantial gelling of the aromatic polyester polyether polyolisocyanate mixture on the substrate surface, as well as prior to substantial completion of the curing which, in turn, improves the adhesion of the cured-in-place polyurethanes to the substrates.

The inventors have determined that, when cured-in-place on a substrate, the fully cured inventive polyurethane composition exhibits a surface hardness, which can be termed "impact resistance," that is surprising for a polyurethane coating that also exhibits strong adhesion to substrates. Indeed, the cured-in-place polyurethane coatings provide a surprising amount of structural strength to a variety of useful materials, as shown in the Examples hereinafter.

In a further aspect, the invention comprises useful materials derived from the inventive polyurethane compositions. In this regard, the inventive polyurethane materials exhibit exceptional mechanical properties as compared to prior art counterparts. For example, whether used as a coating on a substrate or to generate useful materials, the cured polyurethane composition exhibits a high degree of Shore D hardness, abrasion resistance, and impact resistance. The inventive adhesive polyurethane compositions also exhibit a significant degree of screw and nail retention, thereby making them desirable for use in construction and building applications, as discussed further herein. The thermal behavior of the inventive polyurethane compositions is excellent, at least because of the presence of aromatic functionality therein.

Still further, the polyurethane compositions are paintable or tintable. The compositions also can be texturized, embossed or the like. As such, the inventive compositions can impart decorative effects to building surfaces coated therewith.

Additives that can be added to the inventive aromatic polyester polyether polyol after the substantial completion of the PET transesterification step but before the addition of isocyanate to generate the polyurethane can include, but are not limited to, chain terminators, inert diluents, amines, anti-foaming agents, air releasing agents, wetting agents, surface modifiers, waxes, inert inorganic fillers, molecular sieves, reactive inorganic fillers, non-reactive fillers (e.g., flyash, mica, pigments, wood particles), chopped glass, glass fibers, steel wool, steel shavings, processing additives, surface-active agents, adhesion promoters, anti-oxidants, dyes, pigments, ultraviolet light stabilizers, thixotropic agents, anti-aging agents, lubricants, coupling agents, solvents, rheology promoters, anti-oxidants, anti-UV agents, colorants, and combinations thereof. Additives may be utilized in amounts that can be determined by one of ordinary skill in the art according to formulation principles associated with the coatings and foams herein.

As noted, polyurethane materials of the invention herein can be formulated with materials derived, at least in part, from renewable and/or recyclable/sustainable content. In this regard, "renewable" or "sustainable" refers to matter that is provided by natural processes or sources. The total recycled and/or renewable/sustainable content of the polyurethane component (based on the polyols and isocyanates, which in some implementations, may include filler materials) can be greater than about 5%, or about 10%, or about 15%, or about 20%, or about 25%, or about 30%, or about 35%, or about 40%, or about 45%, or about 50% based on the total weight of polyurethane composition on a weight % basis. Such renewable/sustainable material can be derived from the aromatic polyester polyether polyol component, glycerin and/or from the use of filler materials. The total recycled and/or renewable/sustainable content in the inventive polyurethane can comprise a range that can be defined by selection of two of the referenced percentages.

Further description of the polyurethane materials, implementations, and applications are described in detail hereinafter.

The polyurethane composition is the reaction product between the inventive aromatic polyester polyether polyol and an isocyanate component. Significantly, upon mixing of the two components, optionally in the presence of additional materials, the polyurethane composition is cured-in-place on a substrate to generate a strong adhesion to a variety of material types, as set out herein. The resulting polyurethane composition can be unfoamed or foamed upon application to the substrate. When unfoamed, the composition comprises the inventive aromatic polyester polyether polyol, a catalyst incorporated into the polyol, and an isocyanate. When foamed, the composition further can comprise an added blowing agent. Alternatively, foam can be generated through application mechanics, such as by mixing to incorporate air or water from a nozzle or the like.

The catalyst used to accelerate the reaction between the polyol and the isocyanate can include an organometallic catalyst, an amine catalyst, or a combination thereof. An organometallic catalyst, for example, can include dibutyltin dilaurate, a lithium carboxylate, tetrabutyl titanate, a bismuth carboxylate, or any combination thereof.

The amount of inventive polyol to isocyanate can vary according to the amount of hydroxyl functionality available to react with the isocyanate moieties. In regards to the inventive aromatic polyester polyether polyols, higher ethoxylation levels on the trimethylolpropane and the glycerin can result in a lower amount of hydroxyl functionality. It should be appreciated that the measured hydroxyl functionality in a given inventive polyol material may be indicative of both PET-containing hydroxyl moieties, as well as any hydroxyl moieties contributed by other materials, such as ethylene glycol generated in the transesterification reaction that was not removed, for example. For the 5 moles of ethoxylation example, the amount of aromatic polyester polyether polyol to isocyanate can be from about 1:1 or about 0.95:1 or about 1:0.95 on a volume:volume ratio of reactive moieties in each component. The amount of materials as a function of hydroxyl functionality and isocyanate functionality can readily be determined by one of skill in the art. As would be recognized, additives that can be added to either the polyol or isocyanate can result in a variation of the volume ratios to generate the appropriate reaction ratios, and such variations can be determined by one of ordinary skill in the art.

The polyurethane composition can be prepared by either the "one-shot" or the "prepolymer" approach. In the former, all ingredients are mixed simultaneously, along with catalysts, foaming agents, fillers, plasticizer, and cured-in-place on the substrate or, for the building materials, in a mold, sprayed via a dynamic mixer, on a pultrusion line, etc. Such systems are generally of two components, consisting of an A component, being the di- or polyisocyanate, and a B component, being the polyol(s) with any other desired active hydrogen material, catalyst(s) and any other ingredients. In the prepolymer approach, an isocyanate-terminated prepolymer is first prepared by reacting excess diisocyanate with a polyol. The curing involves the reaction of the prepolymer (A component) with a chain extender (B component), which will comprise the aromatic polyester polyether polyol of the invention. The prepolymer approach can be useful when the polyurethane composition is being generated in the field or on a job site, as this method can provide a more controlled reaction/curing process, for example.

As indicated, a significant feature of the present invention is the strong adhesion generated between the inventive polyurethane composition and a variety of substrates. Indeed, the present invention exhibits previously unseen utility in an industry in which adhesives have generally been formulated with specific end uses in mind, as opposed to a "universal" or "multi-functional" adhesive being available. In this regard, and as discussed previously, the cured-in-place adhesive bond will be stronger than the internal strength of the substrate to which it is applied for substrates like OSB, FRP, gypsum drywall, as well as other materials. The exceptional adhesive strength of the inventive polyurethanes shows wide utility for a number of substrate materials as discussed further herein.

Without being bound by theory, the inventors herein believe that the exceptional adhesion exhibited by the inventive polyurethane composition is, at least in part, conferred by the use of terephthalate segmented polyols derived from the PET transesterification from use of glycerin and/or trimethylolpropane have the degree of ethoxylation set out previously, namely 1 to 9, or any amount of within this range, moles of ethoxylation. Adhesion would be appreciated to be, at least in part, a function of surface energy. In the present invention, and without being bound by theory, enhancement of surface energy is believed to be generated, at least in part, by ether linkages as provided by ethylene oxide adducts imparted by the ethoxylation of glycerin or trimethylolpropane. Adhesion can also be influenced by the polarity of the molecule, which can also be provided by the PET-derived polyols, as discussed above. Moreover, the aromatic character of the polyester polyols is also believed to impart at least some additional hydrophobicity in the polyester polyols, thus conferring both hydrophobic and hydrophilic character to the resulting polyol. The inventors hypothesize that such dual functionality can enhance the miscibility of the inventive aromatic polyester polyether polyol in the isocyanate component, and may positively influence the adhesive characteristics of the resulting polyurethane composition. Such adhesion is believed to be further augmented by the curing in place, or "in situ" polymerization, feature of the present invention.

When a foamed polyurethane composition is desired, blowing agents are used, as would be appreciated. In certain aspects, the inventive aromatic polyester polyether polyol comprises one or more blowing agents including, but not limited to, physical blowing agents, chemical blowing agents, or combinations thereof. In some aspects, the term "chemical blowing agents" means compounds that form gaseous products via reaction with isocyanate, an example being water or formic acid. The term "physical blowing agents" means compounds which have been dispersed, dissolved, or otherwise distributed in either or both of the aromatic polyester polyether polyol or isocyanate starting material and which generate gas under the conditions of the polyurethane formation herein. In other aspects, the inventive aromatic polyester polyether polyols may also comprise one or more blowing agents. Yet further, the blowing agent may include either or both of a physical blowing agent or a chemical blowing agent. The blowing agent is selected to substantially not chemically react with the inventive aromatic polyester polyether polyol and/or the isocyanate component independently until the foam production is desired.

In one implementation, hollow microbeads comprising a physical blowing agent added alone or in combination with other blowing agents to the reaction ingredients for the foam coating. Such hollow microbeads are typically comprised of a shell made of thermoplastic polymer, with, in the core, a liquid, low-boiling-point substance based on alkanes, for example, isopentane. The production of these hollow microbeads is described by way of example in U.S. Pat. No. 3,615,972, the disclosure of which is incorporated herein in its entirety by this reference. Examples of suitable hollow microbeads are obtainable with trademark Expancel® from Akzo Nobel. When used, the amount added of the hollow microbeads is generally from about 0.25% to 5.0%, or from about 1.0% to 2.0%. As a non-limiting example, an aromatic polyester polyether polyol of about 24 pcf density can use about 1% by weight hollow microbeads on a weight percent basis of the total polyol:isocyanate mixture. An exemplary Expancel product is 031 DU 40.

The blowing agent can, independently, be added to either or both of the aromatic polyester polyether polyol or the isocyanate component. In some aspects, when hollow microbeads are used as a physical blowing agent the inventors herein have determined that it can be advantageous to add the microbeads to the isocyanate component, at least because the microbead coating may be partially soluble in the aromatic polyester polyether polyol, thus reducing the stability—and resulting foam coating characteristics—of the polyol component. Additionally, heating of the aromatic polyester polyether polyol, as discussed further herein, so as to facilitate flowability can approach the melting point of the coating which, again, would affect the pre-reacted aromatic polyester polyether polyol, as well as the resulting foam coating properties.

In further implementations, the blowing agent can comprise a gaseous physical blowing agent utilized in an amount of from about 1 to about 20, about 1 to about 15, about 5 to about 15, about 5 to about 10, or about 8 to about 10, parts by weight, each based on 100 parts by weight of either or both of the component in which the blowing agent is incorporated within. Such gaseous physical blowing agents can comprise one or more of volatile non-halogenated C2-C7 hydrocarbons such as alkanes, alkenes, cycloalkanes having up to 6 carbon atoms, dialkyl ether, cycloalkylene ethers and ketones, and hydrofluorocarbons, C1-C4 hydrofluorocarbons, volatile non-halogenated hydrocarbon such as linear or branched alkanes such as butane, isobutane, 2,3-dimethylbutane, n- and isopentanes, n- and isohexanes, n- and isoheptanes, n- and isooctanes, n- and isononanes, n- and isodecanes, n- and isoundecanes, and n- and isodedecanes, alkenes such as 1-pentene, 2-methylbutene, 3-methylbutene, and 1-hexene, cycloalkanes such as cyclobutane, cyclopentane, and cyclohexane, linear and/or cyclic ethers such as dimethyl ether, diethyl ether, methyl ethyl ether, vinyl methyl ether, vinyl ethyl ether, divinyl ether, tetrahydrofuran and furan, ketones such as acetone, methyl ethyl ketone and cyclopentanone, isomers thereof, hydrofluorocarbons such as difluoromethane (HFC-32), 1,1,1,2-tetrafluoroethane (HFC-134a), 1,1,2,2-tetrafluoroethane (HFC-134), 1,1-difluoroethane (HFC-152a), 1,2-difluoroethane (HFC-142), trifluoromethane, heptafluoropropane (R-227a), hexafluoropropane (R-136), 1,1,1-trifluoroethane, 1,1,2-trifluoroethane, fluoroethane (R-161), 1,1,1,2,2-pentafluoropropane, pentafluoropropylene (R-2125a), 1,1,1,3-tetrafluoropropane, tetrafluoropropylene (R-2134a), difluoropropylene (R-2152b), 1,1,2,3,3-pentafluoropropane, 1,1,1,3,3-pentafluoro-n-butane, and 1,1,1,3,3-pentafluoropentane (HFC-245fa), isomers thereof, 1,1,1,2-tetrafluoroethane (HFC-134a), isomers thereof, and combinations thereof. In various aspects, the blowing agent comprises 1,1,1,3,3-pentafluoropentane (245fa), water, or a combination thereof.

If water comprises the blowing agent, water can be utilized in an amount of from about 0.1 to about 5, about 0.1 to about 4, or about 0.1 to about 3, parts by weight, each based on 100 parts by weight of the component in which the water is included. It is also contemplated that both a non-water blowing agent and water may be present simultaneously in one or more of the above amounts. Typically, the amount of the blowing agent and/or water is selected based on a desired density of the foamed polyurethane compositions and the solubility of the blowing agent in the reactive components.

Optionally, in one aspect, a minor amount of a surfactant can be utilized to stabilize the polyurethane reaction mixture until it cures. Such surfactants can comprise a liquid or solid organosilicone surfactant. Other surfactants include, but are not limited to, polyethylene glycol ethers of long-chain alcohols, tertiary amine or alkanolamine salts of long-chain alkyl acid sulfate esters, alkyl sulfonic esters and alkyl arylsulfonic acids. Such surfactants can be employed in amounts sufficient to stabilize the foaming reaction mixture against collapse and the formation of large, uneven cells. In one implementation, about 0.2 to about 5 parts of the surfactant per 100 parts by weight aromatic polyester polyether polyols can be sufficient for this purpose. Such surfactants can enhance the wettability of the applied mixture to, in some implementations, improve adhesion of the applied coating or foam to the substrate.

In various aspects, the coating or foam may also comprise a flame retardant additive.

Such additive can be selected from the group of phosphorous, halogens, and combinations thereof. Examples of the suitable flame retardant additive include, but are not limited to, red phosphorus, ammonium polyphosphate, tris (2-chloroethyl)phosphate, tris(2-chloropropyl)phosphate, tetrakis(2-chloroethyl)ethylene diphosphate, dimethyl methane phosphonate, dimethylpropanephosphonate, diethyl diethanolaminomethylphosphonate, and combinations thereof. In another implementation, the conventional flame retardant additive is selected from the group of tricresyl phosphate, tris(2-chloroethyl)phosphate, tris(2-chloropropyl)phosphate, tris(2,3-dibromopropyl)phosphate, red phosphorous, aluminum oxide hydrate, antimony trioxide, arsenic oxide, ammonium polyphosphate and calcium sulfate, molybdenum trioxide, ammonium molybdate, ammonium phosphate, pentabromodiphenyloxide, 2,3-dibromopropanol, hexabromocyclododecane, dibromoethyldibromocyclohexane, expandable graphite or cyanuric acid derivatives, melamine, and corn starch. Additionally, other flame retardant additives are also contemplated for use in the present invention including, but not limited to, hydrated aluminum oxide, calcium sulfate, expanded graphite, cyanuric acid derivatives, and combinations thereof.

The flame retardant additive amount is determined, in part, by the flammability properties of the low molecular weight ethoxylated triol used in the transesterification reaction. In this regard, trimethylolpropane can, in some circumstances, exhibit more flammability than for a polyol derived from ethoxylated glycerin. Therefore, the amount of flame retardant additive used can be more than that needed for a glycerin-derived aromatic polyester polyether polyol, which is believed to exhibit lesser flammability tendency than for a polyol derived from ethoxylated trimethylolpropane. The amount of flame retardant additive will nonetheless be a function of the specifications for the material being generated including the inventive polyurethane, as well as the specifications of the finished structure in which the material is being utilized. Generally, the amount of flame retardant additive used is from about 0.1 to about 10% or about 1% to about 8% or about 1 to about 5% of the total weight of the polyurethane coating.

In certain aspects, the polyurethane composition can be substantially free of flame retardant additives, yet exhibits flame retardance appropriate for the intended application. In this regard, polyurethane coatings and foams will exhibit some degree of flame retardancy by virtue of their chemical makeup, at least because of the presence of aromatic groups in the polyurethane composition and, optionally, because the use of ethoxylated glycerin as a transesterification agent. When the inventive polyurethane compositions are applied as a coating to a substrate that is inherently flame retardant, for example gypsum wall board or concrete, flame retardant additives may not be required, or a lesser amount may be indicated.

In further aspects, fillers can be added during the fabrication process. For example, fiberglass chop can be incorporated along with Part A and Part B to generate a polyurethane coating composition that exhibits enhanced structural strength. Other strength enhancing fillers are also contemplated, as discussed hereinafter.

The method of generating the inventive polyurethane comprises the steps of introducing the inventive aromatic polyester polyether polyol and the reactive isocyanate components via spraying using a mixing head to provide contact therewith on the substrate onto which the coating or foam is to be formed on and durably adhered to. Dynamic or static mixing heads can be used in the application. Impinging mixing heads can also be used. In various aspects, the application steps are facilitated through use of a spray form proportioner device, such as a Graco® Reactor H-VR Variable Ratio Hydraulic Proportioner. Other devices that can suitably be used include the Nitrosys SPF low pressure sprayer. A Kornylak Dispensing apparatus can also be used.

To make a rigid polyurethane foam, a mixture generated from a dynamic mixing process can be prepared of a polyfunctional isocyanate, a polyol, a blowing agent, a catalyst, and, optionally, a cell-size regulator (e.g., a surfactant). A urethane-forming reaction begins once the ingredients are combined, an exotherm forms, and the blowing agent or agents cause closed cells to form in the polymer as the mass expands and solidifies. The exotherm typically reaches a peak temperature of at least about 150° F. The isocyanate and polyol reactants include enough molecules with three or more functional groups that the degree of cross-linking or branching is sufficient to produce a rigid foam.

Although rigid, the polyurethane foams of the present invention also can exhibit resiliency and flexibility, especially at ethoxylation levels of from about 5 to about 7 moles. The polyurethane foams also exhibit exceptional adhesion. For example, the foams have shown a tendency to adhere to a new Teflon) surface. In this regard, it may be beneficial to use a sacrificial coating when preparing the inventive foams in a mold etc.

The polyurethane can be applied at a point of manufacture (e.g., products to be sold with such coating at point of sale), or the coating can be applied a location (e.g., sprayed in place insulation or adhesive layers applied at a building site).

For some applications, such as coating of irregular surfaces, the components can be sprayed on the surface and be allowed to cure after green strength is achieved. A continuous process can be also used wherein the components are dispensed onto a continuous belt. The desired length of material can then be generated, and when green strength is acquired, the lengths can be moved to a curing station (e.g., racks) and allowed to cure for about 24 hours. Other application methods can be suitably used.

High or low pressures can be used to generate the polyurethane coatings. Pressure ranges can be from about 500 psi up to about 5000 psi, or from about 500, 1000, 1500, 2000, 2500, 3000, 3500, 4000, or 5000 psi, where any value can form an upper or lower endpoint, as appropriate. The specific psi value(s) for application can be determined by one of ordinary skill in the art without undue experimentation. Foam coatings are typically applied at lower pressures than film coatings.

In some implementations, each of the inventive polyester polyol and the isocyanate can be pre-heated so that the individual components and the combined components are applied at a temperature that facilitates both flowability and reaction thereof. In this regard, each component can be independently heated to from about 35 to about 95° C., about 45 to about 85° C., or about 50 to about 80° C. or up to about 90° C. Such heating may be used to reduce the viscosity of the materials and/or to accelerate the polymerization reaction and subsequent curing. In some aspects, the inventive aromatic polyester polyether polyols and isocyanate components can have the same or different application temperatures. The pre-heating can be provided in or proximate to either or both the storage tanks or application device.

In some aspects, when generating a foam coating or foamed substrate using a blowing agent comprising gas-filled micro-spheres, it can be advantageous to combine the aromatic polyester polyether polyol and the isocyanate at temperatures less than the expansion temperature of the blowing agent. Without being bound by theory, the inventors hypothesize that by allowing the aromatic polyester polyether polyol and the isocyanate to combine at this lower temperature, the curing reaction between the aromatic polyester polyether polyol and the isocyanate can at least partially commence prior to the activation of the microspheres. It is believed that such initial curing can, in some aspects, enhance the resulting adhesion of the foam coating to a representative building substrate. Moreover, screw and nail retention improvements are observed (e.g., the punctured foam appears to be "self-healing"), possibly because of at least some gelation of the aromatic polyester polyether polyol and isocyanate components prior to expansion of the blowing agent. To this end, photomicrographs of the adhered foams illustrate locally oriented polyurethane foam layers surrounding the expanded microspheres. FIG. 1 is a photomicrograph of an inventive foamed composition 100 having expanded microsphere 105 embedded in polyurethane 110.

Because a polyurethane curing reaction is moderately exothermic, the heat of reaction will begin to increase, with the temperature rise reaching the expansion temperature for the microspheres. The temperature of expansion is a known quantity for the microspheres. Accordingly, in a method of making an in situ foamed coating on a building substrate, the invention comprises selecting a blowing agent comprising hollow gas-filled microspheres, wherein the hollow microspheres have an expansion temperature. The blowing agent can be incorporated in either or both of the aromatic polyester polyether polyol or isocyanate components, wherein the component in which the blowing agent is incorporated is maintained at a temperature of less than the expansion temperature of the blowing agent. In this regard, if the blowing agent has an expansion temperature of about 85° C., the component in which the blowing agent is incorporated, for example the isocyanate, will be maintained at about 5, 10, 15, 20, 25, or 30° C. below this expansion temperature, or about 80, 75, 70, 75, 70, 65, 60 or 55° C. The other component can be maintained at the same temperature or it can be different, as long as the combined aromatic polyester polyether polyol and isocyanate components are able to react partially prior to expansion of the blowing agent.

Using the expandable microsphere blowing agent as an example, the addition of a blowing agent at about 1% on a polyurethane composition weight:weight basis, the density of the coating adhered to the substrate, now in the form of a foam can be about the 26-28 pounds per cubic foot. At about 1.2% blowing agent the resulting density of the foam coating is from about 20 to about 26 pounds per cubic foot. When using the expandable microspheres as a blowing agent, the density of the foam coating can be from about 2 to about 50 pounds per cubic foot Still further, the density of foam adhered to a building substrate can be about 2, 5, 10, 15, 20, 25, 30, 35, 40, 45 or 50 pounds per cubic foot, where any value can form an upper or a lower endpoint, as appropriate.

For polyurethane foams described herein, density ranges of about 0.5 to 10 pounds per cubic foot densities can be good for insulation properties, as shown in the Examples hereinafter. However, the range cannot be determined by looking at one property alone. For instance, a foam having a density of about 16 to 36 pound per cubic foot can have good insulation values while at the same time provide additional strength and desirable nail or screw retention over lower density foams. For adhesive polyurethanes, a denser, stronger foam in the range of about 24 to 60 pounds per cubic foot or even completely unblown material at about 70 pounds pcf can be used. Sound abatement can be improved when the density of the foam itself varies within the layer or layers applied such as a higher density (from about 10 to about 70 pcf) changing to a lower density (about 0.5 about 10 pcf) and the back up to higher density (from about 10 to about 70 pcf), embedding the weaker low density foam between two highly structured, dense, and adhesive outer layers. In this method, the average density of the layer might be considered low even though within the layer are much higher density areas.

One or more additional fillers can be used in the polyurethane materials of the present invention. As discussed hereinafter, for various implementations, the polyurethane compositions can incorporate fiberglass or other types of binding fibers or carbon particles or fibers, where such fillers can be selected to generate desirable end properties. Fillers can also reduce the amount of material needed in a particular application. Examples of such bulking fillers useful ash such as those produced by firing fuels including industrial gases, petroleum coke, petroleum products, municipal solid waste, paper sludge, wood, sawdust, refuse derived fuels, recycled materials, switchgrass or other biomass material. The one of more additional fillers can also include ground/recycled glass (e.g., window or bottle glass); milled glass; glass spheres; glass flakes; activated carbon; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar; aroganite, bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; inorganic fibers; soy meal; pulverized foam; and mixtures thereof.

The amount of filler material used, will be dependent, at least in part, on the intended end uses of the compositions and products using the compositions. The inclusion of fillers in polyurethane materials of the present invention can modify and/or improve the properties of the materials generated from use of the inventive polyurethane compositions. In particular, high filler loading levels can be used in the structural foam materials described in detail hereinafter without a substantial reduction of (and potentially with an improvement in) the intrinsic structural, physical, and mechanical properties thereof. In other words, the materials can be used in applications where load-bearing properties are desirable.

Whether foamed or unfoamed, the surface of the inventive polyurethane compositions are paintable upon completion of curing. The polyurethane compositions can also be tinted with pigments to provide a colored polyurethane material upon completion of curing.

When the coating is foamed, decorative features can be added to give the outer foam surface a "faux look." In this regard, a wood grain surface can be generated. Yet further, a stucco-like surface can be generated. Still further, a textured surface can be generated. Prior to completion of curing, patterns, such as those associated with brick or masonry look can be embossed into the surface. When combined with the paintability or tintability of the inventive compositions, the usability of the coated substrates in interior or exterior construction applications where design is a point of materials selection can be enhanced. Perforations can also be incorporated into the foamed coating, so as to increase the acoustical characteristics of the substrate.

Low/No VOC Substitutes for Polyester Resin Systems and Adhesive Applications

Currently, polyester resins are widely used as adhesives, both filled and unfilled, in construction and in vehicle manufacture (e.g., automobiles, motor homes, tractor trailers, etc.), among other uses. Unsaturated polyester and vinyl ester resins comprising these materials traditionally have been wholly derived from petrochemicals and contain high concentrations of styrene, a hazardous air pollutant, and a primary cause of VOCs in locations where such materials are used in manufacturing.

The polyurethane materials of the present invention not only provide excellent adhesive performance in a variety of use cases that is comparable to or better than many polyester resins, these materials are styrene-free. Resins presented herein are also partially derived from biologically renewable resources and recycled materials, surprisingly without showing a decrease in performance. In this regard, the present invention provides adhesive systems that are styrene-free and that are low in VOCs. Significantly, the inventive resin systems are at least partially derived from recycled sources and, when ethoxylated glycerin is used, the resins have a sustainable component. Recyclable or sustainable fillers can also be used. Thus, the inventive materials are significantly more "green" than possible with previous resin systems where strong adhesion to a variety of surfaces is desired.

The inventive adhesive systems can be used to replace styrene-containing polyester resins that are used to generate composite systems. The inventors herein have surprisingly found that the polyurethanes of the present invention can wet out fiberglass and other filler materials quickly and efficiently. In one example of such an application, the polyurethanes of the present invention can be used to prepare laminated panels for motor homes, recreational vehicles, and trailers, as disclosed in U.S. Provisional Patent Application No. 62/722,874, previously incorporated by reference. To briefly summarize that application, a gel coat can be applied to a belt or a mold and the inventive polyol and isocyanate are mixed by spraying in the presence of chopped fiberglass, and allowed to cure to generate a strong, lightweight composite sheet material that is resistant to water infiltration and cracking. When combined with the substantial elimination of VOC generation in manufacturing, the invention described in the referenced application is a significant improvement over the methodologies used today. While this specific application uses a fiberglass filler material, other fillers are contemplated to generate composite sheet materials can be using this technique.

In a further implementation, the present invention can be used to prepare structurally-strong molded materials that are filled appropriately for the desired use case. For example, fiberglass fillers can be used to generate composite structures that are suitable for use in vehicles, such as for the molded portions of recreational vehicles, boat hulls, shower stalls, bathtubs, pool shells, among other things. Carbon fibers can be used to generate lightweight and strong composite structures for aircraft parts. Still further, other fillers can be used as discussed elsewhere herein.

Yet further, the filled polyurethanes can be formed as sheets, with a decorative outer layer, or both layers can be decorative. Such materials can be used as walls for vehicles such as motor homes, trailers, and rail cars, among other things. In some implementations, a vehicle comprising such sheet materials provide insulative characteristics.

Still further, the inventive aromatic polyester polyether polyols can be used as components in epoxy adhesives. The aromatic polyester polyether polyols can be used as precursors for acrylate-based adhesives.

Substrates Coated with Inventive Polyurethane Compositions

In broad constructs, the present invention relates to substrates having the inventive polyurethane composition material adhered to one or more surfaces thereof, wherein the polyurethane composition is in either an unfoamed or foamed configuration, as discussed in detail herein. The strong adhesion to a variety of surfaces including, but not limited, to building and construction-related surfaces, as well as the one or more excellent physical properties exhibited by the cured-in-place foamed or unfoamed implementations can allow the inventive polyurethane compositions operate effectively as a nearly universal adhesive material. While some exemplary configurations of the specific composite substrates are discussed further hereinafter, generally, the substrate coated with the inventive compositions can comprise any material. In non-limiting examples, the inventive compositions can be adhered to wall material, roofing material, flooring material, gypsum wallboard, OSB board stock, plywood, lumber, cement cladding/siding, rigid foam, flooring material, extruded polystyrene, expanded polystyrene, concrete, wood planking, steel, aluminum, polyiso insulation, fiberglass, HDPE, MDPE, LDPE, fabric, paper, paperboard, MDF, plastic, cellulose materials, among other things. The inventive polyurethane compositions herein are contemplated to provide enhanced physical properties when cured-in-place on each of the substrates.

In this regard, the composite substrates of the present invention comprise the polyurethane coating that is generated via in situ polymerization of the inventive aromatic polyester polyether polyols and a suitable urethane-containing reactant on a surface of the substrate. The polyurethane coating in the form of a film or a foam is durably attached to one or more surfaces of the substrate substantially by the exceptional adhesive properties of the polyurethane composition, and not by use of any secondary adhesive or tie layer.

The polyurethane coating can be applied to one or both sides of a substrate, thereby providing a substrate having the inventive polyurethane material adhered thereon. Yet further, the inventive polyurethane coating can be included as an internal sandwich layer between two substrates, wherein the interior side of each substrate is adhered to the polyurethane coating. The adhered substrates can be the same or different in such a sandwich structure.

The method of generating the layered or foam coated substrates can comprise the step of spraying or using a dynamic mixer the inventive aromatic polyester polyether polyol comprising the catalyst component, along with any other ingredients as discussed hereinafter, and the isocyanate onto the substrate to generate in situ formation of the rigid foam to be firmly adhered to the substrate surface thereof. In one aspect, the pre-heated isocyanate (Part A) and polyol/catalyst mixture (Part B) can be applied to the substrate via a spray gun or dynamic mixing head as discussed elsewhere herein. In other aspects, the method further comprises the step of combining inventive aromatic polyester polyether polyol with catalyst, the isocyanate component to form a mixture.

In one implementation, the mixture can be applied to the substrate surface in a single application. In a further aspect, the mixture can be applied in two applications, whereby this implementation incorporates a first application to the surface as a light base coating, allowed to cure for about 1 or 5 or 10 minutes, and then a second application is provided as a complete application. The first application can enhance adhesion of the layer or coating to the substrate surface.

Overall, the coatings are generally about 80% or about 90% or about 95% cured within about 1 or 2 or about 6 hours to generate "green strength," and will be totally cured in about 12, 24 or 36 hours or up to about one week when the composite material is maintained at conditions from about 50° F. to about 110° F.

Fire Resistant Building and Other Materials

The compositions and methods of the present invention can be used to generate fire resistant coatings for various building materials. Currently, building materials, such as OSB, I-joists etc. can be supplied with all surfaces (e.g., encapsulation) or partially coated with magnesium oxide. An example of such treatment is shown in US Patent Publication No. US2015/0052838, the disclosure of which is incorporated herein in its entirety. While magnesium oxide is non-combustible, problems can arise with its use. For example, the coating can be friable, thus exposing the surface, and reducing the fire resistance characteristics. It is not useable under conditions of high relative humidity and in high salt conditions.

In contrast, when applied to a building substrate, the coatings of the present invention are substantially not friable. Rather, they are resilient and at least partially self-healing, as shown at least by the screw retention and Cobb Ring results hereinafter. Moreover, these materials are fire retardant by the nature of thermoset polyurethane foams generally, as well in relation to the additional benefits believed to be conferred by the presence of aromatic groups in the inventive aromatic polyester polyether polyols.

To this end, the polyurethanes of the present invention are thermoset foams that can exhibit markedly different fire behavior than seen with polystyrene foams and other thermoplastic foams. Polyurethane thermoset foams do not melt at high temperatures. Instead, they form a stable char that can substantially prevent flame spread and can generate some thermal protection to the surrounding foam, thus increasing the overall service temperature of the foams. Moreover, because the foam does not melt, voids are not created, fire can be less likely to spread within the panel. Thermoset polyurethane foams also tend to have slightly higher ignition temperatures than thermoplastic foams; consequently, they have slightly longer flame spread times. Service temperatures greater than the about 90° C. for expanded or extruded polystyrene are also possible with the materials of the present invention. The aromatic character of the inventive polyurethane foams provide improvements over the basic properties shown by thermoset polyurethane coatings generally.

The foamed polyurethane materials of the present invention can also be used to store materials or items that are prone to causing fires. In this regard, boxes or containers can be generated in which lithium ion batteries can be better stored for use in vehicles, etc. The strong structural characteristics of the inventive materials can help protect the battery from puncturing, etc., but if the battery fails, fire damage can be reduced due to the fire resistant properties of the materials herein when prepared into a structural foam material.

Additionally, the inventors believe that the use of glycerin as a transesterification material can further improve the fire resistance of the inventive polyurethanes. That is, the chemical structure of the glycerin in its neat form does not readily lend itself to ignition. Thus, when included in the polyurethane backbone, such lack of ignition appears to translate to a higher heat resistance than expected. While flame retardant additives could still need to be added to the material to comply with certain fire and building codes, it is expected that the fire resistance behavior of the polyurethanes made with glycerin could be enhanced.

Construction-Related Definitions

The term "R-value," as used herein, refers to the measure of thermal resistance as is routinely used in construction industries. The R-value is the ratio of the temperature difference across the insulator to the heat flux through the insulator. In the United States, R-values are typically given with the units of ft$^{2\cdot\circ}$ F.·hr/Btu. R-values are routinely reported without units and, as used herein, unless the units are otherwise indicated the R-values are reported in U.S. units of ft$^{2\cdot\circ}$ F.·hr/Btu.

Gypsum wallboard (also called "drywall" or "sheetrock") is a building material comprising a core comprising set gypsum sandwiched between two sheets of multi-ply paper facing material for use in the construction of residential homes, commercial buildings, and other structures. The use of paper-faced gypsum wallboard is one of the most common means of finishing the interior structure of buildings. Gypsum wallboard also confers fire-resistance. Paper-faced gypsum wallboard, also known as "sheetrock" or "drywall" is usually manufactured (pre-cut) in flat sheets of 4 ft. by 8 ft., or 4 ft. by 12 ft., typically having a thickness of ½ inch or ⅝ inch or as otherwise available for use. As would be recognized, the panels of the paper-faced gypsum wallboard are hung on wood or metal studs to form the interior partitions or walls of rooms, elevator shafts, stairwells, ceilings and the like.

Oriented strand board ("OSB") is a type of engineered lumber similar to particle board, formed by adding adhesive to wood strands/flakes arranged in specific orientations followed by application of compression. Adjustments to the manufacturing process, such as in the orientation of the wood fibers/flakes can impart differences in thickness, panel size, strength, and rigidity. OSB panels have no internal gaps or voids, and are water-resistant, although they do require additional membranes (i.e., "housewrap") to generate impermeability to water. The finished product has properties similar to plywood, but is uniform and less expensive. OSB is a material with favorable mechanical properties that make it particularly suitable for load-bearing applications in construction. The most common uses are as sheathing in walls, flooring, and roof decking, although other uses are contemplated.

Plywood is a sheet material manufactured from thin layers or "plies" of wood veneer that are glued together with adjacent layers having their wood grain rotated up to 90 degrees to one another.

Panelized construction or "panelization" is the process of building a modular wall, roof and floor sections in an environmentally controlled manufacturing facility and delivering them to the construction site for installation. These panels are oftentimes referred to as "structural insulated panels" ("SIPs")." In this regard, SIPs are components in high performance building systems used in residential and light commercial construction. The panels consist of an insulating foam core sandwiched between two facings. The facing is conventionally oriented strand board (OSB), but can also comprise plywood as a substitute for OSB or, in some specialized applications, steel or aluminum. SIPs have utility, for example, in panelized construction, where prefabricated building components are assembled into larger panels before being shipped to a building site. When wall, floor and roof components are pre-assembled in a climate-controlled environment, builders and developers can save time and money with improved speed and ensured quality. Fabrication capabilities vary, but firms that target commercial construction can typically fabricate wall panels up to about 60 feet long (or more) and up to about 16 feet tall. Roof and floor systems can also be panelized in similar-sized sections using dimension lumber, trusses or I-joists. SIPs are an element of modern panelized construction. SIPS have also begun to emerge as a viable alternative to stick framing walls on the job site, or even producing stick framed walls at some off-site location. They can reduce onsite labor requirements and the amount of material needed, while improving the energy efficiency of the wall assembly. They can fabricate simply (i.e., cutting openings for doors, windows), ship flat, and assemble in a comparatively simple manner using traditional carpentry techniques.

Fiber cement siding is a building material used to cover the exterior of a building in both commercial and domestic applications. Fiber cement is a composite material made of sand, cement and cellulose fibers. For residential household applications, fiber cement siding generally is supplied at about ⅚ or ⅝ inch thick and in varying lengths of from about 18 inches by 6 feet to about 4 by 12 feet. For multi-family residential or commercial buildings, fiber cement can be supplied in various sizes in accordance with architectural specifications.

Laminate flooring is a multi-layer synthetic flooring product fused together with a lamination process. Laminate flooring simulates natural materials, namely wood and stone, with a photographic layer applied under a clear protective layer.

Polyiso insulation is a closed-cell, rigid foam board insulation comprising a lower density foam layer adhered to one or two layers of higher density foam.

Cladding generally refers to construction components that are attached to the primary structure of a building to form non-structural or external surfaces to control an internal environment. Although cladding does not typically contribute to a structure's stability, it does play an important structural role in transferring wind loads, impact loads and its own self-weight back to the structural framework.

Extruded polystyrene insulation ("XPS") is manufactured through an extrusion process. This manufacturing process involves melting together the resin and other ingredients. The liquid formed is then continuously extruded through a die and expands during the cooling process. This produces a closed cell rigid insulation. Expanded polystyrene insulation ("EPS") is manufactured using a mold to contain small foam beads. Heat or steam is then applied to the mold, which causes the small beads to expand and fuse together. This manufacturing process does not form a true closed cell insulation as there can often be voids between each of the beads where they are not touching one another.

Medium density fiberboard ("MDF") is an engineered wood product made by breaking down hardwood or softwood residuals into wood fibers, often in a defibrator, combining it with wax and a resin binder, and forming panels by applying high temperature and pressure. MDF is generally denser than plywood.

Laminated veneer lumber ("LVL") is an engineered wood product produced by gluing together layers of wood veneers with the wood grains in parallel lumber. LVL uses wood fragments that are all oriented in the same direction to produce very stiff beams that generally have greater span capacity than sawn lumber. It can be used for laminated wood beams, timbers, I-Joists, and other engineered wood products. Typically, an individual LVL ply or layer of veneer is about 45 mm to 65 mm in thickness, and may be up to about 1.2 meters wide and as much as about 25 meters in length, depending on the size of the original tree.

Fiberglass reinforced panels ("FRP") are made of inorganic fiberglass with a thermosetting resin, formed into flexible, semi-rigid or rigid boards of varying densities. In some implementations, FRP is used as insulation on trucks, vessels, equipment, chillers, hot and cold equipment, heating and air conditioning duct work, acoustical wall panels, specialized ceiling applications, power and process equipment. When used as an insulation, fiberglass board can be used at operating temperatures from about below 0 to about 450° F.

Subflooring is the thick flat surface on which all other flooring layers rest. Subfloor is the bottom-most layer and it rests on joists. Subfloors are typically made of plywood or OSB and ranging in thickness from about $19/32$" to $1\frac{1}{8}$" thick.

Underlayment is positioned between the structural subfloor of a building foundation and the flooring material. Underlayments are meant to absorb the roughness, or imperfections of subfloors, so that the flooring can be installed on top of a smooth, hard surface that will give the flooring material extra support.

Paperboard is a thick paper-based material. While there is no rigid differentiation between paper and paperboard, paperboard is generally thicker than paper, for example, over 0.010 in, or 10 points). According to ISO standards, paperboard is a paper with a grammage above 224 g/m², but there are exceptions. Paperboard can be single- or multi-ply. Paperboard can be easily cut and formed, is lightweight, and because it is strong, is used in packaging.

"Moisture resiliency" is an emerging concept in the construction industry. With the increasing occurrence of flooding in coastal and other regions, there has been an increased emphasis in making structures better able to handle periodic water infiltration without causing substantial damage, thus lowering repair costs associated with flooding. In this regard, storm surge is a rise in sea level that occurs during tropical cyclones, intense storms also known as typhoons or hurricanes, and tropical storms. The storms produce strong winds that push coastal waters into shore, which can lead to flooding. This makes for very dangerous conditions for coastal regions. Heavy thunderstorms, or long-lasting rain events often times generate much rain that saturates the earth's surface and the soils in a given low-lying area may not be capable of filtering the rain water fast enough which can result in river flooding. If either one of these events take place, the floods can wreak destruction on a structure. Along the coastal regions, many homes are elevated to a height greater than a potential surge flooding event. In low-lying areas close to rivers or tributaries, many of the homes are constructed with a basement or crawl-space to give some elevation above the floodwaters. Many structures are constructed with masonry or concrete in anticipation of such an event. However, many of these structures are built-out internally with common construction materials, such as gypsum drywall interior walls and hardwood or laminate flooring, which will have to be replaced after such catastrophic storm events. The interiors of structures are increasingly vulnerable to recurring damage from water infiltration. When a structure, or the materials used in the construction or reconstruction thereof are designed to be "moisture resilient," there is a lesser propensity for irreversible water damage resulting from storm surge, flooding, or the like. As one example, moisture resilient wall and flooring materials will be substantially resistant to mold growth after contact with water resulting from a water infiltration event.

A "surge wall" is a panelized component that is constructed to, in some implementations, provide moisture resiliency in a structure, as such term is defined herein. A surge wall can be incorporated in a lower portion of a wall structure, for example, an interior wall, to reduce the propensity of the structure to be subjected to irreversible damage from water infiltration, such as apparent in a storm surge or other flooding scenario. In this regard, the lower portion of a wall can comprise a water-resilient material, with the upper portion of the wall being comprised of conventional building materials, such as gypsum drywall.

An engineered shear wall board, or a storm board, is a structural panel that can be used, for example, in areas where wall bracing is indicated, such as in hurricane prone areas. Engineered shear wall boards are used in structures when wind loads equal or exceed 100 mph. Shear walls generally include hold downs at each segment, and are designed in each structure in relation to the projected wind speeds that could occur in a particular location.

Composite Building Panels

In some aspects, the present disclosure provides lightweight composite building panels thereby making installers jobs easier, less strenuous and safer in overhead ceiling applications, roofing applications, or in other above ground applications. While the description below is directed toward materials that are specifically used in the building and construction industry, it is to be understood that other types of use cases are contemplated herein.

In various implementations, the composite panels can have a weight that is at least 10% less, 20% less, at least 30% less, at least 40% less, or at least 50% less or even less than the weight of a non-composite panel—that is one comprising the same building substrate without the polyurethane coating—having the same overall thickness, where such overall lower weight is, significantly, acquired without sacrificing structural strength. In this regard, the composite panels of the present invention are at least substantially equal to the strength specifications of an uncoated substrate having the substantially the same dimensions, with the weight of the coated substrate is at least about 10% or 20% or even less in weight.

In various aspects, the composite panel can have an impact resistance that is greater than the impact resistance of a non-composite panel having the same overall thickness and dimensions. In this regard, the impact resistance of a composite building substrate of the present invention is at least about 10% greater, or about 20% greater, or about 30% greater, in impact resistance than an uncoated building substrate.

The thermal resistance provided by the composite building substrates of the present disclosure can reduce the amount of insulation the required, for example, as used in ceilings, walls, and floors, for example. In some cases, implementations of the inventions herein may reduce or substantially eliminate the need for additional insulation depending on the thicknesses of the panels. With regard to coated gypsum wallboard, which is discussed in more detail hereinafter, the composite substrates of the present disclosure can, at a nominal thickness of ½ inch, provide improved thermal resistance values when compared to a standard ½ inch drywall panel commonly used today, as shown in the Examples hereinafter. When fastened, the screws or nails openings can be "self-healing" so as to make a substantially watertight seal so that water is less likely to travel along the screw or nail surface to permeate into the substrate.

Composite substrates are provided herein where the polyurethane layer is foamed and comprises substantial portion of the thickness of the composite substrates, e.g., the polyurethane layers make up at least about 25%, 30%, 40%, 50%, 60%, or more of the thickness of the composite substrates. As would be recognized, such thickness increase will result when the polyurethane coating is foamed. The coating can comprise a thickness that is at least about 10% of the thickness of the composite building substrates. The coating applied can have a thickness of about ¼ inch to about 2 inches, about ½ inches to about 1 inches, or other thicknesses as may appropriate for the application.

When the coating is unfoamed, that is in the form of a layer, the thickness of the coating can be from 10 mils to about 100 mils or from about 30 to about 60 mils in thickness on each of the surfaces of the building substrate. When thicker coatings are desirable, the coatings can be applied in multiple layers, as would be appreciated.

The polyurethane layers or foams can be applied in-line in the manufacturing process of the building substrate. In the manufacture of gypsum wallboard, for example, the slurry is baked in an oven. Right after the oven that bakes the slurry the gypsum wallboard is still hot. At that point, the residual heat in the wallboard can facilitate the curing of the polyurethane composition. However, as noted previously, it can be beneficial to keep the aromatic polyester polyether polyol and isocyanate components at a temperature below the expansion temperature of the blowing agent, if an expandable microsphere blowing agent is used.

If produced in high volume, the polyurethane application and in situ polymerization can be performed in line, either fully continuous or using a diverting line, and using a dynamic mixing application. For back-coating applications, a coating, film, or foamed layer the panels can be rotated face down: carefully preserving the facing side that was rotated up to keep from marking or roll burning in the oven. Afterward the polyurethane components can be applied to the substrates, held in line for a certain curing time, and the processed for shipment and sale.

The composite substrates can also be made in an off-line treatment, i.e., using substrates that have already been produced in conventional manufacturing processes. An off-line treatment can take several applications. The polyurethane components can be applied to the substrate using high pressure impingement or dynamic mixing heads can be delivered to a first side of the panel or substrate and allowed to cure before further processing.

The composite panel can be used in a variety of building or construction applications. In non-limiting examples, the panels can be used as siding, cladding, composite structural panels, insulation, sub-flooring, underlayment, fire-resistant materials, enhanced gypsum drywall materials, flooring, structural components, and others.

Functional properties provided by the coated materials herein can include, in non-limiting examples, structural support, air barriers, thermal insulation, water resistance or water proofing, air barriers, acoustic enhancements, sound barriers, fire resistances, decorative coatings, faux coatings, MDF substitutes, among other things.

In a notable aspect, when used as substrate coatings, the polyurethanes of the present invention can impart moisture resiliency. When used in panelized construction components, the inventive building substrates coated with the inventive polyurethane compositions or building materials derived from those compositions can be used to provide structural panels that can withstand a water infiltration event, thus enabling the building owners from needing to remove and replace the materials from the flood exposed areas, for example. In this regard, when a storm surge or other water infiltration source comes into contact with a structure in which the coated building substrates and/or building materials are incorporated, the structure will have a lesser propensity to become saturated with the water for a long enough time period in which mold can take hold. The lack of water saturation can translate into those areas of the structure in which the inventive materials are used being substantially mold-resistant, thus reducing or substantially eliminating expected damage from water infiltration.

Composite Gypsum Wallboard Panels

In an implementation, the present invention comprises gypsum wallboard that is coated on one or both sides with the inventive polyurethane films or foams. Yet further, the inventive polyurethane coating can be sandwiched between two pieces of gypsum wallboard. In some implementations, application of the inventive layer or foam coating can impart strength to the gypsum wallboard over that which is seen with conventional coatings. In this regard, the polyurethane compositions of the present invention can allow gypsum wallboard to be light weighted vs. conventional materials. For example, wall and ceiling applications require a conventional drywall panel to be a minimum of ⅜ inch thick or in many instances thicker to achieve the required strength and durability necessary for these applications. However, gypsum wallboard of standard dimensions (e.g., 4 ft.*8 ft.) is extremely heavy and difficult to handle, especially in overhead applications. Thicker drywall panels used in the art lack impact resistance and can be easily damaged. The inventors herein have found that coating of thinner gypsum wallboard panel, such as ¼ inch or ⅜ inch with the polyurethane compositions herein can impart a comparable strength over the uncoated wallboard having the same dimensions. The coating imparts impact resistance. Moreover, the polyurethane coatings can also impart some insulative qualities to the gypsum wallboard. Fastenability of the panels to the building structure is not reduced and, in fact, may be improved according to the screw retention results discussed elsewhere herein.

The structural strength characteristics of the polyurethane coated gypsum wallboard can allow lighter weight sheets to be used without the expected sagging that might result when hanging the wallboard on ceilings etc. In this regard, the ½ inch gypsum wallboard can be coated with ½ inch of the inventive polyurethane composition at a density of 24 pounds to provide a total thickness of 1 inches, but at lower pounds per square foot than would be present in an inch thick gypsum product 4 foot by 8 foot product, if such a material would even be available. The improved structural strength would allow a composite gypsum wallboard having a lighter overall weight to be hung from joists or rafters spaced 24 inch on center, which is becoming more common in energy-efficient construction in locations of heavy or sagging insulation, wet ceilings, or high humidity instead of the higher weight ⅝ inch drywall, which is heavier than ½ inch gypsum wallboard coated with ½ inch of the inventive coating at 24 pounds density.

In one aspect, the coated side of the gypsum wallboard panel can face inwards towards the wall or ceiling cavity. The coated side of the composite gypsum wallboard panel, in some implementations creates a moisture resilient and substantially mold resistant barrier. The mold resistant surface created by the polyurethane coating provides a composite gypsum wallboard panel for use in applications where humidity and moisture are common such as ceiling or wall cavities found in basements, attics or other exterior wall in residential, commercial or industrial applications where drywall is commonly used. The moisture resilient and mold resistant barrier can provide protection in areas that are conducive for mold growth but cannot be easily monitored without specialized equipment. As noted, the coating can provide some insulative characteristics to the wallboard in this regard, as well.

Yet further, the wallboard panel can be installed with the polyurethane composition coated side facing outward, that is, on a room facing side so that the coated side is visible. Such application is useful in areas where grease and dirt can be a problem, such as kitchens or industrial facilities. The polyurethane composition is readily washable, as well as paintable. Further, foamed coating is embossable or texturizable, as set out further herein.

Gypsum drywall coated with the foamed polyurethane compositions of the present invention demonstrates superior screw and nail retention providing a self-sealing means of fastening over conventional gypsum drywall. Such screw and nail retention can be beneficial when the drywall is mounted in locations where vibration maybe a problem, such as in a motorized home or in an industrial facility.

An acoustical panel can reduce the noise in adjacent rooms when compared to traditional drywall panels. It is well known that foamed structures with areas of low density (foamed cells) surrounded by areas of increased density are useful as sound deadening barriers. Though there is prior art utilizing a gypsum sandwich panel today, the inventive polyurethane coating used in the present disclosure can provide improved structural integrity with better adhesion and sound dampening capabilities than prior art products. In this regard, gypsum drywall sandwich structures having a foamed polyurethane composition therebetween have utility for modular wall configurations where sound deadening capability would be beneficial in combination with structural strength, whereby the panels may not need to be anchored to studs. Instead the sandwich panels could be anchored from either or both of the ceiling or floor via permanent or semi-permanent fasteners.

OSB Composite Panels

In a further aspect, the present invention comprises OSB panels that are coated on one or on both sides with the inventive polyurethane composition, or as an adhesive coating for a sandwich panel. Such OSB panels can be used for outer walls, flooring, or roofing, as non-limiting examples. The polyurethane coating can be in the form of a layer or as a foam coating.

The cured-in-place polyurethane coating material exhibits a strong bond to the OSB surface. To this end, it is surprisingly found that the inventive polyurethane coating did not peel or otherwise lose adhesion even when the coated OSB board was boiled in water for several minutes.

In some aspects, the inventive polyurethane composition can be used as an internal binder for the OSB fibers themselves. When combined with a coating of the inventive polyurethane material, adhesion to the OSB can be excellent.

OSB panels are quite heavy. The differing thicknesses will be indicated by the specific applications, with thicker and heavier boards used in applications where more structural strength is required. The inventors herein have found that polyurethane compositions of the present invention can allow thinner OSB to be used substantially without sacrificing structural strength. This not only allows lighter weight that is, thinner, OSB panels to be used, but also can reduce materials cost. Yet further, some insulation value is imparted to the OSB. Similar results are found when plywood sheeting is coated with the polyurethane composition of the present invention. Fastenability of the panels to the building structure is not reduced and, in fact, may be improved according to the screw retention results discussed elsewhere herein. In one aspect, a conventional OSB panel can be coated with the inventive polyurethane composition to provide an OSB panel having greater thickness. The resulting coated board will have greater structural strength than the original uncoated OSB panel, but will have less weight than a comparable thickness OSB panel. To illustrate this concept, and as a non-limiting example, addition of an inventive foam coating to a ¼ inch OSB panel to generate a coated OSB panel having a thickness of $5/16$ inches would provide a weight of the resulting OSB panel of less than about 1.1 pounds per square foot, even while the structural strength of the coated ¼ inch OSB panel would be greater than the structural strength of the uncoated OSB panel. As another example, a ½ inch OSB panel can be coated with a thickness of inventive polyurethane foam to provide a thickness in the coated OSB panel of ⅝ inch. The weight of the ⅝ inch board would be less than about 2.1 psf, even while the structural strength of the coated OSB panel would be greater than the % inch uncoated OSB panel.

OSB Structural Insulated Panels

Yet further, the polyurethane composition can be foamed and sandwiched between two OSB panels to generate a SIP. Such SIPs are useful for building panelized construction elements. Yet further, such panels are useful for creating modular room configurations, such as is often done in office environments.

While OSB SIPs are known the art, generation of such SIPs using the in situ polyurethane composition of the herein provides, in one aspect, a more efficient manufacturing process. This is due, at least in part, to the elimination of a separate foam generation step and subsequent adhesion step, as is currently required in the fabrication of OSB SIPs. In one example of this process, one or both of an interior facing side on two OSB panels can be coated with the polyurethane components on a line. The respectively coated sides can then be brought together shortly after application. Each of the coated sides can then meld as part of the curing process to generate a foamed interior sandwiched between two OSB panels. The polyurethane foam sandwich layer will be adhered to each of the interior sides of the OSB panels as a result of the in situ polymerization process discussed herein. As discussed previously, the unique and surprising strength of the bond between the cured-in-place inventive polyurethane compositions means that a separate adhesive layer is not needed to ensure adhesion of the foam layer to the OSB panel(s).

Moreover, the impact resistance of OSB boards is a known limitation with conventional SIPs. Indeed, OSB can crack or splinter if there is not a protective cladding or siding applied on top, such as a siding. The high impact resistance of the inventive polyurethane SIPs provides substantial improvements to thereby allow the SIPs to be durably used as exterior surface components.

Adhesives

The present invention can also be used as an adhesive, whether in foamed or an unfoamed condition on a wide variety of substrates including, in non-limiting examples, gypsum wallboard, OSB board stock, plywood, lumber, cement cladding/siding, rigid foam, flooring material, extruded polystyrene, expanded polystyrene, concrete, wood planking, steel, aluminum, polyiso insulation, fiberglass, HDPE, MDPE, LDPE, fabric, paper, paperboard, MDF, plastic, cellulose materials, among other things. As discussed herein, the polyurethanes of the present invention have exceptional adhesion, while at the same time exhibiting properties such as resiliency, impact resistance, etc., where such properties can be selected for a particular use.

In a specific example of an adhesive utility for the construction context, for example, the polyurethane can be applied on framing, followed by application of a material, such as drywall (if an interior operation) or a OSB, siding etc. (if an exterior operation). The material can be attached using standard methodology (such as nailing, screwing etc.), however, the addition of the adhesive, especially when foamed, can increase the resiliency of the attachment. For example, when used between a stud and the backside of drywall, the point of attachment between these two building elements can be improved due to the screw retention aspects of the inventive polyurethane material, as discussed elsewhere herein. The exceptional adhesion in the present invention is also observed with foamed polyurethane layers on a number of surfaces.

Polyurethane Coated Structural Insulation Panels

In further implementations, the polyurethane composition can be used to generate a new form of SIP. In this regard, a building substrate having at least some insulative properties, for example, XPS or EPS, for example, can be coated on both sides with the inventive polyurethane composition, wherein the polyurethane composition has at least some foamed characteristics and is cured-in-place on the panel material.

Still further, the cured-in-place inventive polyurethane composition can be adhered to only one side of the XPS or EPS foam. In this regard, when assembled, the inventive SIP will have one surface in which the foam core is exposed prior to finishing. Such an exposed foam surface may be satisfactory for some applications, such as when the SIPs surface is used as an interior wall surface. In a notable distinction from prior art panels prepared from XPS or EPS, the cured-in-place polyurethane coating substantially does not result in melting of XPS/EPS due to the relatively low temperature of the exothermic curing reaction. This means that instead of requiring a finished layer to be adhered, such as via a tie layer, to the outer surface of the EPS panel, the polyurethane layer can be cured-in-place on the surface of the EPS panel. In this regard, a first layer of a mixture of aromatic polyester polyether polyol and isocyanate (foamed or unfoamed) can be applied to the outer surface of an EPS panel. That layer can be allowed to cure slightly, and then a second coating can be applied to provide the desired thickness of the polyurethane coating. The coated panel can also be polyiso or other types of insulating material.

The resulting panel, which can be characterized as a foamed insulative core sandwiched between inner sides of a cured-in-place polyurethane composition, exhibits surprising structural strength while also being lightweight and highly insulating, as well as providing substantial sound barrier characteristics. In this regard, this inventive SIP can be used in panelized construction, to create modular interiors, insulated wall panels, etc.

In contrast to conventional structural insulating panels that are constructed from OSB panels having an about 3 to 8 inch, or about 4 to 6 inch piece of foam incorporated within two OSB panels, the inventive structural insulating panels are very lightweight. OSB clad structural insulating panels can weigh from about 90 to about 100 pounds, or from about 2.8 to about 3 pounds per square foot. Since the polyurethane foam-coated panels are much lighter than an equally dimensioned (length, width, height, and thickness) OSB panel, the overall weight of a SIP comprising two foamed panels having a foam core sandwiched therebetween is at least about 10% less or at least about 20% less or at least about 30% or more less in weight per square foot than an equally dimensioned structural insulating panels formed from OSB panels having an about 3, or about 4, or about 5 or about 6 inch thick piece of closed cell foam sandwiched therebetween. Each of the inventive polyurethane panels that form a first and a second structural panel within which the foamed core is sandwiched can each be from about ¼ inch to about 1 inch or greater in thickness, or any of the standard thicknesses in which OSB is conventionally provided.

As would be recognized, adhesion between the foam core and the SIP outer layers is a common point of failure, especially in areas where extremely high or low temperatures are possible, or where large temperature variations are common. The excellent adhesive characteristics of the inventive polyurethane compositions can substantially eliminate this delamination problem. This improved adhesion is augmented by the unique cure in place features of the An example where the one or both sided polyurethane coated XPS or EPS can be used is for acoustical or soundproofing panels, especially where it might be desirable to reduce sound transmission through walls, while still providing a paintable or decorative surface. When used in office environments, the acoustical or soundproofing panels comprising foam sandwiched between the inventive polyurethane composition foamed panels can be useful to reduce sound transmission in environments were structural features, such as walls, may be temporary or semi-permanent.

Such inventive SIP material can also find utility in locations where decorative wall features may be desired. Such decorative wall features can be enhanced by the ability to paint the polyurethane coating and/or to create faux surface applications, such as a "stucco look," wood grain, textured surface, or the like. In one example, the inventive SIPs can be used to provide separation between areas in interior office environments or the like. Still further, the lightweight, but solid looking, structural insulating panels can have utility in generating theatrical scenes or movie sets.

The low cost, lightweight nature, and ease of assembly with the SIPs of the present invention can be used in the construction of emergency storage buildings, emergency structures, "tiny houses," or the like. The SIPs of the present invention save significant amounts of labor because the individual SIP panels can be manufactured to match construction plans for a job site such that a plurality of numbered panel components can be produced in a climate controlled factory to match the precise dimensions to match the construction plans. This means that when the inventive SIPs are erected at the job site, the individual panel components match the construction plans for the project with straight wall sections, corners, and all window and door openings in place. The individual SIPs can be configured in the factory with already installed windows/doors or window/door openings for installation of windows on-site, electrical and plumbing componentry, and the like. Instructions can be provided to facilitate construction. All or substantially all components are ready to install with substantially little or no need for jobsite modification.

The SIPs can be configured to lock together using conventional methods, for example using metallic or plastic seaming welds. Fit can further be enhanced by "snap lock" fits between adjacent panels, much like would be found in laminate flooring or the like. Such a fit can be facilitated by incorporating at least an edge molding process during the panel curing operation. The panels can be secured at the ceiling/roof and floor levels using conventional methodologies. As would be known, structures built from conventional SIPs (e.g., foam sandwiched between OSB panels), while highly energy efficient in theory, often fail to live up to the desired energy efficiency because of heat or cold egress through the seams. To avoid this problem, panelized structures are typically wrapped with a polymeric material, with the seams thereof being carefully sealed with appropriate tape to form an air barrier. This generates additional work and cost. Advantageously, the inventive SIPs can be grouted or chalked or taped at the seams thereof to form an airtight seal that substantially avoids the need to use a housewrap material to form an airtight seal between erected panels in the finished structure.

Polyurethane Coated Fiber Cement Panels

Yet further, the polyurethane compositions can be used as coating for fiber cement siding. In this regard, the exterior or interior facing side of the siding or siding can be light-weighted by reducing the thickness of the fiber cement portion without reduction of the structural strength of the material. As mentioned previously, the inventive polyurethane compositions exhibit a surprising amount of structural strength, as compared to other foamed polyurethane compositions. The polyurethane coated fiber cement siding or panels are at least about 10% or about 20% or about 30% lighter in weight than a fiber cement panel of the same thickness that is not coated.

Moreover, as would be recognized, fiber cement is prone to cracking. Care must then be taken when fastening the materials to a structure. The inventive polyurethane coating provides a substrate for nails and screws that enhances retention thereof.

The polyurethane coated fiber cement siding and panels are also insulative over conventional substrates.

Coated Concrete or Masonry

The inventive polyurethane compositions also show strong adhesion to concrete or masonry surfaces. The adhered polyurethane coatings can be layers or foams, as discussed elsewhere herein. The coatings can provide waterproofing, decorative aromatic polyester polyether polyols (e.g., stucco-like, wood grain), cushioning when foamed coatings are used, etc.

Laminate Flooring and Subfloors

Yet further, the inventive polyurethane compositions can also be used as a backing material for laminate flooring, such as to provide a cured-in-place cushioning material and/or sound proofing material. Accordingly, when used as a backing for laminate flooring, the separate polymeric floor underlayment material that is used between the top of the floor surface and the bottom of the laminate flooring could be eliminated. Alternatively, such coated laminate materials can exhibit lesser sound transmission and improved cushioning.

Polyurethane Coated Structural Steel Panels Having Insulative Properties

In further implementations, the polyurethane compositions of the present invention can be used to generate a steel faced SIP. Yet further, the polyurethane composition can be foamed and sandwiched between two steel panels to generate a SIP. Such SIPs are useful for building panelized structures, such as prefabricated buildings, as discussed elsewhere herein. Yet further, such panels can be useful for creating modular room configurations, such as is often done in office environments.

While steel faced SIPs are known the art, generation of such SIPs using the in situ polyurethane composition of the herein can provide, in one aspect, a more efficient manufacturing process. This is due to the elimination of a separate foam generation step and subsequent adhesion step, as is currently required. In one example of this process, one or both of an interior facing side on two steel panels can be coated with the aromatic polyester polyether polyol and isocyanate components on a line. The coated sides can then be brought together shortly after application. Each of the coated sides can then meld as part of the curing process to generate a foamed interior sandwiched between two sealed panels. The polyurethane foam interior will be adhered to each of the interior sides of the steel panels as a result of the in situ process discussed herein. As discussed previously, the unique and surprising strength of the bond between the cured-in-place inventive polyurethane compositions means that a separate adhesive layer is not needed to ensure adhesion of the foam layer to the steel panel(s).

Polyurethane Foam Insulation Materials

The present invention provides foamed materials that can be used as insulative panels for construction applications. In one implementation, the foamed materials can be fabricated into panels that exhibit at least some R-value that compares favorably with other types of insulation material, such as glass-wool or XPS. In this regard, a 2 pcf foam made from the materials of the present invention will exhibit an R-value of at least about 2 or about 3 at a thickness of about 1 inch or at least about 2 or about 3 at a thickness of about ½ inch. Additionally, in comparison to the fire tendency of XPS, insulation panels made from the inventive polyurethanes exhibit a greatly improved fire resistance, at least because they are not derived from petrochemical materials as is XPS. Yet further, the recycled and sustainable content of panels made from the present invention can provide further benefits over insulation panels prepared from XPS.

Polyurethane Foam Structural Materials

In significant further aspects, the present invention comprises rigid polyurethane foam materials suitable for providing structural support in a construction setting or in other applications where structural foam may be indicated. In this regard, the structural polyurethane foam materials can be "load-bearing," as such term would be known to one of ordinary skill in the art. In other aspects, the structural foam materials of the present invention can be used to generate lightweight cladding material, as such term is defined elsewhere herein.

Polyurethane foams generated from the inventive materials are useful in composite constructions and fabrications to generate structural foam materials useful in construction and other applications. The inventive foams can comprise integral-skin foams, or self-skinning foams, which couple a high-density skin and a low-density core.

The structural foam materials derived from the inventive polyurethane compositions of the present invention can be configured into a wide variety of sizes, thicknesses, and densities and, as such, can effectively operate as a substitute for conventional building materials. In this regard, the structural foam materials of the present invention comprise flexural strength, light-weight, inherent mold resistance, substantial thermal resistivity, water-repellant, non-corrosive attributes as well. The resultant material is very resilient, resists denting and has superior nail and screw retention (equal to or greater than certain woods) to that of other materials. The structural load-bearing urethane will never rust, pit, peel, corrode or flake away. The resultant material is very ecofriendly and can be verifiably "green."

Due to the strength and the light-weight characteristics of the material, there is less possibility of damage during shipment, storage on the jobsite and during installation. That is, the structural foam materials of the present invention are substantially or completely water resistant, which can not only reduce shipping and storage costs, but also deterioration due to water damage.

The structural material can be cut and sawn just like wood. Notably, the inventive polyurethane materials can have a lower propensity to generate harmful dust when sawed, thus making these materials an alternative to conventional fiber cement materials. The structural foam materials comprise impact resistance and, therefore, can be hammered, screwed and nailed much like wood. The structural foam materials are naturally resistant to insects and therefore require minimal maintenance over the life of the product.

In one aspect, the structural foam materials can be made in panel or sheet form using a laminator. As would be recognized, such methods allow polyurethane sheets or panels to be manufactured continuously or substantially continuously. The aromatic polyester polyether polyols are combined with the isocyanate components, blowing agent, and any additives, including any filler materials, via one or more mixing heads and the mixture laid down on a belt system. Dynamic mixing methodologies are suitable for use herein. The panels can then be cut into smaller panels of a desired length before or after curing.

In some aspects, the structural foam materials of the present invention can be formed in either an open cast mold process or a closed-mold process. In the open cast mold process, the aromatic polyester polyether polyol, isocyanate, blowing agent, and any additives are mixed and poured into the open mold and allowed to cure, with the polyurethane reactant material present top/open part of the mold being kept level during the curing process. In the closed cast mold process, the aromatic polyester polyether polyol, isocyanate, blowing agent and any additives are mixed and poured into a mold part. The mold is then closed and the mixture is allowed to expand and cure. The mold parts can incorporate patterning to impart surface décor on the resulting structural foam materials, such as a faux wood grain or stone-look pattern. The molds used herein can be fabricated from a variety of materials such as HDPE, ultra-high molecular weight PE, polyethylene or silicone.

Yet further, pultrusion processes can be used. As would be recognized, a polyurethane pultrusion system typically includes a two-part metering unit, an injection chamber, additional heat zones and cooling zones. The entire system is "closed" which shields the polyurethane from exposure to air and moisture. Pultrusion allows the incorporation of carbon fiber, glass, aramid and basalt reinforcements in applications ranging from complex shapes and heavy wall structural shapes, to thin wall hollows, and all-roving profiles.

To provide the requisite structural characteristics in construction applications, a minimum density of at least about 15, or about 20, or about 25, or about 30, or about 35, or about 40, or about 45 or greater pcf is provided by the structural polyurethane foam materials of the present invention. Lower densities can be appropriate for insulation applications.

A notable aspect of the structural foam materials of the present invention is the adhesive characteristics exhibited by the polyurethane composition of the present invention. Such adhesive characteristics could dictate that the inventive polyurethane composition not be used in for applications in which the adhesion would cause problems in a manufacturing environment. Indeed, a highly adhesive polyurethane material would not be selected for use to generate molded, pultruded or cast poured construction products, at least because, upon curing, the polyurethane composition would stick to the mold, belt, etc. The inventors herein have surprisingly determined that the polyurethane composition of the present invention, while exhibiting remarkable adhesive properties, can nonetheless show utility as structural building materials for use in construction applications.

In significant aspects, the polyurethane structural foam materials of the present invention will comprise at least some mold release agent on a surface thereof upon removal from the mold, belt etc. Moreover, at least some of the mold release agent will remain on the surface of the cured material in use.

Structural Foam Construction Cladding

When configured into sizes consistent with conventional building materials, the structural foam materials of the present invention provide significant benefits over other forms of cladding (e.g., wood, fiber cement, aluminum, vinyl, etc.) and, therefore, can comprise a substitute in residential and commercial construction applications. The structural foam materials of the present invention are suitable for use in creating lightweight facades, wall systems, soffits, fascia elements, window elements, and trim elements. Yet further, the structural foam materials as cladding can be implemented as a stand-alone cladding system or a feature of rain barriers, rain screens, composite panels, fiber-cement board, glass-fiber reinforced concrete as well as metals or other materials. The inventive material can also be utilized as part of an air barrier system or moisture barrier protections, and are themselves moisture resilient and can impart moisture resiliency to the structure in which they are incorporated.

Architects and material specifiers generally select cladding systems based upon aesthetics, performance needs, and suitability to their application. Continuous insulation is a major component in the selection process. The type of construction, climate zone and the building's intended use are part of the determining factors. Whether the continuous insulation component is interior to the structure or to be an outside layer of the structural framing is also a relevant decision. Much of the continuous insulation requires specialty clips, screws and sealing washers to install continuous insulation materials. Some fasteners are designed to support the insulation only.

When configured in the form of cladding material, the polyurethane materials of the present invention are structural in nature, while also exhibiting insulative value and the strength necessary to accommodate most standard fastener systems. As shown in the examples, hereinafter, Cobb Ring testing revealed that substantially no water penetration occurred through the fastener which indicates that the material is "self-healing" around the fastener itself.

For use as cladding, the structural foam materials can be supplied in a wide variety of sizes. For siding material, the structural foam materials can be provided in about 6, 8, 10, 12 foot lengths with a height of from about 4, 6, 8, 12 or more. Thickness can be from about ¼, ½, ⅝, ¾, or 1 inch or more. When provided in sheet form, the structural foam materials can be provided as specified for a particular application, such as in about 4 to about 8 or about 4 to about 10 foot sheets, having thicknesses as previously stated.

The polyurethane compositions of the present invention can be used as interior or exterior wall or flooring components. Panels can be generated in a number of sizes, as would be appreciated. In non-limiting examples, the panels can be about 2, 4, 6, 8, 10 or 12 feet in length or width. Thickness can be from about ½, ⅝ inch, ¾ inch, 1 inch, 1¼, 1½, 1¾ or 2 or more inches in thickness. Any of these length or width or thickness values can be used.

In various aspects, the wall systems can be used in industrial settings were durability is desirable, for garage doors, for sporting venues, seawalls, and the like. The load-bearing characteristics of the polyurethane materials of the present invention means that wall, roofing, and flooring structures that will be subject to pressures from materials pressing thereon can benefit from use of the inventive polyurethane materials. Moreover, the substantial water-impermeability of the inventive materials make them particularly suited for use in wet locations. The impact resistance and resiliency also make the materials useful in location where objects may come into contact with the wall materials. In this regard, the structural foam material is resistant to hail damage when used as a roofing material.

Structural Foam Filling Material

The present invention can be used to generate foam materials that can be used to fill cracks, voids, porosities, holes, or openings etc. in concrete, wood, soil, rock, or the like. For example, when foamed, the materials herein can be used to fill cracks in concrete structures (driveways, roadways, cement blocks) while at the same time restoring at least some of the structural strength lost upon appearance of the crack etc. Yet further, the foamed materials can be used provide both fill and to restore structural support for ground-based locations having sinkholes, cracks, etc.

Structural Foam Building Blocks

In some aspects, the polyurethane foam materials of the present invention can be configured in block form in conventional size (i.e., cement blocks, masonry materials, etc.) or in custom size (i.e., cut to specification). When in this configuration, the blocks comprise a high compressive strength for support, for example to support roof-column loads. The inventive blocks also resist distortion under load over time. In this regard, the inventive blocks can have a compressive strength of at least about 350, 500, 1,000, 1,500 or greater as measured by D-1621 The inventive blocks have a density of about 20 pcf or greater, or 25 pcf or greater, or 30 pcf or greater or 35 pcf or greater.

Shaped Structural Polyurethane Foam Materials

The inventive polyurethane materials can be used to generate components that provide shaped structure in as intended application, that is, provide load-bearing characteristics, in specifically required shapes. In this regard, the compositions of the present invention can be used as lumber substitutes or in tandem with a variety of applications, for example, as I-beams, H-beams, I-joists, or the like. Yet further, the inventive compositions can be fabricated into traffic control structures, such as guard rails or traffic barriers. Yet further, fluted round, fluted or hexagonal shapes can be generated for used as power poles, columns, pipes, etc. Materials made for such applications can be generated from pultrusion processes, for example. Using pultrusion, for example, much larger structures can be generated than can be generated from injection molding techniques. In this regard, the shaped structural polyurethane materials are not prepared from injection molding techniques.

Polyurethane Spray Foam Insulation and Sealant Foams

Environmental control within a building envelope depends on strong interaction between heat, air, and moisture transport collectively. The polyurethanes of the present invention can be used to provide a sprayed on insulation. In this regard, the blowing agent and spraying conditions can be adjusted to provide a high density foam (for example, about 24 to about 32 kg/m$^3$ [1.5 to 2 pcf]) or a low density foam (for example less than about 8 Kg/m$^3$ [0.5 pcf]). The polyurethane of the present invention can also be used to provide a sealant foam.

Other Applications

The polyurethanes of the present invention can also be used as structurally strong, as well as fire resistant, linings for pipes, pipelines etc. For example, a damaged pipe can be sprayed to fill and cover any parts that are cracked, frayed, etc. Yet further, a pipe can be coated with prior to use to reduce the possibility that the pipe will become damaged in use.

The polyurethanes of the present invention can also be used for aerospace applications, for example. In this regard, the materials have been shown to wet out carbon materials (e.g., fibers) that are commonly used in generating components for aerospace products.

The materials of the present invention can also be used in insulative applications, such as for lining of trailers, railcars, etc. to allow temperatures to be maintained within a desired range. For example, for transportation of products through hot or cold areas, a temperature can be maintained at above freezing, or above about 40° C. and below about 110° C., or below about 105° C., even though the exterior temperature is below or above a temperature at which damage may result to the product being transported therein. Such insulative properties are accompanied by the structurally strong properties of the inventive polyurethanes, thus providing additional benefits.

The materials of the present invention can be used to create structural components for vehicles (e.g., automobiles, busses, trucks, aircraft etc.) where structurally strong, but lightweight materials are indicated. For example, the materials can be used to generate seating components and panels for aircraft. Panels and parts for automobiles can also be made from the inventive composition.

Yet further, the materials can be used to in sporting applications, such as in the fabrication of surfboards, skateboards, helmets, snow and water skis, portable dance floors, and the like.

The inventive polyurethane materials can also be used in medical applications such as, X-ray and diagnostic tables, in medical devices, prosthetic devices, casings for instrumentation, or the like.

Describing now in more detail the drawings, numerals are included to specify unique aspects and like components of the drawings throughout various views or intended applications. Utilization of each object of the present disclosure may be used in any wall or ceiling application as deemed necessary.

Figure 2A:
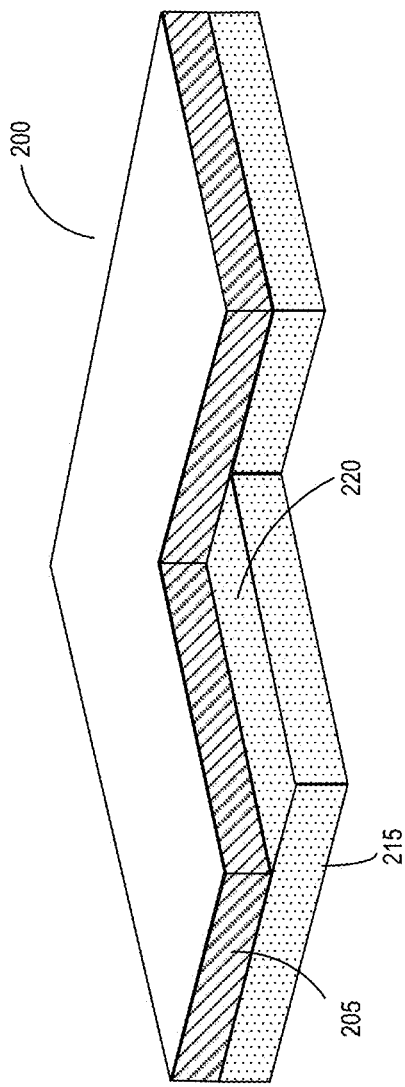
FIGS. 2a and 2b are cross-sectional views of one implementation of a composite substrate coated with the foamed inventive polyurethane adhesive coated on one surface.
Figure 2B:
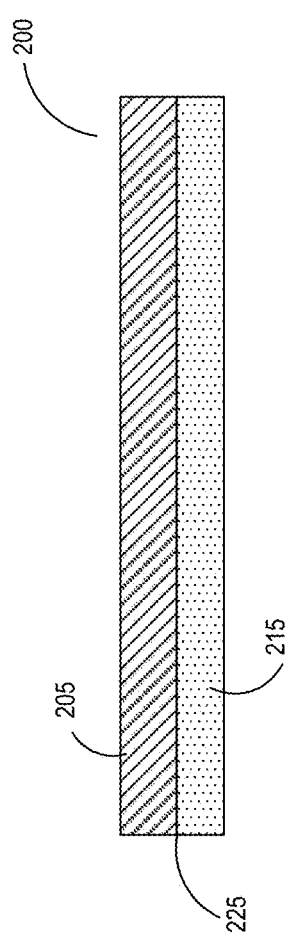

FIG. 2a represents a composite panel 200 having a substrate panel 205 in which the substrate panel 205 is coated on an interior side 210 (not shown) with, and therefore is adhered to, a cured-in-place polyurethane adhesive foam layer 215 at interior side 220. Substrate panel 205 can comprise a variety of materials, including gypsum drywall, wood (e.g., plywood, OSB, etc.), cement, expanded or extruded polystyrene, polyurethane, metal, fiberglass, among other things, FIG. 2b represents a side view orientation of composite panel 200 showing the layering of substrate 205 and polyurethane foam layer 215 with adhered interface 225, which can be at one or more locations, or can be as a continuous layer. The polyurethane layer, can be from about 25 to about 100% of the total thickness of the building panel. In this non-limiting example, the composite building panel has a total thickness of about "and the polyurethane layer thickness of about 1 to 1½" more or less.

FIGS. 3a and 3b illustrate a composite panel 300 having a substrate 305 coated with an unfoamed polyurethane coating 310 adhered to the substrate 305 at an interface 315. Composite panel 300 has substrate outer surface 320 and coating outer surface 325. Substrate panel 305 can comprise a variety of materials, including gypsum drywall, wood (e.g., plywood, OSB, etc.), cement, expanded or extruded polystyrene, polyurethane, metal, fiberglass, among other things.

FIGS. 4a and 4b illustrate a composite sandwich panel 400 having a first building panel substrate 405 and a second building panel substrate 410 having a foamed polyurethane adhesive layer 415 adhered at first building substrate inner surface 420 (not shown) and second building substrate inner surface 425. Substrate panel 405 can comprise a variety of materials, including gypsum drywall, wood (e.g., plywood, OSB, etc.), cement, expanded or extruded polystyrene, polyurethane, metal, fiberglass, among other things.

Figure 5:
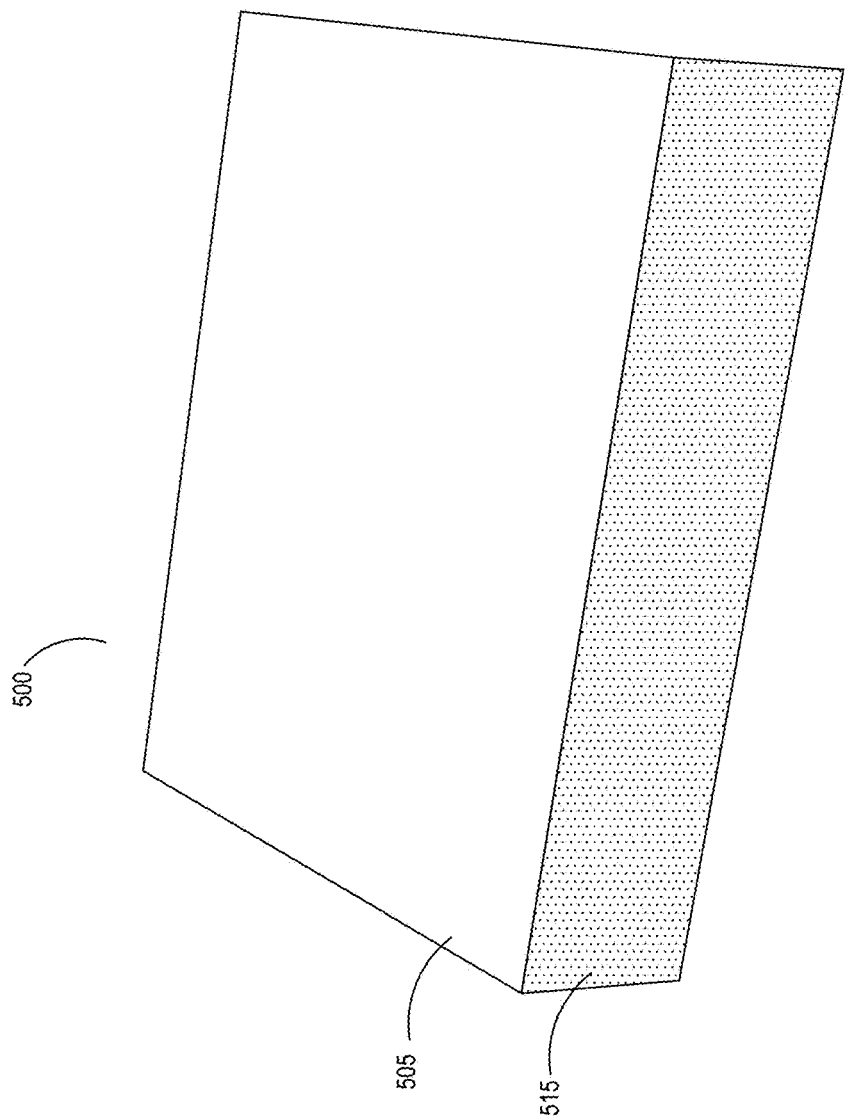
FIG. 5 is a view of one implementation of a foamed panel generated from the inventive polyurethane composition.

FIG. 5 illustrates structural foam materials 500 in the form of a foamed panel having outer surfaces 505 and 510 (not shown), as well as foamed interior portion 515.

Figure 6:
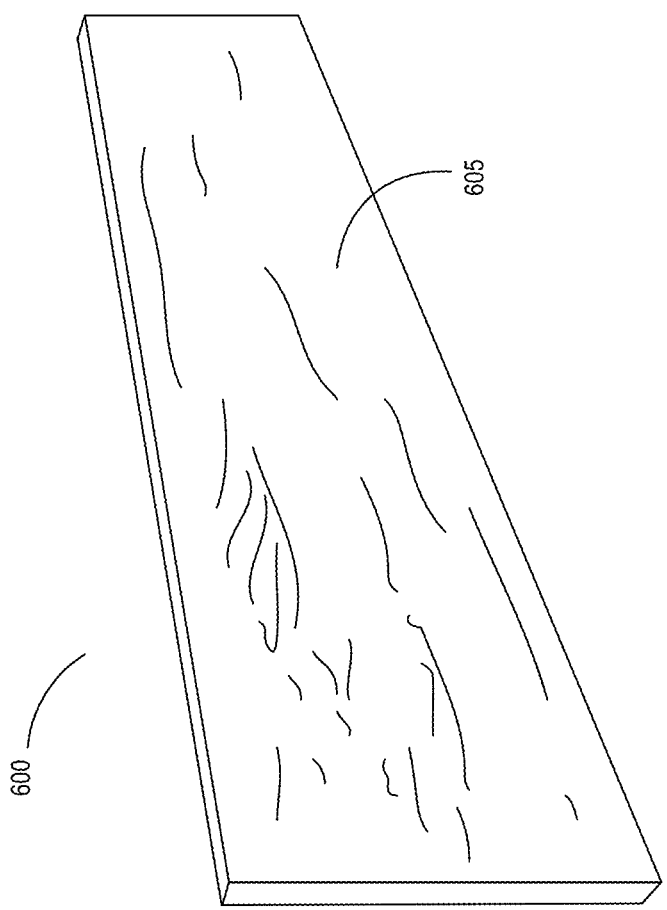
FIG. 6 is a view of one implementation of a siding material generated from the inventive polyurethane composition.

FIG. 6 illustrates foamed panel structure 600 having outer surface 605. While FIG. 6 illustrates structure 600 configured as a siding material, including illustration of embossed surface 605 providing a simulated or "faux" wood-grain finish.

Figure 7:
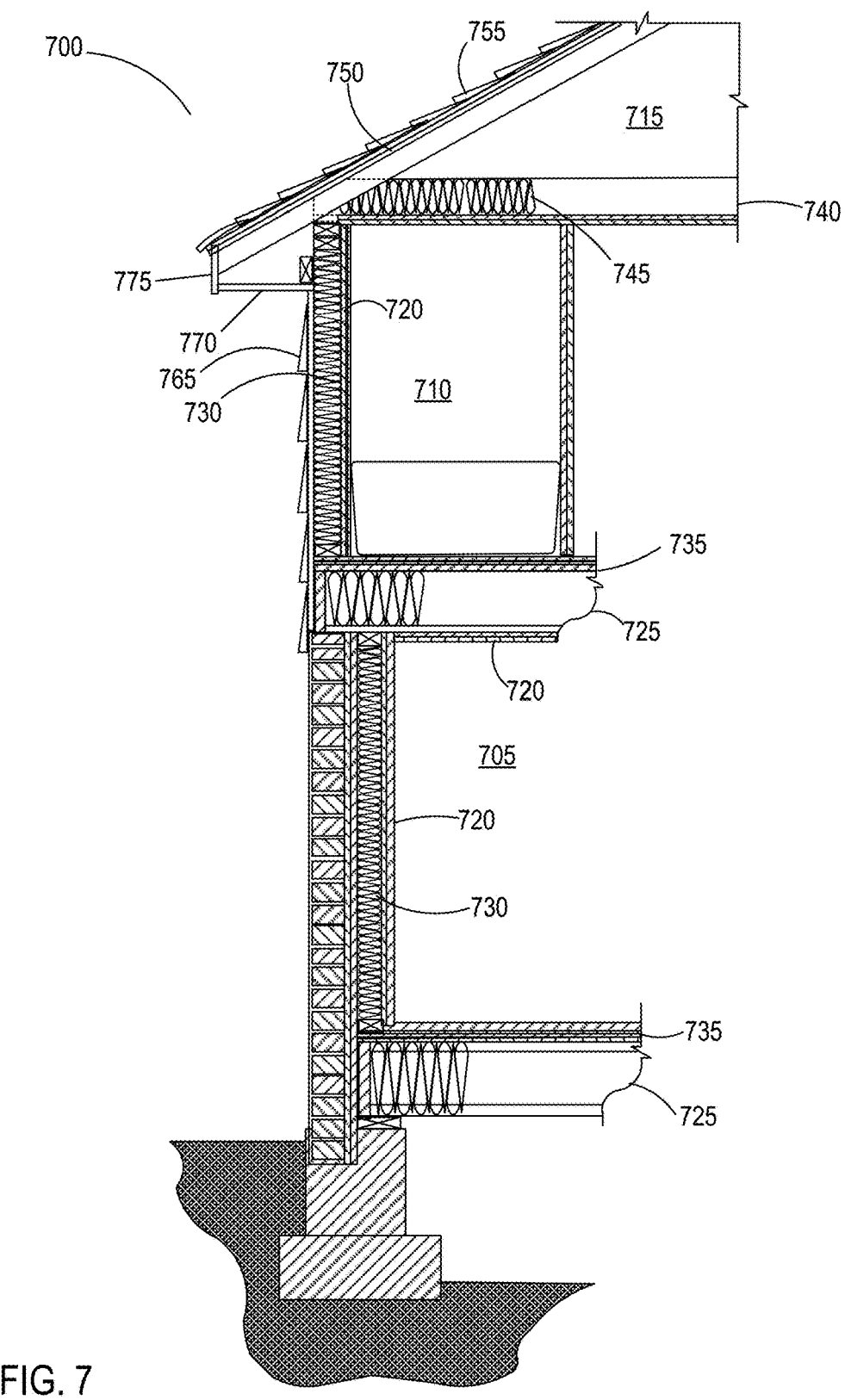
FIG. 7 is a partial cross-sectional view of a residential building structure showing a plurality of uses for building materials that incorporate or are derived from the inventive polyurethane compositions.

FIG. 7 illustrates generic residential structure 700 having room 705, bathroom 710, and attic 715. The composite building substrates of the present invention can be used in a variety of locations in residential structure 700. For example, a coated drywall 720 can be used in room 705 or bathroom 710. Structural floor panel 725 can be used as a subfloor/joist. Structural wall panel 730 can be used below coated drywall 720. Composite underlayment panel 735 is also contemplated. Composite panel 740 is thicker than 730 to indicate a thicker insulation material 745, as is often desirable in a roofing location as shown. Composite roofing panel 750, which is comprised of polyurethane coated OSB, for example, is further shown having shingles 755 affixed thereto. Siding 765 can also be used in residential structure 700, as well as in soffit 770 and fascia 775. As would be recognized, the illustrated composite panels and uses thereof can be used alone or in combination and the presented examples are intended to be non-limiting.

Figure 8:
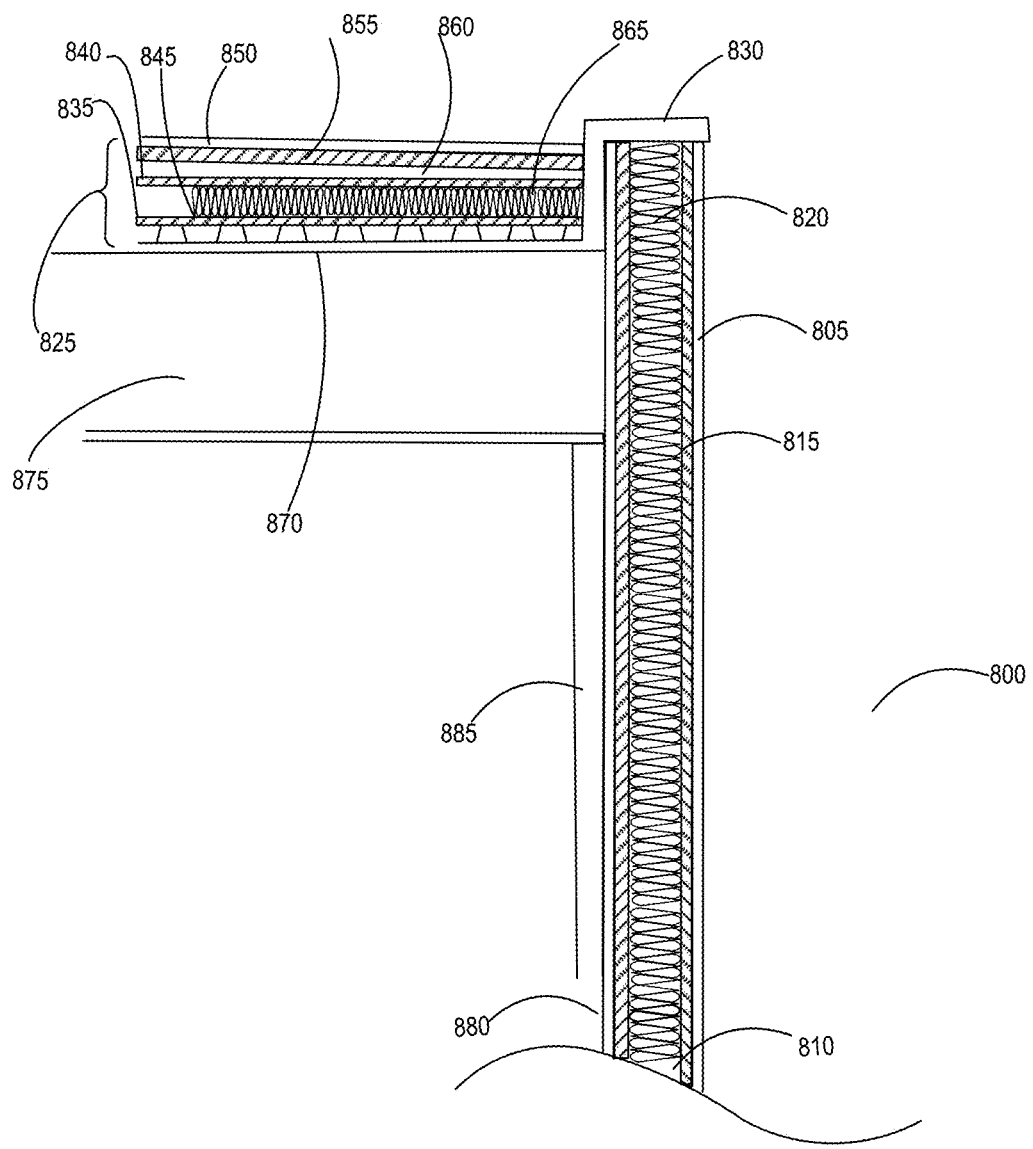
FIG. 8 is a partial cross-sectional view of a commercial building structure showing a plurality of uses for building materials that incorporate or are derived from the inventive polyurethane compositions.

FIG. 8 illustrates a typical section for a commercial roof and wall cladding system 800. The structural foam materials and/or composite materials can be incorporated in one or more of the described components. In this regard wall facing or finish 805 can be externally facing structural foam materials on outer wall 810, for example. A layer of the structural foam materials can be used as air barrier 815. Structural insulation panel 820 can be incorporated on an interior portion of outer wall 810. In roof area 825, coping 830, as well as various configurations of the inventive building materials can be used in the form as light weight roof deck 835, air barrier 840, insulation 845, water control cladding 850, structural sheathing 855, rigid sheathing insulation 860, and air barrier roof sheathing 865. On an interior side 870, the inventive materials can be used as structural beam 875. On interior wall 880, the inventive materials can be incorporated as a structural framework 885.

Figure 9:
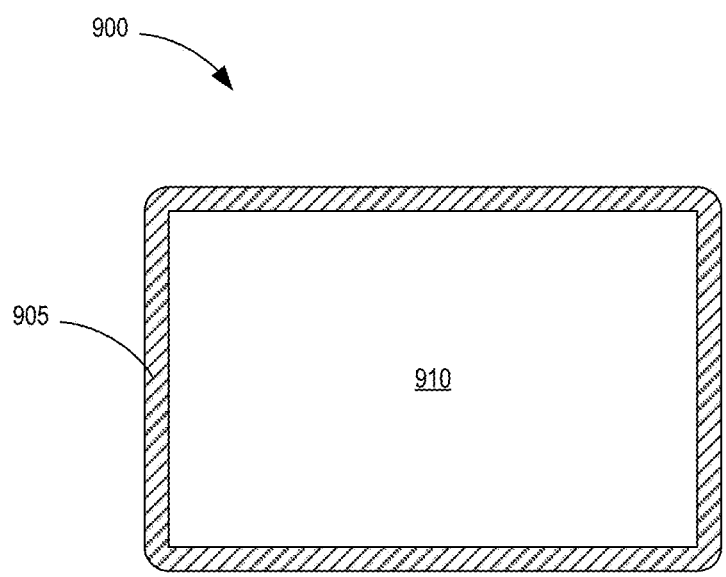
FIG. 9 is a view of a fully coated, generic building structure.

FIG. 9 illustrates an encapsulated material 900, in which a substrate, for example, a component 910 that is fully coated with the inventive polyurethane coating 905. Component 910 can be any material that is desirable for coating with inventive polyurethane coating 905, for example, wood, concrete, metal, fiberglass, among others.

Figure 10:
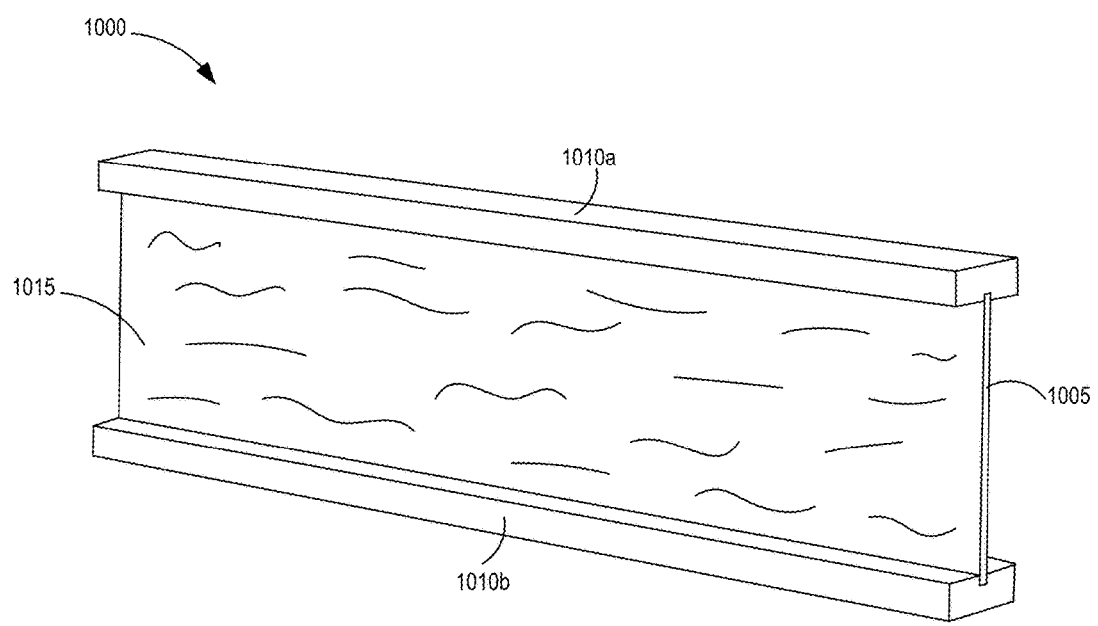
FIG. 10 is an I-Joist partially coated with the polyurethane composition of the present invention.

FIG. 10 shows I-joist 1000 having lateral section 1005 affixed between ends 1010a and 1010b. Lateral section 1005 is shown with inventive polyurethane foam 1015 coated thereto (and the opposite side thereof—not shown). I-joist 1000 can be used in building applications where fire resistant characteristics are desired.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1. Preparation of Aromatic Polyester Polyether Polyols

Glycerin materials modified via ethoxylation were obtained from Ethox Company (Greenville, S.C.) as prototype samples. The PET had an I.V. of 0.83 (DAK 7000, Dak Americas, Charlotte, N.C.). The following materials in the indicated amounts were used in the procedure that follows herein below: ethoxylated triol-glycerin or trimethylolpropane with 5 moles ethoxylation, 70.0 wt %; polyethylene terephthalate, 29.99 wt %; Fascat 4201, 0.01 wt %. Briefly, the procedure was carried out as follows:

(Step 1) All ingredients were added with good agitation to a clean, dry, hot reactor capable of heating to 250° C. An overhead condenser may be necessary for a slight removal of water and some ethylene glycol, but such removal can be optional.

(Step 2) Began a nitrogen sparge to remove oxygen that may be dissolved in the triol and start heating. The nitrogen sparge was controlled to ensure that ethylene glycol was not rapidly removed from the mixture, as it was found if the sparge was too strong the viscosity of the mixture would increase rapidly, resulting in a difficult to manage mixture. The PET pellets contained some moisture that came off above 150° C. When the temperature reached 170° C., a gentle nitrogen purge blanket was applied.

(Step 3) Continued heating to 240-245° C. Note: If heating cycle was slow then the reaction could go to completion before 240° C. and so can be sampled prior to 240° C. For this example conducted on a bench-scale reactor process, the heating was generated over about 2 hours. For an industrial scale process, the time would be varied accordingly.

(Step 4) Began sampling for completeness of reaction. Once the hot sample was clear (e.g., no visible PET pellets), a Clear Pill Test was conducted. Sampling was taken and for "Clear Pill" every 10 minutes. (Note that the appearance of a Clear Pill result was seen to vary from reaction to reaction, depending, for example on the type and degree of ethoxylation for the triol, and the amount of PET used. The simplicity of the Clear Pill test allows such variability to be readily managed in use, however.) Once a 10-minute Clear Pill was established, viscosity was checked. Depending on the reaction mixture ingredients, the viscosity at Clear Pill for the glycerin generated polyol was from about 2.7 about 3.2 Poise using a Brookfield Cone and Plate with a #4 spindle, 60° C., 100 rpm. (Note: for some samples, the viscosity evaluation was run at 70° C. This would be evident at the start for very viscous materials, for example, such as was seen with 2 moles ethoxylated glycerin and 50% PET.)

(Step 5) The heating was continued at about constant temperature of 240° C. for 10 to 30 minutes to ensure completeness of transesterification process and then heat was turned off. Checked viscosity when Clear Pill Test completed every 15 minutes in this post-Clear Pill step. Note that this step, could be omitted in some implementations, however, as long as a Brookfield Cone and Plate Viscosity of 5 Poise or less (Spindle #4, 60° C., 100 rpm) is generated. For PET transesterified with ethoxylated glycerin, the target Brookfield Cone and Plate Viscosity after the second heating step was specified to be about 3.2 to about 3.7 Poise (Spindle #4, 60° C., 100 rpm) and from about 4.0 to about 5.0 Poise (Brookfield, spindle #4, 60° C., 100 rpm) was specified for an inventive polyol generated from ethoxylated TMP. If viscosity was within specification the sample was cooled and prepared for storage by placing in an appropriate container. (Note: Viscosity increased quickly when cooled below 60° C., but will decrease upon application of heat for use.)

Example 2. Testing Procedures for Reaction Mixture

Clear Pill Test: Several drops of product were placed on a clean dry surface. A cloudy appearance after 10 minutes indicated that the PET had not been suitably transesterified to generate the aromatic polyester polyether polyols of the present invention. Once clear for 10 minutes the sample passed the Clear Pill Test. The Clear Pill Test was not an indication that the reaction is complete, rather that the catalyst is working correctly. Completion of the reaction would typically take 10 to 30 minutes longer at 240-245° C., as described in Example 1.

A Brookfield Cone and Plate viscometer was used because of speed of testing, but other viscometers can be used. A #4 spindle at 100 rpm and 60° C. was used for the Brookfield Cone and Plate method.

Hydroxyl Number of the ethoxylated triol was determined according to standard test methodology, namely ASTM 4274-16, Test A.

Example 3. Effect of Varying Moles of Ethoxylation on Polyol Properties

The procedure to make these polyols was in accordance with the method disclosed above. The characteristics of the generated polyols were as set out below in Table 1.

TABLE 1

CHARACTERISTICS OF ETHOXYLATED GLYCERIN.

| Moles of ethoxylation on glycerin | Hydroxyl # | Calculated M.W. (g/mol.) | Brookfield Cone and Plate viscosity cps of ethoxylated glycerin (spindle #4, 60° C., 100 rpm) |
|---|---|---|---|
| 1 | 1232 | | 54.8 |
| 2 | 917 | 184 | 40.3 |
| 3 | 726 | 232 | 33.7 |
| 4 | 613 | 275 | 27.1 |
| 5 | 519 | 324 | 25.1 |
| 6 | 461 | 365 | 23.1 |
| 7 | 419 | 402 | 23.1 |
| 9 | 345 | 488 | 24.4 |

Example 4. Glycerin-Derived Aromatic Polyester Polyether Polyol Properties

Samples were prepared using the procedure above, where each of the aromatic polyester polyether polyol preparations was conducted with 30% PET and 70% of the modified glycerin having the specified moles of ethoxylation. The samples were made into 25 g pucks to examine physical properties. 30% PET/70% ethoxylated glycerin-derived polyols from the previous example were reacted with isocyanate at a 50:50 ratio. The aromatic polyester polyether polyols and isocyanate were mixed and DBTL catalyst was delivered during mixing with a pipette in one drop and allowed to cure in aluminum dishes for 24 hours. In the table below, "NT" indicates that the composition was not tested for the indicated parameter. Data for Example 4 are provided in Table 2 below.

TABLE 2

PHYSICAL PROPERTIES OF INVENTIVE POLYURETHANES.

| Moles of ethoxylation on glycerin | Brookfield Cone and Plate viscosity cps of 30% PET/ethoxylated glycerin transesterification product (spindle #4, 60° C., 100 rpm) | Initial weight of puck (g) | 24 hour weight of puck (g) | 24 hour Shore D Hardness |
|---|---|---|---|---|
| 1 | 220 | NT | NT | NT |
| 2 | 257 | NT | NT | NT |
| 3 | 265 | NT | NT | NT |
| 4 | 285 | 21.35 | 21.36 | 80 |
| 5 | 283 | 21.36 | 21.37 | 77 |
| 6 | 327 | 20.95 | 20.97 | 82 |
| 7 | 361 | 20.35 | 20.36 | 81 |
| 9 | 413 | 21.65 | 21.66 | 76 |

Example 5. Comparison of Aromatic Polyester Polyether Polyols Having Same Degree of Hydroxylation at Standard Isocyanate Composition An examination of the effect glycerin ethoxylation on polyurethane properties at the same effective isocyanate level (in relation to hydroxyl number of the ethoxylated glycerin) was conducted. In this regard, a 25 g amounts of 50:50 polyol:isocyanate mixtures (30% PET/70% ethoxylated glycerin) were mixed with 1 drop DBTL catalyst, where the glycerin had the indicated moles of ethoxylation. 5 moles of ethoxylation on glycerin was used as a baseline to vary the amount of hydroxyl functionality among the samples by varying the amounts. The reactions were conducted on aluminum plates from which the reacted materials could be removed as pucks for testing. Data for Example 5 are provided in Table 3 below.

TABLE 3

PROPERTIES AT SIMILAR HYDROXYL VALUE.

| Moles of ethoxylation* | Ratio of isocyanate** | Initial weight of pucks (g) | 24 hour weight of pucks (g) | 24 hour Shore (D) Hardness |
|---|---|---|---|---|
| 4 | 1.18 | 21.25 | 21.26 | 80 |
| 6 | 0.842 | 21.53 | 21.54 | 81 |
| 7 | 0.806 | 20.44 | 20.44 | 79 |
| 9 | 0.664 | 22.14 | 22.15 | 74 |

*Moles of ethoxylation per mole glycerin that was used in preparation of aromatic polyester polyether polyol.
**Ratio of isocyanate to aromatic polyester polyether polyols.

Example 6. Moisture Regain Study

50:50 amounts of polyol:isocyanate (30% PET/70% ethoxylated glycerin-derived polyols) were mixed with 1 drop DBTL catalyst, where the glycerin had the indicated moles of ethoxylation. The 25 g pucks were submerged in tap water for the indicated time at room temperature. As shown in the Table 4 below, moisture uptake was minimal for all samples.

TABLE 4

MOISTURE REGAIN.

| | Moisture % Difference | | | | | |
|---|---|---|---|---|---|---|
| Moles EO* | 24 hours | 48 hours | 72 hours | 96 hours | 120 hours | 148 hours |
| 2 | 0.22 | 0.31 | 0.4 | 0.49 | 0.6 | 0.64 |
| 3 | 0.09 | 0.18 | 0.22 | 0.27 | 0.34 | 0.36 |
| 4 | 0.07 | 0.13 | 0.2 | 0.22 | 0.25 | 0.26 |
| 5 | 0.11 | 0.2 | 0.27 | 0.31 | 0.39 | 0.4 |
| 6 | 0.09 | 0.2 | 0.27 | 0.29 | 0.36 | 0.4 |
| 7 | 0.09 | 0.2 | 0.22 | 0.29 | 0.31 | 0.35 |
| 8 | 0.11 | 0.24 | 0.28 | 0.28 | 0.54 | 0.58 |

*Moles ethoxylation per mole glycerin

Example 7. Weight Change after 24 Hour Cure

Using the same procedure from the previous example of 50:50 ratios (30% PET/70% ethoxylated glycerin:isocyanate) fabricated into 25 g pucks were evaluated for weight change after a 24 hour cure. Samples were kept at room temperature and 50% humidity. The data are provided below in Table 5. The data therein show that there is minimal weight change on curing for 24 hours.

TABLE 5

WEIGHT CHANGE ON 24 HOUR CURE.

| Moles EO* | % change in 24 hours |
|---|---|
| 2 | 0.068 |
| 3 | 0.023 |
| 4 | 0.023 |
| 5 | 0.022 |
| 6 | 0.044 |
| 7 | 0.023 |
| 9 | 0.090 |

*Moles ethoxylation per mole glycerin

Example 8. Flame Retardancy Data for Polyurethane Panel Made with Polyol Derived from Glycerin with 5 Moles Ethoxylation A burn test was conducted to measure the heat transfer in degrees Fahrenheit through a 1 inch foamed board made from the procedure in Example 1 at 30% PET/glycerin polyol component having 5 moles of ethoxylation with isocyanate (50:50 ratio) to which 2% TCPP was added. Density of the panel was approximately 24 pcf. The procedure was as follows: (1) mount up the test specimen three inches from a Burns-O-Matic® torch tip, where the torch was also mounted; (2) activate the torch; and (3) using an infrared thermometer, the temperature was measured directly on the opposite side of the board specimen at each minute for up to minutes. Data from this study are provided below in Table 6. The data show that the disclosed polyurethane compositions have excellent thermal behavior, especially when a flame retardant material is incorporated therein. Accordingly, the materials are highly suitable for use in construction applications.

TABLE 6

FLAME RETARDANCY DATA FOR FOAMED POLYURETHANE PANEL MADE WITH GLYCERIN HAVING 5 MOLES OF ETHOXYLATION AND 2% TPPP.

| Time (Minutes) | Temperature (° F.) |
|---|---|
| 0 | 73.1 |
| 1 | 74.1 |
| 2 | 75 |
| 3 | 75.2 |
| 4 | 75.6 |
| 5 | 76.2 |
| 6 | 77.7 |
| 7 | 81.1 |
| 8 | 84 |
| 9 | 88.8 |
| 10 | 93.3 |
| 11 | 96.4 |
| 12 | 103.8 |
| 13 | 107.3 |
| 14 | 111.7 |
| 15 | 116.2 |
| 16 | 120.7 |
| 17 | 129 |
| 18 | 146.3 |
| 19 | 147.5 |
| 20 | 155.1 |
| 21 | 166.6 |
| 22 | 172.7 |
| 23 | 179 |
| 24 | 181.2 |
| 25 | 185.8 |
| 26 | 185.8 |
| 27 | 191.1 |
| 28 | 196.7 |
| 29 | 201.5 |

Example 9. R-Values for Foams at Different Densities

Foams were prepared with blowing agent at different densities as shown in the below Table and tested in for thermal properties. Expancel, product number 031 DU 40, was used as the blowing agent in the amount needed to generate the indicated foam density. The aromatic polyester polyol was used was prepared from 70% ethoxylated glycerin (5 moles of ethoxylation) and 30% PET reacted at 50:50 ratio with isocyanate. The process used was in accordance with the method of Example 1 above in accordance with ASTM D5334-15 Standard Test Method for Determination of Thermal Conductivity of Soil and Soft Rock by Thermal Needle Probe Procedure. The test instrument used was a KD2 Pro thermal analyzer with a KS-1 needle probe specific to insulation materials.

Figure 11:
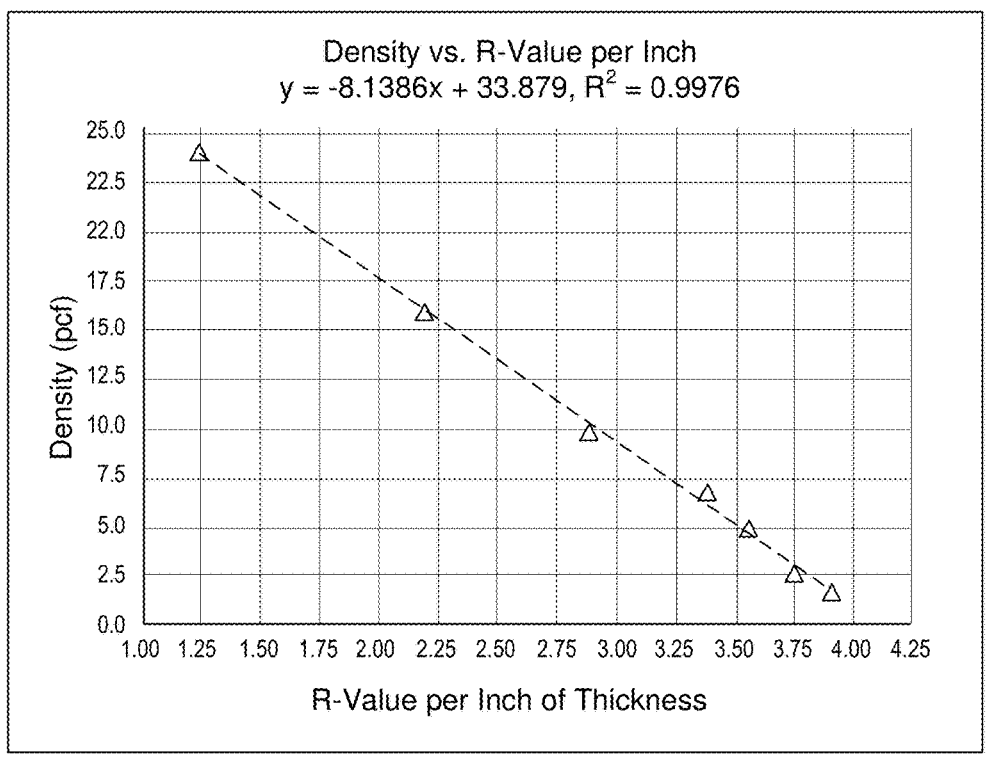
FIG. 11 is a graph of R-value measurements for foams of the present invention.

As shown by the Table 7, and accompanying FIG. 11, there is a fairly linear relationship between foam density and R-value for the polyurethane composition tested.

TABLE 7

THERMAL PROPERTIES OF AROMATIC POLYESTER POLYETHER POLYURETHANES AT VARIOUS DENSITIES.

| Density (pcf) | Thermal Conductivity [K] $\frac{W}{m*K}$ | Thermal Resistivity [p] $\frac{cm*°\ C.}{W}$ | R-Value per Inch $\frac{ft^2*hr*°\ F.}{BTU*in.}$ |
|---|---|---|---|
| 2.0 | 0.037 | 2,710 | 3.91 |
| 3.0 | 0.038 | 2,600 | 3.75 |
| 5.2 | 0.041 | 2,458 | 3.55 |
| 7.1 | 0.043 | 2,339 | 3.38 |
| 10.0 | 0.050 | 1,990 | 2.87 |
| 16.0 | 0.066 | 1,514 | 2.19 |
| 24.0 | 0.117 | 850 | 1.23 |

Example 10. Impact Resistance of Ethoxylated Glycerin Polyurethane Pucks 25 g pucks were prepared from 50:50 polyol:isocyanate (30% PET/70% ethoxylated glycerin with varying moles of ethoxylation) and impact resistance tests were performed as shown below, where "Sample ID" conforms to the moles of ethoxylation of glycerin. As shown in Table 8 below, 5 and 9 moles of ethoxylation shows excellent impact resistance. The tester noted that 9 moles of ethoxylation showed some indentation of the surface, thus possibly indicating that the surface was less hard.

TABLE 8

IMPACT RESISTANCE.

| Sample ID | Impact Force at Failure or Max (in-lbs) | Failure Type | Repetitive Drop Test 10 lbs - 18 in. Height | Failure Type |
|---|---|---|---|---|
| 5 | 160 (max) | No Failure | 500 Blows | No Failure - Significantly Less Indentation than #9 |
| 9 | 160 (max) | No Failure | 500 Blows | No Failure |
| 7 | 160 (max) | No Failure | 350 Blows | Cracked |
| 4 | 160 (max) | No Failure | 250 Blows | Cracked |
| 3 | 140 | Cracked | | |
| 6 | 100 | Cracked | | |
| 2 | 40 | Cracked | | |

Example 11. Tests Conducted for Polyurethane Panels

A. ASTM D1621-16—Compressive Properties

Five 2 inch cubes specimens of inventive polyurethane panels formed were tested in accordance with ASTM D1621. The samples were conditioned to 73±3.5° F. and 50±2% relative humidity for 24 hrs prior to testing. The rate of testing was 0.20 in/min. of crosshead displacement. The test machine used for compressive testing was a Satec-Model 5590-HVL closed-loop, dynamic servo-hydraulic, testing machine conforming to the requirements of ASTM E4-16 Standard Practices for Force Verification of Testing Machines.

B. ASTM D695-10—Compressive Properties

Compressive properties were determined in accordance with ASTM D695 using five 1.00"×2.00" cylinders of inventive polyurethane panels. The samples were conditioned to 73±3.5° F. and 50±2% relative humidity for 24 hrs prior to testing. The rate of testing was 0.05 in./min of crosshead displacement.

C. ASTM D570-10—Water Absorption

Water absorption was determined in accordance with ASTM D570. Three 2.00" diameter×0.25" thick discs of inventive polyurethane panel were used for testing. The samples were conditioned to 73±3.5° F. and 50±2% relative humidity for 24 hrs prior to testing. The disks were submerged in water for 24 hours. The initial and final weights were used to calculate the percent absorption.

D. ASTM D732-10—Shear Strength of Plastics by Punch Tool

Shear strength properties were determined in accordance with ASTM D732. Three specimens of inventive polyurethane panel with approximate dimensions of 2" diameter× 0.25" thickness were used for testing. A hole in the center of each specimen was drilled with a lathe to a diameter of 1". The specimens were conditioned to 73±3.5° F. and 50±2% relative humidity for 24 hrs prior to testing. The load was applied to the specimens using a 0.999" diameter punch at a rate of 0.05 in/min. of crosshead displacement.

E. ASTM D790-10—Procedure A—Flexural Strength & Flexural Tangent Modulus

Flexural strength properties of inventive polyurethane panels were determined in accordance with ASTM D790. Five specimens with aromatic polyester polyether polyols generated polyurethanes having approximate dimensions of 2.00×0.50×10.00 inches were used for testing. The load rate used in testing was 0.21 in./min. of crosshead displacement which equates to a strain rate of 0.01 in./in. The span length used in testing was 8.00 inches.

F. ASTM D648-07—Heat Deflection

Heat deflection temperature was determined in accordance with ASTM D648. Two 0.50" by 0.50" by 5.00" test specimens of inventive polyurethane panel were used for testing. The specimens were tested in the edgewise position under a 264 psi stress in accordance with ASTM D648. The rate of temperature increase was 2° C. per minute.

G. ASTM E96-16—Water Method—WVTR

The inventive polyurethane panel specimens used for water vapor transmission testing were approximately 3.50 inches in diameter×0.25 inches in thickness and were saw cut on both faces. Specimens were tested using the water method. The test cups were filled with 970 g of distilled water to within 0.75 inches of the specimen. Specimens were sealed to the test cups using a commercially available 2 part adhesive and tested at a temperature of 73.0±2° F. and a relative humidity of 50±2%.

Data obtained for representative disclosed polyurethanes using the foregoing test methods are given below in Tables 9-10. Data are given for representative disclosed TMP panels using the foregoing test methods are given below in Tables 11-19.

TABLE 9

COMPARATIVE PROPERTY SUMMARY FOR POLYURETHANES GENERATED FROM GLYCERIN OR TMP HAVING 5 MOLES OF ETHOXYLATION.

| ASTM | Test Property | Average Test Result Glycerin* | TMP** |
|---|---|---|---|
| D570 | Absorption - 24 hrs (%) | 4.1 | 4.16 |
| D2482 | Dry Density (pcf) | 25.9 | 23.0 |
| | SSD Density (pcf) | 26.4 | 23.6 |
| | Apparent Density (pcf) | 26.1 | 23.2 |
| | Absorption - 96 hrs (%) | 2.1 | 3.0 |
| D648 | Heat Deflection Temperature - 264 psi (° F.) | 152.0 | 137.6 |
| D2240 | Shore D Hardness - Skinned Surface | 62 | 50 |
| | Shore D Hardness - Open Faced Surface | 32 | 33 |
| D1621 | Compressive Yield Strength (psi) | 520 | 680 |
| | Compressive Strength (psi) | 890 | 1,080 |
| | Compressive Modulus (psi) | 28,170 | 36,900 |
| D790 | Flexural Strength (psi) | 2,030 | 1,550 |
| | Flexural Tangent Modulus (psi) | 59,200 | 44,200 |
| D695 | Compressive Yield Strength - 0.2% Offset (psi) | 1,560 | 680 |
| | Compressive Strength (psi) | 2,100 | 1,070 |
| | Compressive Modulus (psi) | 57,500 | 35,800 |
| C531 | Coefficient of Thermal Expansion (in./in./° F.) | 2.18E−04 | NT |
| D732 | Shear Yield Strength (psi) | 240 | 285 |
| | Peak Shear Strength (psi) | 350 | 345 |
| D96 Method B | Slope (grains/hr) | 0.00899 | 0.10957 |
| | Water Vapor Transmission Rate (lbs/24 hr/1000 ft²) | 0.571 | 6.062 |
| | Permeance (US Perm) | 0.43 | 4.53 |

*Glycerin refers to a polyurethane foam having a density of 24 pcf generated per the disclosed methods from glycerin (30% PET/70% ethoxylated triol) having 5 moles of ethoxylation reacted with diisocyanate at 50:50 ratio and 0.1% DBTL catalyst, formed into a panel, and cured for 7 days before testing.

**TMP refers to a polyurethane foam having a density of 24 pcf generated per the disclosed methods from trimethylolpropane (30% PET/70% ethoxylated triol) having 5 moles of ethoxylation, reacted with diisocyanate at 50:50 ratio and 0.1% DBTL catalyst, formed into a panel, and cured for 7 days before testing.

TABLE 10

ASTM D695: Compressive Properties with TMP Panel.

| ID | Diameter (in.) | Height (in.) | Area (in.²) | Yield Load, 0.2% offset (lbf.) | Peak Load (lbf.) | Compressive Yield Strength, 0.2% offset (psi) | Peak Stress (psi) | Compressive Modulus (psi) |
|---|---|---|---|---|---|---|---|---|
| 1 | 1.000 | 2.038 | 0.7854 | 1,298 | 1,782 | 1,650 | 2,270 | 63,700 |
| 2 | 1.016 | 1.959 | 0.8099 | 1,376 | 1,784 | 1,700 | 2,200 | 60,800 |
| 3 | 1.016 | 1.988 | 0.8099 | 1,355 | 1,823 | 1,670 | 2,250 | 59,000 |
| 4 | 1.056 | 1.717 | 0.8758 | 1,260 | 1,706 | 1,440 | 1,950 | 51,400 |
| 5 | 1.017 | 2.011 | 0.8123 | 1,099 | 1,504 | 1,350 | 1,850 | 52,500 |
| Average | | | | | | 1,560 | 2,100 | 57,500 |

TABLE 11

ASTM D1621: Compressive Properties with TMP Panel.

| # | Width (in.) | Length (in.) | Height (in.) | Area (in²) | Strain at Yield (in./in.) | Strain at Peak (in./in.) | Load at Yield (lbf.) | Peak Load (lbf.) | Load at 10% Strain (lbf.) | Stress at Yield (psi) | Peak Stress (psi) | Stress at 10% Strain | Compressive Modulus (psi) |
|---|---|---|---|---|---|---|---|---|---|---|---|---|---|
| 1 | 2.031 | 1.998 | 2.027 | 4.057 | 0.0195 | 0.1301 | 1633.3 | 2972.3 | 2805.1 | 403 | 733 | 691 | 22,431 |
| 2 | 2.030 | 2.038 | 1.992 | 4.137 | 0.0216 | 0.1302 | 2034.6 | 3457.4 | 3280.8 | 492 | 836 | 793 | 24,986 |
| 3 | 2.024 | 2.002 | 2.028 | 4.051 | 0.0204 | 0.1301 | 2481.1 | 3970.2 | 3817.9 | 613 | 980 | 943 | 34,456 |
| 4 | 2.050 | 2.000 | 2.010 | 4.099 | 0.0212 | 0.1301 | 1994.7 | 3476.6 | 3312.9 | 487 | 848 | 808 | 25,753 |
| 5 | 2.095 | 2.045 | 2.094 | 4.283 | 0.0198 | 0.1303 | 2626.2 | 4554.5 | 4308.8 | 613 | 1063 | 1006 | 33,245 |
| Avg | 2.046 | 2.016 | 2.030 | 4.125 | 0.0205 | 0.1302 | 2154.0 | 3686.2 | 3505.1 | 520 | 890 | 850 | 28,174 |

TABLE 12

ASTM D790: Flexural Properties with TMP Panel.

| ID | Width (in.) | Depth (in.) | Span Length (in.) | Peak Load (lbf.) | Flexural Strength (psi) | Flexural Tangent Modulus (psi) |
|---|---|---|---|---|---|---|
| 1 | 1.973 | 0.514 | 8.00 | 84.3 | 1,945 | 62,855 |
| 2 | 1.948 | 0.480 | 8.00 | 77.3 | 2,065 | 68,425 |
| 3 | 1.997 | 0.506 | 8.00 | 81.4 | 1,910 | 58,998 |
| 4 | 1.974 | 0.509 | 8.00 | 81.0 | 1,900 | 65,725 |
| 5 | 2.004 | 0.506 | 8.00 | 98.8 | 2,310 | 40,140 |
| Average | | | | | 2,030 | 59,200 |

TABLE 13

ASTM D1621: Heat Deflection under Load with TMP Panel.

| Specimen # | Avg. Width (in.) | Avg. Depth (in.) | Total Load Applied (g) 264 psi | Heat Deflection Temperature (° F.) |
|---|---|---|---|---|
| 1 | 0.4947 | 0.4913 | 2383.0 | 151.5 |
| 2 | 0.4967 | 0.4867 | 2357.3 | 152.5 |
| Average |  |  |  | 152.0 |

TABLE 14

ASTM D570 Absorption with TMP Panel.

| Specimen # | Diameter (in.) | Thickness (in.) | Initial Weight (g) | Weight After 24 hr Soak (g) | Difference (g) | % Absorption |
|---|---|---|---|---|---|---|
| 1 | 2.0235 | 0.2745 | 6.2010 | 6.4600 | 0.2590 | 4.18 |
| 2 | 1.9965 | 0.2420 | 6.2410 | 6.4730 | 0.2320 | 3.72 |
| 3 | 2.0155 | 0.2650 | 6.4090 | 6.6930 | 0.2840 | 4.42 |
| Average |  |  |  |  |  | 4.11 |

TABLE 15

ASTM D2482 Absorption and Density with TMP Panel.

| # | Weight of Pycnometer (g) | 96 hr SSD Weight (g) | Weight of Pycnometer & Specimen (g) | Oven Dry Weight (g) | Relative Density Oven Dry | Relative Density SSD | Apparent Relative Density | Density Oven Dry (pcf) | Density SSD (pcf) | Apparent Density (pcf) | Absorption % |
|---|---|---|---|---|---|---|---|---|---|---|---|
| 1 | 1957.8 | 54.20 | 1890.20 | 53.10 | 0.436 | 0.445 | 0.440 | 27.15 | 27.71 | 27.40 | 2.1 |
| 2 | 1965.9 | 52.30 | 1891.40 | 51.31 | 0.405 | 0.412 | 0.408 | 25.20 | 25.68 | 25.40 | 1.9 |
| 3 | 1954.5 | 57.70 | 1886.80 | 56.59 | 0.451 | 0.460 | 0.455 | 28.10 | 28.65 | 28.35 | 2.0 |
| 4 | 1954.5 | 54.10 | 1886.70 | 53.22 | 0.437 | 0.444 | 0.440 | 27.19 | 27.64 | 27.38 | 1.7 |
| 5 | 1970.7 | 48.80 | 1884.80 | 47.51 | 0.353 | 0.362 | 0.356 | 21.96 | 22.56 | 22.18 | 2.7 |
| Avg | 2756.7 | 53.42 | 1887.98 | 52.35 | 0.416 | 0.425 | 0.420 | 25.92 | 26.45 | 26.14 | 2.1 |

TABLE 16

ASTM D732 Shear Strength by Punch Tool with TMP Panel.

| Specimen # | Punch Diameter (in.) | Thickness (in.) | Area (in.$^2$) | Yield Load at 0.2% offset (lbf.) | Peak Load (lbf.) | Yield Stress at 0.2% offset (lbf.) | Peak Shear Stress (psi) | Average Shear Stress (psi) |
|---|---|---|---|---|---|---|---|---|
| 1 | 1.00 | 0.2753 | 1.7298 | 387 | 551 | 220 | 320 | 350 |
| 2 | 1.00 | 0.2677 | 1.6820 | 371 | 595 | 220 | 350 |  |
| 3 | 1.00 | 0.2820 | 1.7719 | 477 | 675 | 270 | 380 |  |

TABLE 17

ASTM C532 Coefficient of Thermal Expansion with TMP Panel.

| Specimen | Length at Lower Temp (° C.) 23 | Length at Upper Temp (° C.) 100 | COTE (in./in./° C.) | COTE (in./in./° F.) |
|---|---|---|---|---|
| 1 | 10.0550 | 10.3595 | 3.93E−04 | 2.18E−04 |
| 2 | 10.0750 | 10.3710 | 3.82E−04 | 2.12E−04 |
| 3 | 10.0560 | 10.3655 | 4.00E−04 | 2.22E−04 |
| Average | 10.0620 | 10.3653 | 3.92E−04 | 2.18E−04 |

TABLE 18

ASTM E96- Water Vapor Transmission: Specimen and Test Conditions with TMP Panel.

| | |
|---|---|
| Product Name: | Expanded Foam |
| Specimen Type | ¼″ Thickness - Saw Cut on Both Faces |
| Method Used | Water |
| Dish Diameter (in.) | 3.152 |
| Dish Area (sq. ft.) | 0.054 |
| Test Temperature (° F.) | 73.0 |
| Rel. Humidity (%) | 51.2 |
| Saturation Vapor Pressure (in. Hg) | 0.81 |

TABLE 19

ASTM E96- Water Vapor Transmission with TMP Panel.

| WVTR & Permeability | Specimen 1 | Specimen 2 | Specimen 3 | Average |
|---|---|---|---|---|
| Slope of the Line, grains/h | 0.00877 | 0.00987 | 0.00975 | 0.00899 |
| grains/hour · ft$^2$ | 0.16 | 0.18 | 0.18 | 0.17 |

TABLE 19-continued

ASTM E96- Water Vapor Transmission with TMP Panel.

| WVTR & Permeability | Specimen 1 | Specimen 2 | Specimen 3 | Average |
|---|---|---|---|---|
| lbs/24 hour · 1000 ft$^2$ | 0.557 | 0.627 | 0.619 | 0.571 |
| grams/hour · m$^2$ | 0.11 | 0.13 | 0.13 | 0.12 |
| US perms | 0.42 | 0.47 | 0.46 | 0.43 |
| grams/Pa · s · m$^2$ | 2.38E−08 | 2.68E−08 | 2.65E−08 | 2.44E−08 |

Example 12: Determination of R-Value of TMP Panel

A TMP panel (30% PET/70% TMP with 5 moles ethoxylation reacted at 50:50 with isocyanate/1% DBTL) having a thickness of 1 inch was cut into a 12 inch by 12 inch square.

A calibrated hot box was used to generate the R value of the inventive polyurethane material. Calibration was conducted using materials having known R-values from 2-10. Data points collected were inside/outside ambient temperature and the inside/outside surface temperature of the test specimen. A model was fit to the data and is given in FIG. 8.

Once the temperatures reached a steady state, the averages of a 24 hour period of temperatures (see FIG. 9) were used for calculating the R-value of the PET panel. The averages for data point are:

| | |
|---|---|
| Inside Ambient | 108.65 F. |
| Inside Face | 102.18 F. |
| Outside Face | 77.18 F. |
| Outside Ambient | 73.50 F. |

Therefore, the calculated R-value of the inventive PET panel is:

$$R\text{-value of PET panel}=45.69-(3.562*25)+(0.07284*252)=2.169$$

Another way to calculate R-value is by using the formula:

$$U1(TA-T1)=U2(T1-T2); \text{ and}$$

$$U2=(U1(TA-T1))/(T1-T2);$$

where: U=Thermal Transmittance; T1=Interior Face Temperature; T2=Outside Face Temperature; and TA=Interior Ambient. Given that the R-value is the reciprocal of the U-value, the calculation for R-value would be:

$$R2=R1(T1-T2)/(TA-T1);$$

where R1=Reciprocal of Thermal Transmittance of air=0.68; R2=R-value of PET panel; R2=(0.68(102.18−77.18))/(108.65−102.18)=17/6.47=2.63. Both ways for determining the R-value of the PET panel are not significantly different.

The R value tests demonstrate that the inventive polyurethane panel thickness of 1 inch exhibits an R value of greater than 2 according to the provided test methodologies, thereby providing at least some insulative properties. This data indicates that a coating having the same characteristics will provide at least some insulative properties.

Example 13: Nail Insertion and Removal Performance of TMP Panel

A panel made from a polyurethane derived from a TMP panel (30% PET/70% TMP with 5 moles ethoxylation reacted at 50:50 with isocyanate/1% DBTL) was tested for screw retention were prepared into two 12 inch by 12 inch by 1 inch panels. The panels were milled using a table saw to have a tongue and groove shape along the perimeter of the panels.

The panels were then nailed to a wall structure (Force Field, Georgia-Pacific LLC) using finish nails (nailed at an angle through the tongue into the wall structure and face nailed with finish nails above groove). Both panels were placed together so that the corresponding tongue and grooves fit together leaving a small gap between the panels. The nail holes in the face of the panel were puttied with glazing compound and the panels painted.

The inventive polyurethane panel nailed easily to the wall structure and held well with finish nails. The small hole created by the finish nail made the glazing of the nail holes easy. The panels painted well. When the panels were removed, the nails came off with the panels. No nails were left in the wall structure which indicates good nail holding ability for the inventive polyurethane material in panel form. It can be inferred that a coating of the polyurethane material would impart similar nail retention characteristics.

Example 14: Tape Adhesion Testing of TMP Panel

A TMP panel (30% PET/70% TMP with 5 moles ethoxylation reacted at 50:50 with isocyanate/1% DBTL) was tested for tape adhesion by fastening tape across two sides of the panels, with the panels being arranged side by side so that there was a ¼" gap between each panel. Two inch wide modified rubber tape was used to seal the gap between the panels and a 4 inch Cobb Ring was attached over gap and tape to measure water penetration through the tape seams. The Cobb Ring was filled with one inch of water (as measured on the interior of the ring). The water level was raised to 2 inches for another 24 hours with no signs of leaking. The water level was raised to 3 inches for a 24-hour period and still no leaking observed. No sign of leaking from the tape edges was observed, demonstrating that tape adhesion to the inventive polyurethane material was excellent. It can be inferred that a coating of the polyurethane material would impart similar tape adhesion characteristics.

Example 15 Water Seepage Properties of TMP Panel

Two 2 inch screws were screwed into a TMP panel (30% PET/70% TMP with 5 moles ethoxylation reacted at 50:50 with isocyanate/1% DBTL). The screws were driven into the panel until the head of each screw was flush with the panel surface. The water level was raised to 2 inches for another 24 hours with no signs of leaking. The water level was raised to 3 inches for a 24-hour period and still no leaking observed. The Cobb Ring was filled with one inch of water (as measured on the interior of the ring). The water level was raised to 2 inches for another 24 hours with no signs of leaking. The water level was raised to 3 inches for a 24-hour period and with still no leaking observed. The absence of water leakage from inside the Cobb Ring indicates that water seepage did not occur as a result of disruption of the internal structure of the polyurethane material. This indicates that the screw retention and "grab" of the material to screws is excellent, and aromatic polyester polyether polyols to demonstrate that the inventive polyurethane material exhibits resiliency upon insertion of screws, for example. The results indicate that the inventive polyurethane material shows a propensity to seal around fasteners, keeping liquid water from seeping through the material reaching the wood structure where it can cause problems. Also, the lack of water leakage indicates that seepage into structural components positioned below the coating is unlikely. Such lack of seepage is a benefit in construction applications. It can be inferred that a coating of the polyurethane material would impart similar characteristics.

Example 16: Nail and Screw Pull Test of TMP and Glycerin Panels

A 1 inch thick of each of a TMP and glycerin panel were prepared. (30% PET/70% glycerin or TMP each with 5 moles ethoxylation reacted at 50:50 with isocyanate/1% DBTL). A fastener was inserted into the test board with a portion remaining exposed. Density of the panel was about 24 pcf.

The pull test was conducted as follows. The Com-Ten FG-1000 Analog Fastener Tester was placed over each test sample so that the entirety of the tester was positioned on the sample, and the screw in the sample was attached to the power screw on the testing device. The torque bar was turned clockwise until the top of the foot engaged slightly with the head of the screw. The black pointer on the device was set to zero, and the red pointer were set to zero prior to starting the test. Pressure was applied to the screw by continuous turning of the torque bar handle in a clockwise motion to apply tensile pull on the fastener. Each full turn of the handle moved the power screw 0.10 inches. Continuous force was applied by the screw until a maximum point was reached and the black pointer dropped off. The resulting force was measured in pounds on the gauge. The red pointer on the gauge was read to provide the maximum yield or break point of the fastener.

A 1 inch wood screw (Everbilt) was inserted into the 1 inch thick panel with about ⅜ inch remaining exposed. A pull test was performed. The inventive polyurethane panel exhibited a required pull test result of 360 pounds (glycerin) and 340 pounds (trimethylolpropane). These examples demonstrate that the inventive polyurethane panels in panel form exhibit excellent screw retention.

Example 17: Screw Retention of OSB Panel Coated with Polyurethane Derived from Ethoxylated TMP A ½ inch piece of OSB (Norboard) was coated with 20 mils of a polyurethane coating was prepared using the aromatic polyester polyol derived from trimethylolpropane having 5 moles of ethoxylation transesterified with PET at a 30% PET/70% triol ratio, where the polyol was reacted at a 50:50 ratio with diisocyanate (1% DBTL). A #10 by 1 inch flat head Phillips wood screw (Everbilt) was inserted into the coated OSB board to a depth of ¾ inch. A control board of uncoated ½ inch OSB was also tested with the same screw parameters.

The pull test technique set out above was used to test the screw retention of each OSB. The measured force to remove the screw from the coated OSB board was 480 pounds. The measured force to remove the screw from the uncoated OSB board was 310 pounds. The results show that the inventive polyurethane coating improves the screw retention of OSB board, and has utility in roofing applications, as an example.

It will be apparent to those skilled in the art that various modifications and variations can be made in the present disclosure without departing from the scope or spirit of the disclosure. Other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. An aromatic polyester polyether polyol having a structure that is either:
   a) based on a glycerol backbone, the structure represented by a formula:

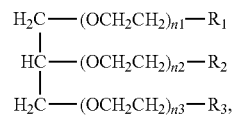

wherein each of $R_1$, $R_2$, and $R_3$ is independently selected from hydroxyl and a structure represented by a formula:

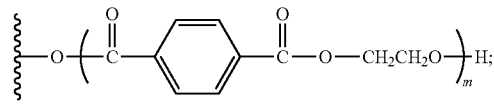

provided that at least one of $R_1$, $R_2$, and $R_3$ is not hydroxyl;
   wherein m has a value such that the aromatic polyester polyether polyol has a Brookfield Cone and Plate Viscosity of less than about 5 Poise carried out using Spindle #4, at 100 rpm and 60° C.;
   and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9;
   or
   b) based on a trimethylolpropane backbone, the structure represented by a formula:

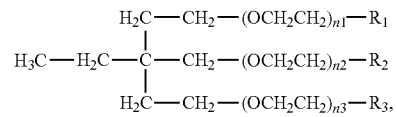

wherein each of $R_1$, $R_2$, and $R_3$ is independently selected from hydroxyl and a structure represented by a formula:

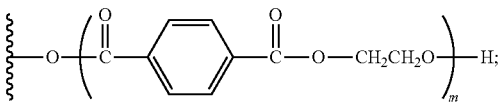

provided that at least one of $R_1$, $R_2$, and $R_3$ is not hydroxyl;
   wherein m has a value such that the aromatic polyester polyether polyol has a Brookfield Cone and Plate Viscosity of less than about 5 Poise carried out using Spindle #4 at 100 rpm and 60° C.;
   and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9.

2. The aromatic polyester polyether polyol of claim 1, consisting essentially of the structure based on the glycerol backbone.

3. The aromatic polyester polyether polyol of claim 1, having a PET component derived from at least some recycled PET material.

4. The aromatic polyester polyether polyol of claim 1, having a PET component derived from at least about 50% recycled material.

5. The aromatic polyester polyether of claim 1, comprising the structure based on the glycerol backbone and having a first Brookfield Cone and Plate Viscosity of about 2.7 to about 3.2 Poise carried out using Spindle #4 at 100 rpm and 60° C. or a second Brookfield Cone and Plate Viscosity of about 3.2 to about 3.8 Poise carried out using Spindle #4 at 100 rpm and 60° C.

6. The aromatic polyester polyether polyol of claim 1, comprising the structure based on the trimethylolpropane backbone and having a first Brookfield Cone and Plate Viscosity of about 3.7 to about 4.2 Poise carried out using Spindle #4 at 100 rpm and 60° C. or a second Brookfield Con and Plate Viscosity of about 4.0 to about 5.0 Poise carried out using Spindle #4 at 100 rpm and 60° C.

7. An aromatic polyester polyether polyol composition derived from A transesterification of polyethylene terephthalate (PET) with an ethoxylated triol and, optionally, a catalyst, wherein the ethoxylated triol comprises a reaction product of:
   a) glycerin and from 1 to 9 moles of ethylene oxide; or
   b) trimethylolpropane and from 1 to 9 moles of ethylene oxide,
   wherein the aromatic polyester polyether polyol has a Brookfield Cone and Plate Viscosity of less than about 5 Poise carried out using Spindle #4 at 100 rpm and 60° C.; and
   wherein the Brookfield Cone and Plate Viscosity is measured at the end of the transesterification reaction, and prior to the addition of any additives or chain extenders to the aromatic polyester polyether polyol.

8. The aromatic polyester polyether polyol composition of claim 7, wherein the ethoxylated triol consists essentially of the reaction product of glycerin and from 1 to 9 moles of ethylene oxide.

9. The aromatic polyester polyether polyol composition of claim 7, wherein at least some of the PET comprises recycled PET.

10. The aromatic polyester polyether polyol composition of claim 9, wherein at least about 50% or greater of the PET is recycled PET.

11. The aromatic polyester polyether polyol composition of claim 7, wherein the ethoxylated triol has a hydroxyl number of less than about 1250, as measured by ASTM 4274-16, Test A.

12. The aromatic polyester polyether polyol composition of claim 7, wherein a weight ratio of PET to ethoxylated triol at the start of the transesterification reaction is from about 10:90 to about 60:40.

13. The aromatic polyester polyether polyol composition of claim 7, wherein a weight ratio of PET to ethoxylated triol at the start of the transesterification reaction is from about 20:80 to about 50:50.

14. The aromatic polyester polyether polyol composition of claim 7, wherein at least some of the composition comprises a material having one of a structure that is either:
   a) based on a glycerol backbone, the structure represented by a formula:

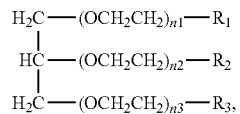

wherein each of $R_1$, $R_2$, and $R_3$ is independently selected from hydroxyl and a structure represented by a formula:

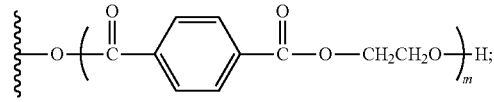

provided that at least one of $R_1$, $R_2$, and $R_3$ is not hydroxyl;
wherein m has a value such that:
   (i) the aromatic polyester polyether polyol has a first Brookfield Cone and Plate Viscosity of about 2.7 to about 3.2 Poise carried out using Spindle #4 at 100 rpm and 60° C.; or
   (ii) the aromatic polyester polyether polyol has a second Brookfield Cone and Plate Viscosity of about 3.2 to about 3.8 Poise carried out using Spindle #4 at 100 rpm and 60° C.;
   and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9;
or
   b) based on a trimethylolpropane backbone, the structure represented by a formula:

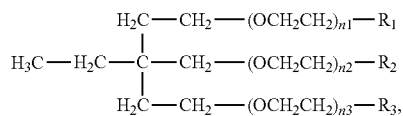

wherein each of $R_1$, $R_2$, and $R_3$ is independently selected from hydroxyl and a structure represented by a formula:

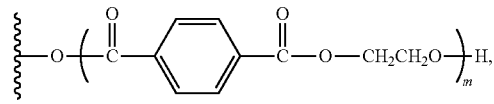

provided that at least one of $R_1$, $R_2$, and $R_3$ is not hydroxyl;
wherein m has a value such that:
   (i) the aromatic polyester polyether polyol has a first Brookfield Cone and Plate Viscosity of about 3.7 to about 4.2 Poise carried out using Spindle #4 at 100 rpm and 60° C.;
   (ii) the aromatic polyester polyether polyol has a first Brookfield Cone and Plate Viscosity of about 4.0 to about 5.0 Poise carried out using Spindle #4 at 100 rpm and 60° C.;
   and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9.

15. The aromatic polyester polyether polyol composition of claim 7, comprising at least some ethylene glycol that is generated in the transesterification reaction.

* * * * *